United States Patent
Bhutani et al.

(10) Patent No.: US 12,231,296 B2
(45) Date of Patent: Feb. 18, 2025

(54) NETWORK FORMATION FOR A LOAD CONTROL SYSTEM

(71) Applicant: Lutron Technology Company LLC, Coopersburg, PA (US)

(72) Inventors: Ankit Bhutani, Aston, PA (US); Vidur Garg, Allentown, PA (US); Jeffrey S. Hayes, Allentown, PA (US); Galen Edgar Knode, Macungie, PA (US)

(73) Assignee: Lutron Technology Company LIC, Coopersburg, PA (US)

( * ) Notice: Subject to any disclaimer, the term of this patent is extended or adjusted under 35 U.S.C. 154(b) by 0 days.

(21) Appl. No.: 18/086,179

(22) Filed: Dec. 21, 2022

(65) Prior Publication Data

US 2023/0119182 A1  Apr. 20, 2023

Related U.S. Application Data

(63) Continuation of application No. 16/907,221, filed on Jun. 20, 2020, now Pat. No. 11,683,235.

(Continued)

(51) Int. Cl.
 *H04L 41/12* (2022.01)
 *G16Y 40/35* (2020.01)
 (Continued)

(52) U.S. Cl.
 CPC .............. *H04L 41/12* (2013.01); *G16Y 40/35* (2020.01); *H04B 17/318* (2015.01);
 (Continued)

(58) Field of Classification Search
 CPC ... H04L 41/0806; H04L 69/28; H04W 74/085
 See application file for complete search history.

(56) References Cited

U.S. PATENT DOCUMENTS

| 948,000 A | 2/1910 | Talbot |
| 5,086,228 A | 2/1992 | Kojima |

(Continued)

FOREIGN PATENT DOCUMENTS

| CN | 107926103 A | 4/2018 |
| CN | 109417508 A | 3/2019 |

(Continued)

OTHER PUBLICATIONS

Lin, Deyu, et al., "An Energy-Efficient Clustering Algorithm Combined Game Theory and Dual-Custer-Head Mechanism for WSNs", IEE Access, vol. 7 DOI: 10.1109/ACCESS.2019.2911190 [retrieved on Apr. 22, 2019), Apr. 15, 20019, pp. 49894-49905.

(Continued)

*Primary Examiner* — Jackie Zuniga Abad
(74) *Attorney, Agent, or Firm* — Flaster Greenberg P.C.

(57) ABSTRACT

A control device may be configured to delay an attachment procedure while attachment messages are being transmitted over the network. The control device may be configured to initiate an attachment procedure with a router device on a network at the end a back-off period of time. The attachment procedure may include transmitting attachment messages (e.g., parent request messages) that enable the control device to transmit and receive messages over the network through the router device. During the back-off period of time, the control device may determine an attachment message is received from another control device on the network. And, if an attachment message (e.g., a parent request messages and/or a link request message) is received from another control device, the control device may increase the back-off period of time (e.g., delaying when the control device initiates its attachment procedure).

21 Claims, 29 Drawing Sheets

Related U.S. Application Data

(60) Provisional application No. 62/942,699, filed on Dec. 2, 2019, provisional application No. 62/910,059, filed on Oct. 3, 2019, provisional application No. 62/884,986, filed on Aug. 9, 2019, provisional application No. 62/880,593, filed on Jul. 30, 2019, provisional application No. 62/879,122, filed on Jul. 26, 2019, provisional application No. 62/864,646, filed on Jun. 21, 2019.

(51) Int. Cl.
| | |
|---|---|
| *H04B 17/318* | (2015.01) |
| *H04L 41/0806* | (2022.01) |
| *H04L 41/0816* | (2022.01) |
| *H04L 67/1087* | (2022.01) |
| *H04L 67/125* | (2022.01) |
| *H04L 69/28* | (2022.01) |
| *H04W 4/70* | (2018.01) |
| *H04W 24/02* | (2009.01) |
| *H04W 48/10* | (2009.01) |
| *H04W 48/16* | (2009.01) |
| *H04W 74/0833* | (2024.01) |
| *H04W 76/15* | (2018.01) |
| *H04W 84/20* | (2009.01) |
| *G16Y 10/80* | (2020.01) |
| *G16Y 20/10* | (2020.01) |
| *G16Y 40/30* | (2020.01) |

(52) U.S. Cl.
CPC ...... *H04L 41/0806* (2013.01); *H04L 41/0816* (2013.01); *H04L 67/1089* (2013.01); *H04L 67/1093* (2013.01); *H04L 67/125* (2013.01); *H04L 69/28* (2013.01); *H04W 4/70* (2018.02); *H04W 24/02* (2013.01); *H04W 48/10* (2013.01); *H04W 48/16* (2013.01); *H04W 74/085* (2013.01); *H04W 76/15* (2018.02); *H04W 84/20* (2013.01); *G16Y 10/80* (2020.01); *G16Y 20/10* (2020.01); *G16Y 40/30* (2020.01)

(56) References Cited

U.S. PATENT DOCUMENTS

| | | |
|---|---|---|
| 5,086,428 A | 2/1992 | Perlman et al. |
| 5,564,090 A | 10/1996 | Beauchamp et al. |
| 5,634,010 A | 5/1997 | Ciscon et al. |
| 5,838,226 A | 11/1998 | Houggy et al. |
| 5,848,054 A | 12/1998 | Mosebrook et al. |
| 5,905,442 A | 5/1999 | Mosebrook et al. |
| 6,209,039 B1 | 3/2001 | Albright et al. |
| 6,262,976 B1 | 7/2001 | McNamara |
| 6,879,806 B2 | 4/2005 | Shorty |
| 7,184,421 B1 | 2/2007 | Liu et al. |
| 7,277,931 B1 | 10/2007 | Booth et al. |
| 7,391,297 B2 | 6/2008 | Cash et al. |
| 7,447,800 B2 | 11/2008 | Kobayashi et al. |
| 7,606,187 B2 | 10/2009 | Zeng et al. |
| 7,787,424 B2 | 8/2010 | Kang et al. |
| 7,839,791 B2 | 11/2010 | Holmer et al. |
| 8,009,042 B2 | 8/2011 | Steiner et al. |
| 8,149,690 B1 | 4/2012 | Kakkar |
| 8,170,033 B1 | 5/2012 | Kothari et al. |
| 8,199,010 B2 | 6/2012 | Sloan et al. |
| 8,228,184 B2 | 7/2012 | Blakeley et al. |
| 8,306,062 B1 | 11/2012 | Cohen |
| 8,330,638 B2 | 12/2012 | Altonen et al. |
| 8,386,613 B2 | 2/2013 | Hopkins |
| 8,410,706 B2 | 4/2013 | Steiner et al. |
| 8,451,116 B2 | 5/2013 | Steiner et al. |
| 8,950,461 B2 | 2/2015 | Ogden et al. |
| 9,125,215 B2 | 9/2015 | Bahr |
| 9,178,798 B2 | 11/2015 | Esale et al. |
| 9,488,000 B2 | 11/2016 | Kirby et al. |
| 9,655,214 B1 | 5/2017 | Sooch et al. |
| 9,655,215 B1 | 5/2017 | Frank et al. |
| 10,027,127 B2 | 7/2018 | Crafts et al. |
| 10,098,074 B2 | 10/2018 | Baker et al. |
| 10,116,367 B1 | 10/2018 | Sakoda |
| 10,264,651 B2 | 4/2019 | Steiner |
| 10,285,112 B2 | 5/2019 | Zhang et al. |
| 10,299,356 B1 | 5/2019 | Quilling et al. |
| 10,379,505 B2 | 8/2019 | Barco et al. |
| 10,382,323 B1 | 8/2019 | Dave et al. |
| 10,461,827 B2 | 10/2019 | Sakoda |
| 10,680,899 B1 | 6/2020 | Ibarra |
| 10,715,599 B2* | 7/2020 | Hao ..................... H04W 4/70 |
| 10,813,058 B2 | 10/2020 | Qiu |
| 10,939,353 B2 | 3/2021 | Kamp et al. |
| 11,405,283 B2 | 8/2022 | Chen |
| 11,722,377 B2 | 8/2023 | Hayes |
| 2003/0031155 A1 | 2/2003 | Idehara |
| 2004/0196858 A1 | 10/2004 | Tsai et al. |
| 2004/0202158 A1* | 10/2004 | Takeno ................. H04L 45/54 |
| | | 370/389 |
| 2006/0067282 A1 | 3/2006 | Sherman et al. |
| 2006/0149851 A1 | 7/2006 | Matsumoto et al. |
| 2006/0291485 A1 | 12/2006 | Thubert et al. |
| 2006/0291659 A1 | 12/2006 | Watanabe |
| 2007/0025274 A1 | 2/2007 | Rahman et al. |
| 2007/0265790 A1 | 11/2007 | Sealing et al. |
| 2008/0031129 A1 | 2/2008 | Arseneault et al. |
| 2008/0036589 A1 | 2/2008 | Werb et al. |
| 2008/0092075 A1 | 4/2008 | Jacob et al. |
| 2008/0117907 A1 | 5/2008 | Hein |
| 2008/0170518 A1 | 7/2008 | Duggi et al. |
| 2008/0205385 A1 | 8/2008 | Zeng et al. |
| 2008/0240078 A1 | 10/2008 | Thubert et al. |
| 2009/0135824 A1 | 5/2009 | Liu |
| 2009/0185617 A1 | 7/2009 | Houghton et al. |
| 2009/0206983 A1 | 8/2009 | Knode et al. |
| 2009/0245252 A1 | 10/2009 | Konishi et al. |
| 2010/0046430 A1 | 2/2010 | Naito et al. |
| 2010/0165885 A1 | 7/2010 | Chang et al. |
| 2010/0177660 A1 | 7/2010 | Essinger et al. |
| 2010/0265836 A1 | 10/2010 | Lau et al. |
| 2010/0278187 A1 | 11/2010 | Hart et al. |
| 2011/0242968 A1 | 10/2011 | Cirkovic et al. |
| 2012/0182865 A1 | 7/2012 | Andersen et al. |
| 2012/0286940 A1 | 11/2012 | Carmen et al. |
| 2013/0030589 A1 | 1/2013 | Pessina et al. |
| 2013/0107909 A1 | 5/2013 | Jones et al. |
| 2013/0197955 A1 | 8/2013 | Dillon |
| 2013/0258872 A1 | 10/2013 | Drake et al. |
| 2013/0336170 A1 | 12/2013 | Broadworth et al. |
| 2014/0012961 A1 | 1/2014 | Pope |
| 2014/0173056 A1* | 6/2014 | Lear ................... H04L 65/1096 |
| | | 709/219 |
| 2014/0175875 A1 | 6/2014 | Newman et al. |
| 2014/0177469 A1 | 6/2014 | Neyhart et al. |
| 2014/0180487 A1 | 6/2014 | Bull et al. |
| 2014/0210616 A1 | 7/2014 | Ramachandran |
| 2014/0244834 A1 | 8/2014 | Guedalia et al. |
| 2014/0265568 A1 | 9/2014 | Crafts et al. |
| 2014/0281670 A1 | 9/2014 | Vasseur et al. |
| 2014/0347981 A1 | 11/2014 | Rangne et al. |
| 2015/0043562 A1 | 2/2015 | Shu |
| 2015/0085830 A1 | 3/2015 | Nozaki et al. |
| 2015/0131435 A1 | 5/2015 | Kasslin et al. |
| 2015/0179058 A1 | 6/2015 | Crafts et al. |
| 2016/0021525 A1* | 1/2016 | Mani ..................... H04W 4/80 |
| | | 455/434 |
| 2016/0073342 A1 | 3/2016 | Szewczyk et al. |
| 2016/0119415 A1 | 4/2016 | Han et al. |
| 2016/0219358 A1 | 7/2016 | Shaffer et al. |
| 2016/0227481 A1 | 8/2016 | Au et al. |
| 2016/0330107 A1 | 11/2016 | Thubert et al. |
| 2017/0013614 A1 | 1/2017 | Chandrashekar et al. |
| 2017/0041954 A1 | 2/2017 | Tsai et al. |
| 2017/0068720 A1 | 3/2017 | Ko et al. |

(56) References Cited

U.S. PATENT DOCUMENTS

| | | |
|---|---|---|
| 2017/0123390 A1 | 5/2017 | Barco et al. |
| 2017/0127468 A1 | 5/2017 | Saikusa |
| 2017/0155703 A1* | 6/2017 | Hao .................... H04W 4/70 |
| 2017/0223809 A1 | 8/2017 | Oliver et al. |
| 2017/0230231 A1 | 8/2017 | Hsu et al. |
| 2017/0245132 A1 | 8/2017 | Tsuchie |
| 2018/0014387 A1 | 1/2018 | Bard et al. |
| 2018/0035374 A1 | 2/2018 | Borden et al. |
| 2018/0167547 A1 | 6/2018 | Casey |
| 2018/0220476 A1 | 8/2018 | Jung et al. |
| 2018/0227145 A1 | 8/2018 | Brochi et al. |
| 2018/0331940 A1 | 11/2018 | Jadhav et al. |
| 2018/0347271 A1 | 12/2018 | Cooney et al. |
| 2018/0368048 A1 | 12/2018 | Tsuchie |
| 2019/0104463 A1 | 4/2019 | Khoury |
| 2019/0268797 A1 | 8/2019 | Pang et al. |
| 2019/0312770 A1 | 10/2019 | Bidgoli et al. |
| 2019/0394667 A1 | 12/2019 | Shariati |
| 2020/0044707 A1 | 2/2020 | Sakoda |
| 2020/0052997 A1 | 2/2020 | Ramanathan et al. |
| 2020/0100138 A1 | 3/2020 | Wu et al. |
| 2020/0169355 A1 | 5/2020 | Mcilroy |
| 2020/0403866 A1 | 12/2020 | Hayes et al. |
| 2020/0403877 A1 | 12/2020 | Hayes et al. |
| 2020/0404513 A1 | 12/2020 | Hayes et al. |
| 2021/0014148 A1 | 1/2021 | Heitz et al. |
| 2021/0014770 A1 | 1/2021 | Qi et al. |
| 2021/0194766 A1 | 6/2021 | Crafts et al. |
| 2021/0243173 A1 | 8/2021 | D'Alessandro et al. |
| 2021/0352002 A1 | 11/2021 | Knode |
| 2022/0015172 A1 | 1/2022 | Xu et al. |
| 2022/0053407 A1 | 2/2022 | Zhou |
| 2022/0191309 A1 | 6/2022 | Zhi et al. |
| 2022/0210715 A1 | 6/2022 | Deixler et al. |
| 2022/0351628 A1 | 11/2022 | Ali et al. |
| 2023/0284363 A1 | 9/2023 | Baker et al. |

FOREIGN PATENT DOCUMENTS

| | | |
|---|---|---|
| CN | 109691183 A | 4/2019 |
| CN | 109788500 A | 5/2019 |
| EP | 1443722 A2 | 8/2004 |
| EP | 1594266 A1 | 11/2005 |
| EP | 3048762 A1 | 7/2016 |
| KR | 20120060576 A | 6/2012 |
| KR | 20190058352 A | 5/2019 |
| WO | WO 2012048585 A1 | 4/2012 |

OTHER PUBLICATIONS

Moon, et al., "Energy Efficient Data Collection in Sink-Centric Wireless Sensor Networks: A Cluster-Ring Approach", Computer Communications, Elsevier Science Publishers BV, Amsterdam, NL, vol. 101, Jul. 4, 2016, pp. 12-25.

Thread Group, Inc., "Thread Specification", Revision 1.1.1, Feb. 13, 2017, 348 pages.

Parsa, et al., "Semantically Intelligent Distributed Leader Election(SIDLE) Algorithm for WSAN Part of IoT Systems", Aug. 23, 2019, 8 pages.

Saedi, et al., "Generation of realistic signal strength measurements for a 5G Rogue Base Station attack scenario", Jul. 2020, 8 pages.

Kim, et al., "Scalable Network Joining Mechanism in Wireless Sensor Networks", IEEE, Research Gate, Jan. 2012, 5 pages.

Lee, et al., "Monitoring of Large-Area IoT Sensors Using a LoRa Wireless Mesh Network System: Design and Evaluation", IEEE, ResearchGate, Mar. 2018, 12 pages.

Yoo, et al., "A2S: Automated Agriculture System Based on WSN", IEEE, Research Gate, Jul. 2007, 6 pages.

* cited by examiner

LINK QUALITY AND LINK COST

| Link Quality | Link Cost |
|---|---|
| 0 | Unknown/Indefinite |
| 1 | 4 |
| 2 | 2 |
| 3 | 1 |

NETWORK FORMATION FOR A LOAD CONTROL SYSTEM

CROSS-REFERENCE TO RELATED APPLICATIONS

This application is a continuation of U.S. Non-Provisional patent application Ser. No. 16/907,221, filed Jun. 20, 2020, which claims the benefit of U.S. Provisional Patent Application No. 62/864,646, filed Jun. 21, 2019, U.S. Provisional Patent Application No. 62/879,122, filed Jul. 26, 2019, U.S. Provisional Patent Application No. 62/880,593, filed Jul. 30, 2019, U.S. Provisional Patent Application No. 62/884,986, filed Aug. 9, 2019, U.S. Provisional Patent Application No. 62/910,059, filed Oct. 3, 2019, U.S. Provisional Patent Application No. 62/942,699, filed Dec. 2, 2019, each of which are hereby incorporated by reference in their entireties.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The control devices may receive messages, which may include load control instructions, for controlling a corresponding electrical load. For example, the messages, which may include load control instructions, may be generated in response to a user input or interaction at one or more of the input devices. The control devices may be capable of directly controlling an electrical load. The input devices may be capable of indirectly controlling the electrical load via the load control device. Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. And the control devices may communicate (e.g., send and/or receive messages) in a network using radio frequency (RF) communications, such as ZIGBEE communications, BLUETOOTH communications, and/or THREAD communications, and/or any suitable internet of things communications network. In addition, or in conjunction, the RF communications may be performed via a proprietary protocol, such as the CLEAR CONNECT™ protocol.

SUMMARY

A control device may be configured to delay an attachment procedure while attachment messages are being transmitted over the network. The control device may be configured to initiate an attachment procedure with a router device on a network at the end of a back-off period of time. For example, the attachment procedure may include transmitting attachment messages (e.g., parent request messages) that are configured to establish a parent-child link between the control device and the router device and enable the control device to transmit and receive messages over the network through the router device. During the back-off period of time, the control device may determine that an attachment message is received from another control device on the network. And, if an attachment message (e.g., a parent request messages and/or a link request message) is received from another control device, the control device may increase the back-off period of time (e.g., delaying when the control device initiates its attachment procedure).

During the back-off period of time, the control device may count the number of parent request messages that are received while the back-off timer is running, and the number of link-request messages that are received while the back-off timer is running. And when the back-off timer expires, the control device may restart the back-off timer with an amount of time that is dependent upon the number of parent request messages that are received and the second number of link-request messages that are received. For example, the amount of time that the back-off timer is restarted with may be calculated as a weighted sum of the number of parent request messages that are received and the number of link-request messages that are received. Further, the second number of link-request messages may be weighted greater than the number of parent request messages in the weighted sum.

The control device may become the leader device of a network when a response message to the transmitted attachment message is not received. In addition, the control device may attach to at least one child device (e.g., become a parent device of the attached child device). The control device may also determine whether a higher-priority network partition exists in the network. If a higher-priority partition exits in the network, the control device may determine not to respond to router upgrade request messages from the at least one child device. For example, if a higher-priority partition exits in the network, the control device may determine not to transmit an acknowledgement messages in response to unicast messages received from the at least one child device.

A control device may be configured to initiate the attachment procedure at the end of a coordinated startup time from when the control device is powered up. The control device may further determine the coordinated startup time based on a unique identifier assigned to the control device (e.g., assigned during a claiming procedure). The coordinated startup time may be unique for the control device. The coordinated startup time may be a period of time reserved for the control device to initiate an attachment procedure.

BRIEF DESCRIPTION OF THE DRAWINGS

FIG. 2F is a table that illustrates example link costs that may correspond to different link qualities.

DETAILED DESCRIPTION

Figure 1:
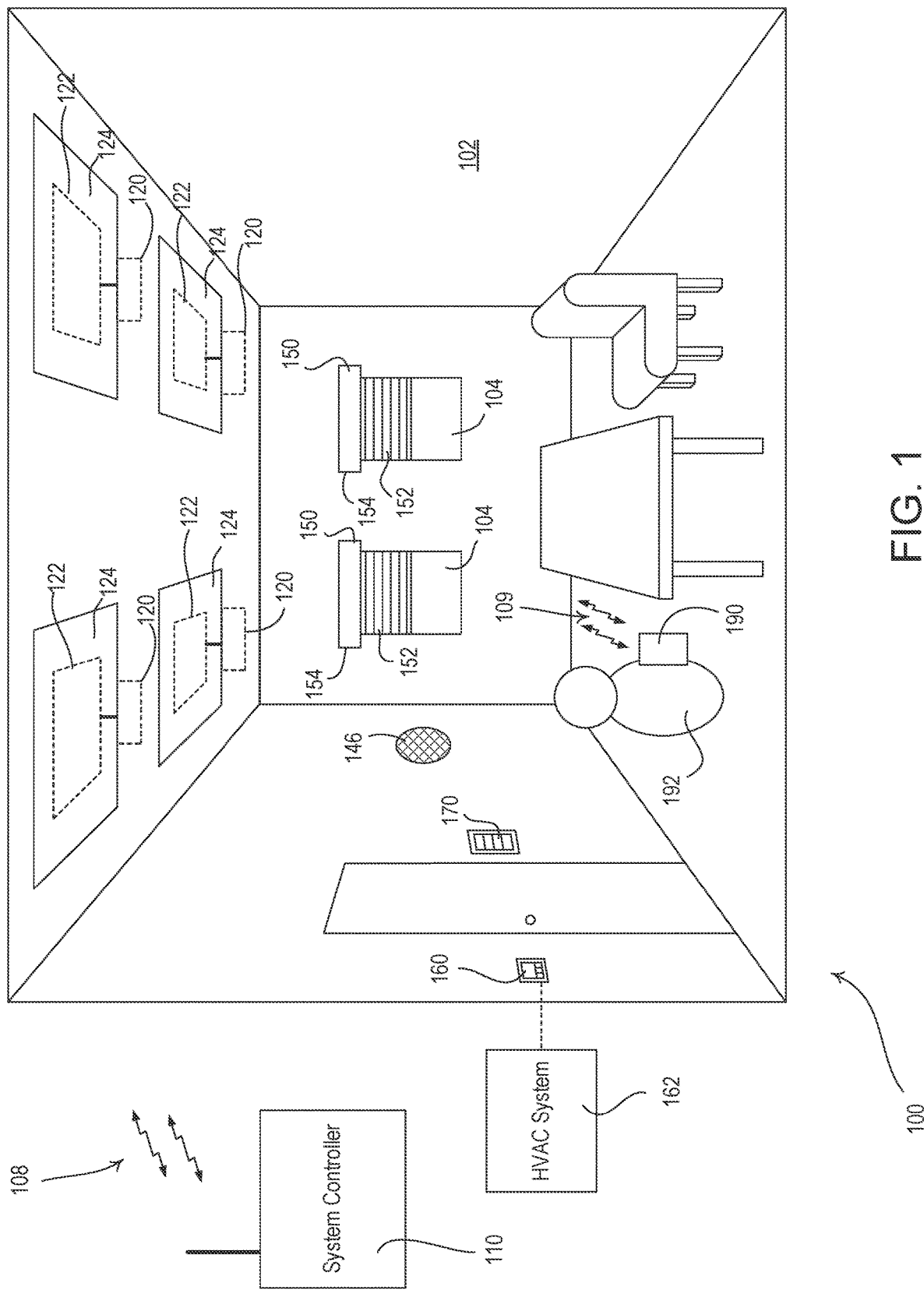
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit messages in response to user inputs, occupancy/vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages directly to the control-target devices. In addition, the load control system 100 may comprise a system controller 110 (e.g., a central processor or load controller) operable to communicate messages to and from the control devices (e.g., the control-source devices and/or the control-target devices). For example, the system controller 110 may be configured to receive messages from the control-source devices and transmit messages to the control-target devices in response to the messages received from the control-source devices. The control-source and control-target devices and the system controller 110 may be configured to transmit and receive the RF signals 108 using a proprietary RF protocol, such as the ClearConnect protocol. Alternatively, or in conjunction with, the RF signals 108 may be transmitted using a different RF protocol, such as, a standard protocol, for example, one of WIFI, ZIGBEE, Z-WAVE, THREAD, KNX-RF, ENOCEAN RADIO protocols, or a different proprietary protocol.

The load control system 100 may comprise one or more load control devices, e.g., lighting control device 120, for controlling a lighting load, e.g., lighting loads 122 in lighting fixture 124. For example, the lighting control devices 120 may comprise light-emitting diode (LED) drivers and the lighting loads 122 may comprise LED light sources. While each lighting fixture 124 is shown having a single lighting load 122, each lighting fixture 124 may comprise one or more individual light sources (e.g., lamps and/or LED emitters) that may be controlled individually and/or in unison by the respective lighting control device 120.

The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive messages via the RF signals 108 (e.g., from the system controller 110) and adjust the position of the respective window treatment fabric 152 in response to the received messages. For example, the motorized window treatments may be battery-powered. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREAT- MENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive messages via the RF signals 108 (e.g., from the system controller 110) and adjust heating, ventilation, and cooling in response to the received messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170. The input devices may be fixed or movable input devices. The system controller 110 may be configured to transmit one or more messages to the load control devices (e.g., the lighting control device 120, the motorized window treatments 150, and/or the thermostat 160) in response to the messages received from the remote control device 170. The remote control device 170 may be configured to transmit messages directly to the lighting control device 120, the motorized window treatments 150, and the temperature control device 160.

The remote control device 170 may be configured to transmit messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 190 may be configured to transmit messages to the system controller 110, for example, in one or more Internet Protocol packets. For example, the mobile device 190 may be configured to transmit messages to the system controller 110 over the LAN and/or via the internet. The mobile device 190 may be configured to transmit messages over the internet to an external service (e.g., If This Then That (IFTTT) service), and then the messages may be received by the system controller 110. The mobile device 190 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. The RF signals 109 may be the same signal type and/or transmitted using the same protocol as the RF signals 108. Alternatively, or additionally, the mobile device 190 may be configured to transmit RF signals according to another signal type and/or protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 or other network device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., lighting control device 120, the motorized window treatments 150, and/or the thermostat 160). The load control database may comprise association information that identifies associations between the load control devices and the input devices (e.g., the remote control device 170, etc.). The associations may comprise device identifiers that are stored together, such that devices may recognize the identifiers of associated devices to enable communication between the devices. Devices may recognize the stored identifiers of associated devices and communicate messages to and/or identify messages received from the associated devices. The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The control devices of the load control system may communicate with each other via a network. For example, the control devices may join the network by initiating a joining procedure. During the joining procedure, the control devices may send and receive joining messages, and the joining messages may be used to exchange credentials with a network commissioning device. After exchanging credentials, a control device may be provided with a network key, which may enable the control device to communicate over the network. The control devices may each then attempt to attach to another device (e.g., a router device) joined to the network, forming a mesh network. For example, a control device may attempt to attach to another device joined to the network by initiating an attachment procedure with the other device. As described herein, a control device may send and/or receive attachment messages to the other device on a network during the attachment procedure. And based the type of attachment message transmitted during an attachment procedure, the control device may establish a link (e.g., parent-child link, auxiliary parent link, router-to-router link) with the router device. For example, the control device may transmit attachment messages configured to establish a parent-child link (e.g., parent-request messages and/or parent-response messages) during an attachment procedure to establish a parent-child link with the router device, such that the control device may become a child device of the router device and the router device may become a parent device of the control device. Similarly, the control device may transmit attachment messages configured to establish an auxiliary parent link (e.g., link-request messages and/or link-response messages) during an attachment procedure to establish an auxiliary parent link with the router device. After establishing a parent-child link, the control device may transmit and receive messages over the network through the other device. As described herein, the router device that a respective control device is attached to may be also be referred to as the parent device of the control device.

A control device may also attach to and establish links with additional devices (e.g., router devices) joined to a network. For example, a control device may initiate an attachment procedure to attach to an additional router device (e.g., a router device that is not the parent device of the control device). As a result of the attachment procedure, the control device may establish an auxiliary parent link with the other router device, such that the other device becomes an auxiliary parent of the control device. And during the attachment procedure, for example, the control device may send and receive a number of attachment messages configured to establish an auxiliary parent link, such as link-request messages or link-response messages, to/from the other router device. Control devices may receive and process messages from the auxiliary parent devices that they are attached to (e.g., in addition to the parent device they are attached to), which may increase the reliability of the network information received in the network. As described herein, the process of control devices joining a network (e.g., via a joining procedure), and/or attaching to another device already joined to the network (e.g., via an attachment procedure) may be referred to as network formation.

During network formation, as described herein, a plurality of control devices may join a network and attach to other devices already joined to the network (e.g., via an attachment procedure with another device). The plurality of control may, however, each initiate their respective attachment procedures, which includes sending and receiving attachment messages over the network at the same or substantially the same time. As a result, multiple control devices may transmit attachment messages on the network at the same or substantially the same time. When multiple devices send messages over the network at the same or substantially the same time, the messages may collide with each other and/or result in the messages failing to be received. Message collisions during network formation may, for example, cause the attachment messages to fail to be received, delaying network formation and installation or operation of the load control system.

As the scale of a network installation increases (e.g., the number of devices attached to the network), the number of collisions that occur during network formation may increase. In addition, after a control device continually fails to attach to the network (e.g., as a result of message collisions and/or lack of connectivity with an already formed network), the device may attempt to form another network (e.g., a network partition). The network partitions may communicate in parallel with one another, but may not communicate with each other (e.g., at least for a period of time and/or until the network partitions combine into a single network partition). For example, the devices attached to a first network partition may not be able to communicate with the device attached to a second network partition. As communication links are established between devices in a location, each network may grow and one or more devices in one network may join the other network. The devices that leave a network may cause undue processing delay for the devices that remain on the network, as the devices reconfigure or discover their roles in the network.

Figure 2A:
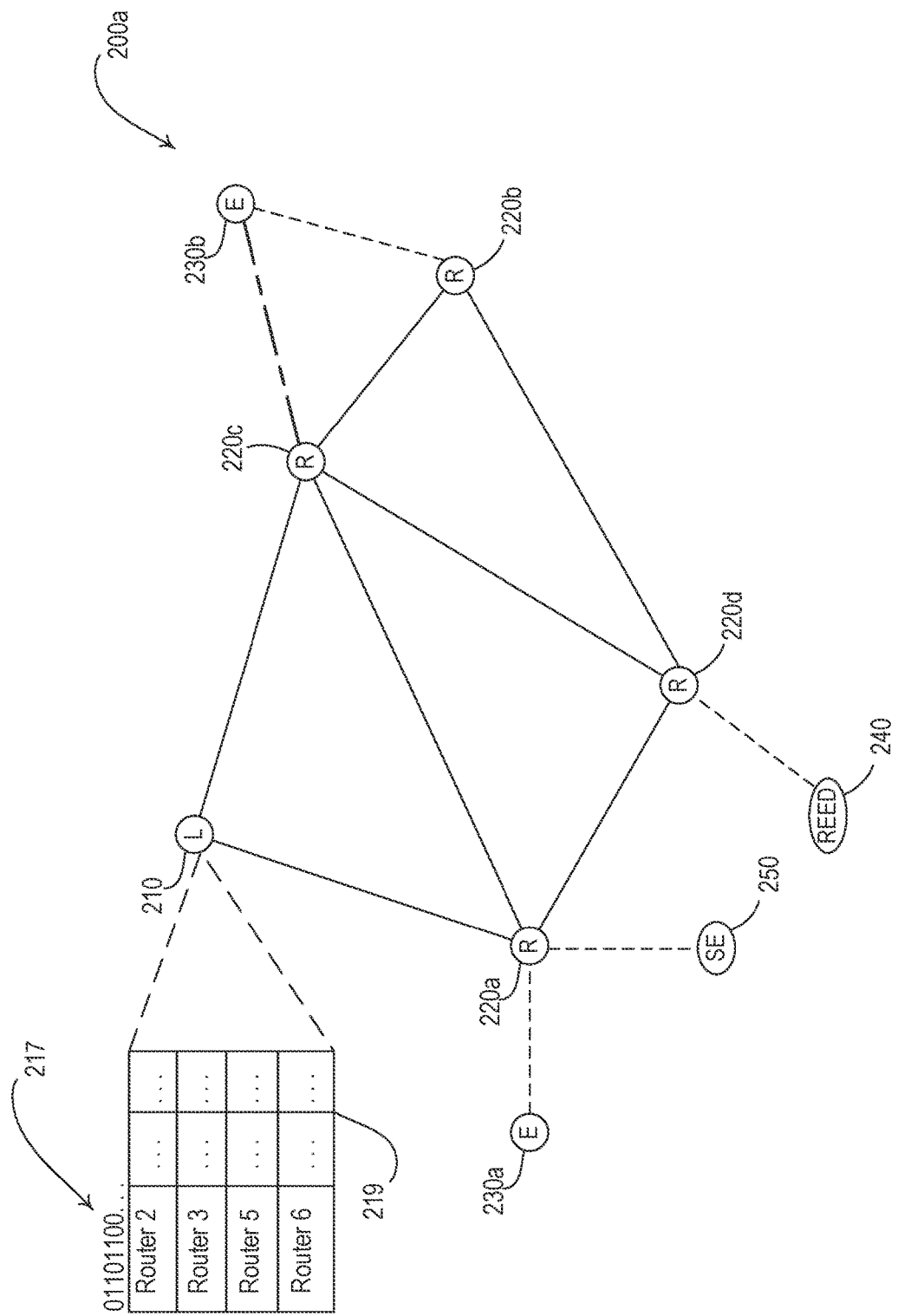
FIG. 2A is a diagram of an example network that may allow for communication between devices in the load control system of FIG. 1.

FIG. 2A is an illustration of an example network 200a that may allow for communication between control devices in a load control system (e.g., the load control system 100). The network 200a may include any suitable network to facilitate communications in a load control system or an Internet of Things (IoT) environment. For example, the network 200a may be a mesh network, such as a THREAD network. The various control devices of the load control system 100 may communicate with each other via the network 200. As shown in FIG. 2A, the network 200a may comprise a single network partition. In addition, the network 200a may be an example of a network partition (e.g., a subnetwork or subnet) within a larger network. For example, the network 200a may be an example of a network partition within a larger network composed of a plurality of network partitions. The network 200a is an example network and the techniques described herein may be applied to other networks, for example, that include more control devices or less control devices than the network 200.

A network, such as the network 200a, may be used to facilitate communications for the devices that are joined to the network. The process of these devices joining the network and/or forming their respective links to one another may be referred to herein as network formation. As described herein, the devices that are joined to a network may form links with one another during network formation. For example, a control device may attach to another device (e.g., a router device) and establish a parent-child link with the other device. After attaching to the router device (e.g., establishing a parent-child link between the device and the router device), the device may send messages to other devices in the network through the router device and receive messages comprising network information through the router device. The circled nodes of FIG. 2A may represent devices that are attached to other devices on the network 200a (e.g. the various control devices of the load control system 100). A control device that is attached to at least one other control device on the network 200a may communicate with the other control devices (e.g., that are attached to another control device on the network 200a). Communication within the network 200a may be facilitated by the links (e.g., attachments) established within the network 200a. Referring to FIG. 2A, the links between the devices may be indicated by lines (e.g., solid and dashed lines) that connect the respective control devices.

The control devices that are joined to the network 200a may take on and/or be assigned a respective role in the network. For example, the roles may include: a leader device (e.g., leader device 210), a router device (e.g., router devices 220a-220d), an end device (e.g., end devices 230a and 230b), a router eligible end device (REED) (e.g., router eligible end device 240), and/or a sleepy end device (e.g., sleepy end device 250). The role of a control device may indicate the functions and/or capabilities of the control device with respect to the network 200a. In addition, the role of a control device may be based on the control device's attachments.

As illustrated in FIG. 2A, the network 200a may include a leader device 210 and one or more router devices 220a-220d. The leader device 210 may manage other control devices on the network 200. For example, the leader device 210 may assign and maintain router identifiers (e.g., router IDs) for each of the router devices 220. For example, each of the router devices 220a-220d may be assigned a unique router identifier. The leader device 210 may assign and maintain the roles of other devices. The leader device 210 may be configured as the gateway for the network 200a. For example, the leader device may be a control device that facilitates communication (e.g., routes and receives messages to and from) between the network 200a and other networks or network partitions. Referring to FIG. 1, a system controller (e.g., the system controller 110 shown in FIG. 1) may be an example of a leader device 210. In addition, a control device within a load control system that is capable of being assigned to the role of a router device may be assigned to the role of the leader device.

The leader device 210 may be attached to multiple router devices (e.g., more than 30 router devices) by establishing one or more router-to-router links, as illustrated by the solid lines connected to the leader device 210. The leader device 210 may operate as a router device. The router devices 220a-220d on the network 200a (e.g., attached to the leader device 210 on the network 200a) may also establish router-to-router links with each other and thus in communication with each other, for example, to form a mesh network. As described herein, router-to-router links may be establish by an attachment procedure that includes transmitting attachment messages that are configured to establish router-to-router link (e.g., link request messages and/or link response messages). The router devices 220a-220d may be in communication with one another (e.g., as indicated by the solid lines connecting the router devices 220a-220d). The router devices 220a-220d may be in communication with the leader device 210, either directly or through one or more other router devices (e.g., as indicated by the solid lines connecting the leader device 210 to the router devices 220a and 220c). The router devices 220a-220d may receive and route messages to other devices on the network 200a (e.g., the end devices 230a, 230b, the router eligible end device 240, and/or the sleepy end device 250). For example, the router devices 220a-220d may receive and/or transmit messages between devices, or between each other for communicating messages received from an attached device to another device attached to another router device. Referring now to the load control system 100, a control device that is, for example, externally powered (e.g., a control device that is not battery powered) may be assigned to the role of a router device, such as, the system controller 110, the lighting control device 120, the motorized window treatments 150, and/or the thermostat 160.

The network 200a may include one or more end devices 230a, 230b (e.g., also referred to herein as full or minimal end devices). The end devices 230a, 230b may be attached to another device (e.g., a parent device, such as the leader device 210 and/or the router devices 220a, 220b, 220c, 220d) on the network 200a and may transmit and/or receive messages via the attached leader device and/or router device. As described herein, end devices 230a, 230b may attach to another device by using an attachment procedure. For example, the end device may perform an attachment procedure to establish a parent-child link (e.g., as illustrated by the dashed lines in FIGS. 2A to 2E) by transmitting attachment messages that are configured to establish parent-child links, such parent request messages and parent response messages. Also, or alternatively, end devices may perform an attachment procedure to establish an auxiliary parent link (e.g., as illustrated by the long and short dashed lines in FIGS. 2A to 2E) by transmitting attachment messages that are configured to establish auxiliary parent links, such link request messages and link response messages. For example, as illustrated in FIG. 2A, end device 230b may establish an auxiliary parent link with router device 220c (e.g., as shown by long and short dashed lines). Though two end devices 230a, 230b are shown in FIG. 2A, and each is attached to different router devices, each router device 220a-220d may support multiple end devices (e.g., more than 500 end devices). The system controller 110, input devices (e.g., the remote control device 170), and/or load control devices (e.g., the lighting control device 120, the motorized window treatments 150, and/or the thermostat 160) may be examples of the end devices 230a, 230b.

Referring again to FIG. 2A, the network 200a may include the router eligible end device 240. The router eligible end device 240 may be an end device that is capable (e.g., hardware capable and/or software capable) of becoming a leader device and/or a router device. In certain situations, the role of the router eligible end device 240 may be updated to a leader device and/or a router device. For example, when the router eligible end device 240 identifies itself as being within communication range of an end device attempting to join the network 200a, the router eligible end device 240 may upgrade itself to the role of a router device, allowing the end device to attach to the router eligible end device 240. The router eligible end device 240 may transmit and/or receive messages via the attached router device 220d. As shown in FIG. 2A, the router eligible end device 240 may be one of the end devices that is attached to the router device 220d. The system controller 110, the lighting control device 120, the motorized window treatments 150, and/or the thermostat 160 may be examples of the router eligible end device 240. Referring now to the load control system 100, a control device that is, for example, externally powered (e.g., a control device that is not battery powered) may be assigned to the role of a router eligible end device, such as, the system controller 110, the lighting control device 120, the motorized window treatments 150, and/or the thermostat 160.

The network 200a may also include the sleepy end device 250. The sleepy end device 250 may include, or may be similar to, an end device. For example, the sleepy end device 250 may be an end device that is powered by a finite power source (e.g., a battery). The sleepy end device 250 may be aware of its role as a sleepy end device based on, for example, an indication that is stored at the sleepy end device 250. Communication with the sleepy end device 250 may be performed such that the finite power source is preserved and/or is efficiently consumed. For example, the sleepy end device 250 may periodically disable their respective communication circuits in between message transmissions. The sleepy end device 250 may transmit and/or receive messages via an attached router device 220a. As shown in FIG. 2A, the sleepy end device 250 may be one of the end devices that is attached to the router device 220a. Input devices (e.g., the remote control device 170) and/or load control devices (e.g., the motorized window treatments 150 when battery powered) may be examples of the sleepy end device 250. In addition, sensors and/or battery power devices may be examples of the sleepy end device 250.

The leader device 210 may update the roles (e.g., or confirm role updates) of the devices communicating within the network 200a, for example, based on changes to the network 200a. In an example, a control device may be assigned to a certain role when the device attaches to the network 200a, and the leader device 210 may update the role of the device based on changes in network conditions. Changes in network conditions may include: increased message traffic, attachment of other devices, changes in signal strength, etc. Updates to the assigned role of a control device may be based on the capabilities of the device. For example, the leader device 210 may update the role of a control device from a router eligible end device to a router device (e.g., as a router eligible end device is an end device that is eligible to perform the role of a router device). The leader device 210 may update the role of a control device to a router device by assigning a router identifier (ID) to the device.

As the leader device 210 updates the roles of the devices in the network 200, the leader device may maintain the number of router devices in the network 200a and/or the router identifiers in use in the network 200. For example, the leader device 210 may store and/or maintain a bitmap 217 that may be used to indicate the number of routers and/or the router identifiers being used in the network 200. The bitmap 217 may include a number of bits that each correspond to a different router identifier being used in the network 200. In an example, the leader device 210 may support 64 router devices and the leader device 210 may store a 64-bit bitmap for tracking the router identifiers in use in the network 200. Each bit in the bitmap may indicate whether a router identifier is identified by the leader device 210 as being used (e.g., with a value of "1") or unused (e.g., with a value of "0"). The leader device 210 may determine that a control device should be upgraded to a router device and, so long as a router identifier is available, assign a router identifier to the router device. The leader device 210 may downgrade router devices (e.g., to end devices) or remove router devices from the network 200. As router devices are added or removed, the bitmap 217 may be updated to indicate the number of router devices and/or router identifiers that are in use in the network 200.

The leader device 210 may send the bitmap 217 to the other router devices in the network 200. Each router device, including the leader device 210, may maintain network information about each of the router devices identified as being used in the network 200. For example, each router device may maintain network information about each of the router devices in a router table, such as the router table 219. For example, the network information in the router table 219 may identify the router devices in the network 200a and the quality of communications that a corresponding router device has with the other router devices being maintained in the router table stored locally thereon. Each router table, such as the router table 219, may include a row for each router identifier indicated in the bitmap 217. Each router device in the network, including the leader device 210, may perform communications on the network 200a based on the network information being stored and maintained in the locally stored router table. For example, a router device, such as the router devices 220a-220d and/or the leader device 210, may transmit messages differently within the network 200a based on the quality of the communications with corresponding router devices identified in the router table stored locally thereon.

The control devices attached to the network 200a may further operate as parent devices and/or child devices. Leader devices (e.g., the leader device 210) and router devices (e.g., the router devices 220a-220d) that are attached to one or more end devices (e.g., the end devices 230a, 230b, the router eligible end device 240, and/or the sleepy end device 250) may operate as parent devices. End devices (e.g., the end devices 230a, 230b, the router eligible end device 240, and/or the sleepy end device 250) that are attached to a leader device (e.g., the leader device 210) or a router device (e.g., one of the router devices 220a-220d) may operate as child devices. As a parent device, the leader device 210 and the router devices 220a-220d may each be attached to one or more child devices (e.g., one or more of the end devices 230a, 230b, the router eligible end device 240, and/or the sleepy end device 250, as described herein). In addition, the leader device 210 and the router devices 220a-220d may store and/or relay messages that are sent by their respective attached child devices. For example, the leader device 210 and the router devices 220 may receive messages from their respective child devices and route the received messages to the intended recipient device (e.g., either directly to the intended recipient device, via the respective parent device of the intended recipient device, and/or to a router device or leader device this is on the path to the intended recipient). Similarly, the leader device 210 and the router devices 220a-220d may receive messages intended for their respective child device and route the message to the appropriate child device. The parent of a respective sleepy end device may schedule communications with the sleepy end device when the communication circuit of the sleepy end device is enabled.

As indicated in FIG. 2A, the link (e.g., attachment) between a child device and a respective parent device may be indicated by dashed lines. For example, the router device 220a may be configured as the parent device of the end device 230a and the sleepy end device 250. Similarly, the router device 220b may be configured as the parent device of the end device 230b. The router device 220a may receive messages intended for the end device 230a and forward the message to the end device 230a. As the router device 220a is configured as the parent device of the end device 230a, the end device 230a may transmit messages to the router device 220a, and the router device 220a may route the message to the intended recipient. For example, when the end device 230a intends to transmit a message to the end device 230b, the end device 230a may initially transmit the message to the router device 220a. The router device 220a may route the message to the router device 220b (e.g., the parent device of the end device 230b). For example, the router device 220a may route the message to router device 220b via router device 220c or router device 220d, and the router device 220b may then forward to message to the end device 230b. In addition, as described herein and illustrated in FIG. 2A, the router device 220a may route the message to the end device 230b via the router device 220c (e.g., the auxiliary parent device of the router device 230b).

Child devices may be configured to transmit unicast messages to their respective parent device. A control device may transmit unicast messages to another control device in the network directly or via hops through other devices in the network. Each unicast message may be individually addressed to another control device by including a unique identifier of the control device to which the unicast message being transmitted. Control devices may generate separate unicast messages for each control device with which they are communicating and address the unicast messages to each control device independently. The unicast messages may also include the unique identifier of the control device that is to receive the unicast message. A control device may determine that it is the intended recipient of a unicast message by identifying its own unique identifier in the unicast message.

Messages may be sent in the network using multicast messages and/or broadcast messages. Multicast messages may be sent to a group of control devices in the network. A multicast message may include a group identifier. The control devices that are members of the group may recognize the group identifier and process the message accordingly. Broadcast messages may be sent to each control device in the network capable of receiving the message. The broadcast messages may include an indication that the message is a broadcast message (e.g., a broadcast address). Each device that receives a broadcast message may process the message accordingly. A network may use either multicast messages or broadcast messages, and the two terms may be used interchangeably herein.

The messages transmitted by a child device to its respective parent device may include an indication (e.g., a unique identifier) of the intended recipient, and the parent device may route the message accordingly. Referring again to FIG. 2A, the end device 230a may transmit messages to the router device 220a (e.g., the parent device of the end device 230a), and the router device 220a may route the message based on the intended recipient. For example, if the end device 230a transmits a message intended for the end device 230b, the router device 220a may route the message to the router device 220b (e.g., the parent device of the router eligible end device 230b) via the router device 220c or the router device 220d. For example, if the router device 220a routes the message via the router device 220d, the router device 220d may forward the message to the router device 220b, which may forward the message to the end device 230b. The router device 220a may identify that the router device 220b is the parent device that the end device 230b is attached to via a lookup table. As illustrated in FIG. 2A, multiple paths may exist to route messages over the network 200a, and router devices may identify the shortest path (e.g., lowest number of hops) to transmit messages to a respective device.

Child devices may be configured to communicate with an auxiliary parent device (e.g., configured to communicate with more than one parent device). Referring to FIG. 2A, for example, the end device 230b may be configured to communicate with (e.g., transmit messages to and receive messages from) a parent device (e.g., also referred to as primary parent device), such as the router device 220b. The end device 230b may also be configured to communicate with (e.g., receive messages from) an auxiliary parent device, such as the router device 220c (e.g., as illustrated by the long and short dashed lines in FIG. 2A). A child device may receive unicast messages from its parent device. A child device may also receive multicast messages (e.g. broadcast messages) from its parent device and/or one or more auxiliary parent devices, which may increase the efficiency and reliability of child device receiving the messages. For example, the child device may receive general network advertisement messages via an auxiliary parent device. The number of auxiliary parent devices that a child device is attached to may be limited to a threshold number of auxiliary parent devices (e.g., 3, 5, 10, etc.).

A child device may be attached to a single parent device (e.g., also referred to as primary parent device herein) and one or more auxiliary parent devices. For example, the child device may transmit and/or receive unicast messages over the network through the parent devices. Additionally, the child device may process the messages received from the one or more auxiliary parent devices. The number of auxiliary parent devices that a respective child device is attached to may be limited to a threshold number of auxiliary parent devices, which may be pre-defined and/or configured. A child device may attach to an auxiliary parent device by transmitting attachment messages configured to an establish auxiliary parent link with a router device (referred to herein as a link-request messages or link-response messages) to the auxiliary parent device. For example, referring to FIG. 2A, the end device 230b may have transmitted a link-request message to router 220c. The link-request message may be used to request a communication link between two devices. In response to receiving the link-request message, the router device 220c may transmit a message (referred to herein as a link accept message) to the end device 230b. The link accept request message may include information that allows the respective child device to decrypt messages from the auxiliary parent device (e.g., a frame counter). As described herein, when a child device is attached to an auxiliary parent device, the child device may receive multicast messages (e.g., multicast messages comprising network information) via the auxiliary parent device. For example, referring to FIG. 2A, the end device 230b may receive multicast messages via the parent device (e.g., router device 220b) and the auxiliary parent device (e.g., router device 220c), which may increase the efficiency and reliability of the child device 230b receiving multicast messages.

A child device may receive advertisement messages from a router device other than the parent device of the child device or a router device other than an auxiliary parent device of the child device. For example, the router device may transmit advertisement messages to enable other control devices to determine that a network has been formed and that the control device hearing the advertisement message may attempt to attach to the router device (e.g., to communicate via the network). Control devices may receive and track the advertisement messages transmitted by router devices to determine whether the device is able to communicate via the network. Also, or alternatively, the advertisement messages transmitted by a respective router device may provide other router devices with the ability to measure a communication metric (e.g., RSSI) between the respective routers attached to the network (e.g., which the routers may use to update their respective routing tables or routing information). For example, the communication metric may indicate the quality of a communication link between two devices, which may be used. As described herein, the router devices may determine the quality of the communication links between the respective router devices by measuring a communication metric, such as a received signal strength magnitude (e.g., an average received signal strength magnitude) of the advertisement messages transmitted between the router devices. For example, the received signal strength magnitude may be determined by measuring a received signal strength indicator (RSSI) of the received advertisement messages.

Certain messages may be propagated and broadcast by multiple devices in the network 200a, which may increase the likelihood that a respective child device hears a message. For example, rather than sending multiple transmissions, multicast messages that are substantially similar (e.g., messages that include the same load control instructions that are sent to multiple load control devices) may be broadcasted. Referring again to the load control system 100, an actuation of a button of the remote control device 170 may adjust the intensity of multiple lighting loads (e.g., the lighting load 122 and the plug-in lighting load 142) and a message may be broadcasted to adjust the respective lighting loads. In addition, the devices that receive the broadcast transmission may be configured to process and repeat (e.g., forward the message over the network or otherwise acting as a repeater) the message in response to receiving the broadcast transmission.

Child devices may create and maintain an auxiliary parent table. The auxiliary parent table may include a list of auxiliary parent devices with which a respective child device is configured to communicate (e.g., attached to via an auxiliary parent link and/or able to process messages received from). In addition, the auxiliary parent table may include an indication of a communication metric that indicates the quality of a communications link between the child device and each of the auxiliary parent devices of the child device, such as a received signal magnitude (e.g., an average RSSI). For example, the auxiliary parent table may include a rolling average of the communication metric for each of the auxiliary parent devices of the child device. Child devices may similarly create and/or maintain a router table. The router table may include the routers that a respective child device has received messages from (e.g., advertisement messages). In addition, the router table may include an indication of the a communication metric for messages received from each of the routers in the router table. Also, or alternatively, child devices may maintain a generic router table. The router table may include each of the routers that a respective child device has received messages from and a received signal strength indicator for each of the respective routers. The router table may also include an indication of whether a respective router is a parent of the child device or an auxiliary parent of the child device. As used herein, the term auxiliary parent table may refer to a separate table from the router table or a subset of the router table that include the routers that are attached as auxiliary parent devices of the child device.

As described herein, the network 200a may allow for communication between devices in a load control system (e.g., the load control system 100 shown in FIG. 1). The end devices 230a, 230b may include load control devices (e.g., control-target devices) and/or input devices (e.g., control-source devices) that communicate with other devices in the load control system. For example, the end device 230a may communicate with another end device in the load control system via RF communications.

Referring to FIG. 1, the remote control device 170 may operate as an end device or a sleepy end device for communicating messages comprising indications of user input and/or control instructions for controlling another end device (e.g., lighting control device 120, the motorized window treatment 150, and/or the thermostat 160). The remote control device 170 may communicate via one or more intermediary devices, such as a leader device and/or a router device, for example. The leader device and/or the router device may communicate with one or more other leader devices and/or router devices the network to route the messages to the other end device (e.g., the lighting control device 120, the motorized window treatment 150, and/or the thermostat 160) for performing load control.

A control device may attach to another control device on a network or network partition (e.g., the network 200a shown in FIG. 2A) to enable the device to communicate (e.g., transmit and/or receive messages) via the network. A control device may initiate an attachment procedure to another control device on a network by transmitting one or more attachment messages configured to establish a parent-child link, such as a parent-request message (e.g., a multicast parent-request message) to discover potential parent devices. A parent-request message, for example, may be transmitted by a control device to discover and/or attach to a parent device (e.g., router devices and/or leader devices). A control device may transmit the parent-request message as a multicast message, for example, to identify devices that are attached to a network that can act as a parent device of the control device.

Router devices (e.g., the leader device 210 and/or the router devices 220 of the network 200a) may respond to the attachment messages they receive. For example, a router device that receives a parent-request message (e.g., a multicast parent-request message) may respond by transmitting a parent-response message. For example, router devices that receive a multicast parent-request message may each transmit a parent-response message (e.g., as a unicast message) to the control device that transmitted the parent-request message. A parent-response message may indicate that the control device that transmits the parent-response message is available to act as a parent device. Accordingly, a control device that transmits a parent-request message may receive a plurality of responses to the parent-request message and determine a parent to attach to based on the received parent-response messages. The control device transmitting the parent-request message may identify a communication metric, such as a received signal strength magnitude (e.g., RSSI), associated with the response messages and attempt attachment to the parent device having the largest received signal strength indicator for the response message.

As multiple control devices transmit parent-request messages as multicast messages within the same period of time, the parent devices may each receive multiple parent-request messages at the same time or within a short time period. The number of parent-request messages being received at a parent device may prevent the parent devices from being able to fully process attachment messages (e.g. received previously or subsequently). In addition, the parent-response messages transmitted by each of the parent devices that receive the parent-request message may be transmitted at the same or substantially the same time. The number of parent-request messages and parent-response messages that are transmitted within the same period of time may congest the network due to the number of control devices in the network (e.g., each leader device may support more than 30 router devices and each router device may support more than 500 end devices) and/or cause messages to collide with one another, which may cause one or more of the parent-request messages or parent-response messages to fail to be properly received. When a control device attempting to attach to another control device on the network fails to receive a parent-response message, the control device may fail to attach to the other control device on the network, which may increase the amount of time for formation of the network to complete. When each of the devices in the load control system are provided with power, many control devices may attempt to attach to other control devices on the network by transmitting the parent-request messages at the same time or within the same time period.

A control device attempting to attach to router devices on a network may be configured to delay attachment to allow for other control devices to attach to router devices on the network. As described herein, when control devices attempt to attach to router devices on a network, a plurality of attachment messages may be transmitted at the same or substantially the same time, which may increase the likelihood of message collisions on the network. Accordingly, a control device attempting to attach to a router device on the network may delay attachment when the control device determines that another control device is attempting to attach to router devices on the network. For example, the control device may delay attachment by adding time to a back-off timer after the expiration of which the control device may attempt to attach to a control device on the network.

A control device may decrease the frequency at which the control device attempts to attach to an auxiliary parent device and/or decrease the number of auxiliary parent devices that the control device is attached to improve the likelihood of attachment when requests are sent. Similar to network attachment, when a control device attempts to attach to an auxiliary parent device, a plurality of messages may be transmitted at the same or substantially the same time, which may increase the likelihood of message collisions on the network. Accordingly, the control device may decrease the frequency at which the control device attempts to attach to an auxiliary parent device (e.g., decrease the execution rate of a procedure to attach to an auxiliary parent device), which may decrease the likelihood of message collisions. In addition, the control device may decrease the number of attached auxiliary parent devices, which may also decrease the likelihood of message collisions.

Figure 2B:
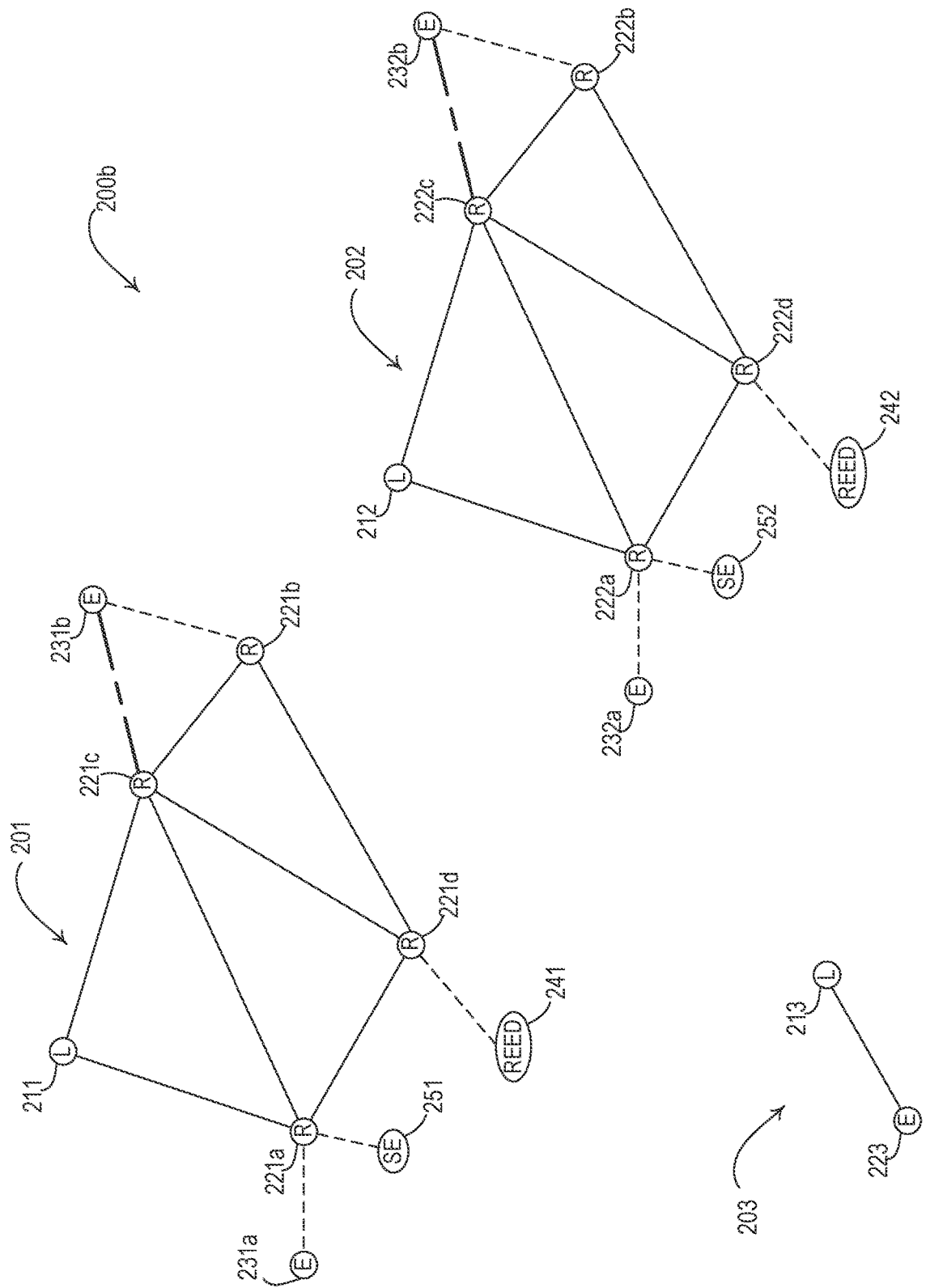
FIG. 2B is a diagram of example networks or network partitions (e.g., networks or subnetworks) that allow for communication between devices in the load control system of FIG. 1.

FIG. 2B is an example illustration of a network 200b having a plurality of network partitions 201, 202, 203 (e.g., separate network partitions). As illustrated in FIG. 2B, the network partition 201 may include a leader device 211 and router devices 221a, 221b, 221c, 221d. In addition, the network 201 may include end devices 231a, 231b; router eligible end device 241; and sleepy end device 251. As illustrated in FIG. 2B, router device 221a may be a parent device (e.g., of end device 231a and sleepy end device 251). Similarly, router device 221d may be the parent device of router eligible end device 241, and router device may be the parent device of end device 231b. Router device 221c may be the auxiliary parent device of end device 231b. For example, each of the router devices 221a-221d in the network partition 201 may be assigned a unique router identifier. The network partition 202 may include the following parent devices: a leader device 212 and router devices 222a, 222b, 222c, 222d. In addition, the network 202 may include child devices, such as: end devices 232a, 232b; router eligible end device 242; and sleepy end device 252. For example, each of the router devices 222a-222d in the network partition 202 may be assigned a unique router identifier. The network partition 203 may include a single parent device, leader device 213, and a single end device, end device 223.

As illustrated in FIG. 2B, the network partition 203 may include a leader device 213 and an end device 223. The network partition 203, however, may fail to include a router device. Rather, the leader device 213 may function as the sole router device within the network partition 203. A leader device that is not connected or attached to a router device may be referred to as a singleton device. For example, the leader device 213 may be a singleton device. As illustrated in FIG. 2B, a singleton device may be connected to one or more child devices (e.g., the end device 223). The network partition 203 may be a singleton partition. As illustrated in FIG. 2B, a singleton partition may include a leader device (e.g., the leader device 213). In addition, a singleton partition may include one or more end devices (e.g., the end device 223). However, as illustrated in FIG. 2B, a singleton partition may not include a router device.

The network 200b may allow for communication between control devices in a load control system (e.g., the load control system 100). In addition, the network partitions 201, 202, 203 may be formed as a result of certain control devices being unable for attach to an already formed network partition. For example, as described herein, a control device may attempt to attach to another control device on a network partition by transmitting a parent-request message (e.g., a multicast parent-request message). If, however, the control device fails to receive a response message to the parent-request message (e.g., because the control device is outside of a communication range of the router devices of an already formed network partition), the control device may attempt to form its own network partition (e.g., become a leader device of a new network partition).

A control device that is unable to attach to a network partition may form another network partition. For example, referring to FIG. 2B, the leader device 213 may have been unable to attach to a router device on the network partitions 201, 202 (e.g., because the leader device 213 was outside of communication range of the router devices on the network partitions 201, 202). Accordingly, the leader device 213 may form the network 203 and the end device 223 may attach to the network partition 203. Similarly, the leader device 212 may have been unable to attach to the network partitions 201, 203 (e.g., because the leader device 212 is outside of communication range of the router devices of the network partitions 201, 203) and formed the network partition 202.

A network partition may be associated with a partition identifier (e.g., a partition ID). The partition identifier may be randomly or pseudo-randomly assigned (e.g., randomly assigned from a range or list of identifiers). For example, a priority of the respective network partition may be based on the partition identifier for the network partition. The partition identifier may be assigned by randomly selecting a number from a range of partition identifier values. Referring now to FIG. 2B, the network partitions 201, 202, 203 may each be associated with a respective partition identifier. For example, the network partition 202 may be assigned a partition identifier of 1, the network partition 203 may be assigned a partition identifier of 2, and the network partition 201 may be assigned a partition identifier of 3. Although the partition identifiers of the network partitions 201, 202, 203 are sequential (e.g., in order to provide for a simplified explanation), the assignment of the partition identifiers to the network partition may be sequential, non-sequential, and/or randomized. As described herein, a partition identifier may also be an indication of a priority of the respective network partition 201, 202, 203. For example, the partition identifier may also be a priority value of the respective network partition 201, 202, 203 (e.g., respective priorities of the network partitions 201, 202, 203 may be 3, 1, and 2). In addition, a higher priority value may indicate a higher network partition priority (e.g. then network partition 201 may be a higher-priority network partition than the network partitions 202, 203 based on the partition identifier).

A priority may be assigned to a respective network partition based on the control devices (e.g., router devices and/or end devices) in the network partition. For example, a network partition having at least one router device in addition to the leader device may be given a higher priority than a network partition having only a leader device and no other router devices. Referring to FIG. 2B, the network partition 201 may be given a higher priority than the network partition 203 since the network partition 201 has router devices 221a-221d and the network partition 203 has no router devices in addition to the leader device. In addition, a priority may be assigned to a respective network partition based on a number of control devices (e.g., router devices and/or end devices) in the network partition. Referring to FIG. 2B, the network partition 201 may be given higher priority than the network partition 203 since the network partition 201 may have a greater number of control devices in the network partition. Each control device in a network partition may have stored locally thereon the number of control devices in the network partition. Network partitions that have the same number of control devices may be given different priorities using different partition identifiers, as described herein. For example, as shown in FIG. 2B, the network partition 201 and the network partition 202 may have the same number of control devices (e.g., router devices and/or end devices). The network partition 201 may have a higher priority based on network partition 201 having a higher or lower partition identifier.

As control devices attach to each of the network partitions 201, 202, 203, the effective communication range of each of the network partitions may increase. In addition, control devices that were initially unable to attach to one or more of the network partitions 201, 202, 203 (e.g., because the control device was previously outside of the communication ranges of all of the network partitions), may subsequently be able to attach to one of the network partitions 201, 202, 203. Moreover, communication within a load control system may be better facilitated when a single network partition is formed (e.g., the network 200a having a single network partition as illustrated in FIG. 2A) as compared to when multiple network partitions are formed (e.g., the network 200b having multiple network partitions 201, 202, 203 as illustrated in FIG. 2B). For example, communication within a load control system may be better facilitated when a single network partition is formed because a control device in a network partition may be unable to transmit messages to control devices attached to another network partition (e.g., a control device in a network partition may be unable to communicate with other devices outside the network partition). Accordingly, if a control device attached to a first network partition is also within the communication range of a second network partition, the device may attempt to detach from the first network partition and attach to the second network partition. For example, a control device may detach from the first network partition and attach to a second network partition when the priority of the second network partition is higher than the priority of the first network partition.

The router devices attached to each of the network partitions 201, 202 may each be associated with a communication range. The communication range of each of the respective router devices may be pre-defined and/or pre-configured. For example, the communication range of each of the respective router devices may be pre-defined and/or pre-configured based on the hardware components of each of the respective router devices. The effective communication range of a respective network or network partition may be based on the communication range of the routers attached the respective network (e.g., a summation of the communication range of each of the routers attached to the respective network). As a result, the communication range of a respective network or network partition may increase as the number of router devices attached to the respective network increases.

As described herein, the control devices attached to a lower-priority network partition may attempt to attach to a higher-priority network partition. For example, the control devices attached to the network partition 202 may attempt to attach to the network partition 201 (e.g., as the network partition 201 has a priority value of 3 and the network partition 202 has a priority value of 1). The router device 222a may receive a partition advertisement message from a control device attached to the network partition 201 (e.g., from the router device 221d). The advertisement message may include an indication of the partition identifier of the network 201 (e.g., 3) may be greater than the partition identifier of the network partition 202 and may indicate that the network partition 201 is a higher-priority network partition than the network 202. The router device 222a may determine to attach to the network partition 201 (e.g., as the network partition 201 has a higher priority).

The router device 222a may attempt to attach to the network partition 201 by transmitting a request to the leader device of the network partition 201 (e.g., the leader device 211). The request may include a request to attach to the network partition 201 as a router device, for example, by requesting to attach to the network partition 201 and be assigned a certain router identifier. For example, the router device 222a may request to attach to the network partition 201 and be assigned the router identifier that the router device 222a is assigned in the network partition 202. In response, the leader device 211 may reject the request if another router device 212a-212d attached to the network partition 201 is already assigned the requested router identifier. The leader device 211 may accept the request if none of the router devices 212a-212d attached to the network partition 201 are assigned the requested router identifier. If the router device 222a attaches to the network partition 201 and is assigned the requested router identifier, the child devices of the router device 222a (e.g., the end device 232a and the sleepy end device 252) may automatically attach to the network partition 201. If the router device 222a is assigned the requested identifier by the leader device 211 of the network partition 201 (e.g., the router identifier as assigned in the network partition 202), the child devices may continue to communicate with router device 222a using the same router identifier (e.g., as the child devices communicate with the router device 222a using the router identifier).

Figure 2D:
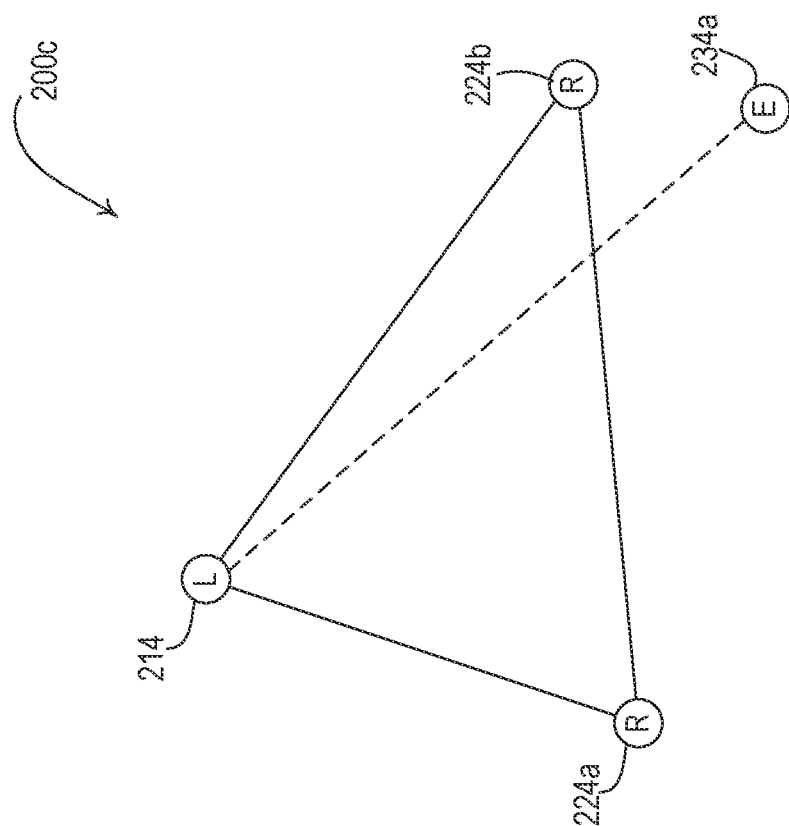
FIGS. 2C and 2D are diagrams of another example network that allows for communication between devices in the load control system of FIG. 1.
Figure 2C:
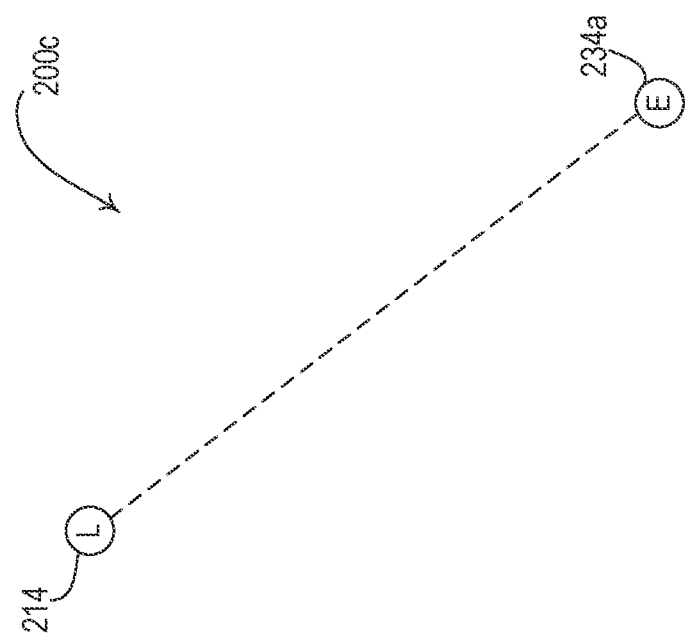

FIGS. 2C and 2D are illustrations of an example network 200c as the network 200c advances or progresses in network formation. As illustrated in FIG. 2C, the network 200" may include a leader device 214 and an end device 234a. As the network 200" is in the initial stages of network formation, the network 200" may not yet include a router device. The end device 234a may, as a result, attach to the leader device 214 (e.g., as other router devices not yet exist on the network 200c). However, the communication link (e.g., the parent/child link) between the leader device 214 and the end device 234a maybe weak (e.g., the received signal strength indicator of messages received by the end device 234a may be approximately −60 dB). For example, the communication link between the leader device 214 and the end device 234a may be weak because the leader device 214 and the end device 234a are not proximately positioned to each other. If the communication link between the leader device 214 and the end device 234a is weak, the likelihood of message transmission and/or reception failures between the leader device 214 and the end device 234a may increase.

FIG. 2D illustrates the network 200c during a later stage of network formation than the stage of network formation illustrated in FIG. 2C. As illustrated in FIG. 2D, the network 200c may grow to include additional control devices as network formation advances (e.g., as time progresses). For example, the network 200c may grow to include router devices 224a, 224b. In addition, the router devices 224a, 224b may be positioned proximate to the end device 234a (e.g., positioned closer to the end device 234a than the leader device 214). In addition, the received signal strength indicators of messages transmitted by the router devices 224a, 224b and received by the end device 234a may be strong (e.g., stronger than the received signal strength indicators transmitted by the leader device 214 and received by the end device 234a, such as −35 dB and −30 dB, respectively). Thus, potential communications links (e.g., potential parent/child links) between the router devices 224a, 224b, and the end device 234a may be stronger than the communication link between the leader device 214 and the end device 234a. Moreover, as illustrated in FIG. 2D, a potential communications link between the router device 224b and the end device 234a may be stronger than a potential communications link between the router device 224a and the end device 234a (e.g., as the router device 224b is positioned closer to the end device 234a than the router device 224a).

As network formation progresses or advances additional devices attach to the network. As a result, the end device 234a may experience better communication over the network 200c if the end device 234a determines to detach from an initial parent device (e.g., the leader device 214) and to attach to an updated parent device (e.g., the router device 224a or the router device 224b). For example, as described herein, the updated parent device may be positioned to closer to the end device 234a than the initial parent device (e.g., such that the updated parent device and the end device 234a may have a stronger communication link), which may increase the likelihood that message transmission and/or receptions are successful. As a result, as network formation advances, the end device may determine whether to attach to an updated parent device. Although FIGS. 2C and 2D are described using an example where the relative positioning of devices may increase or decrease the communications link shared between two devices, other conditions may affect the communication link shared between two devices (e.g., line of sight, interference, signal obstructions, etc.). To that extent, the scenarios of FIGS. 2C and 2D are merely examples to illustrate that a network may change of over time and that changes to network may be considered in attempts to increase communications over the network.

Figure 2E:
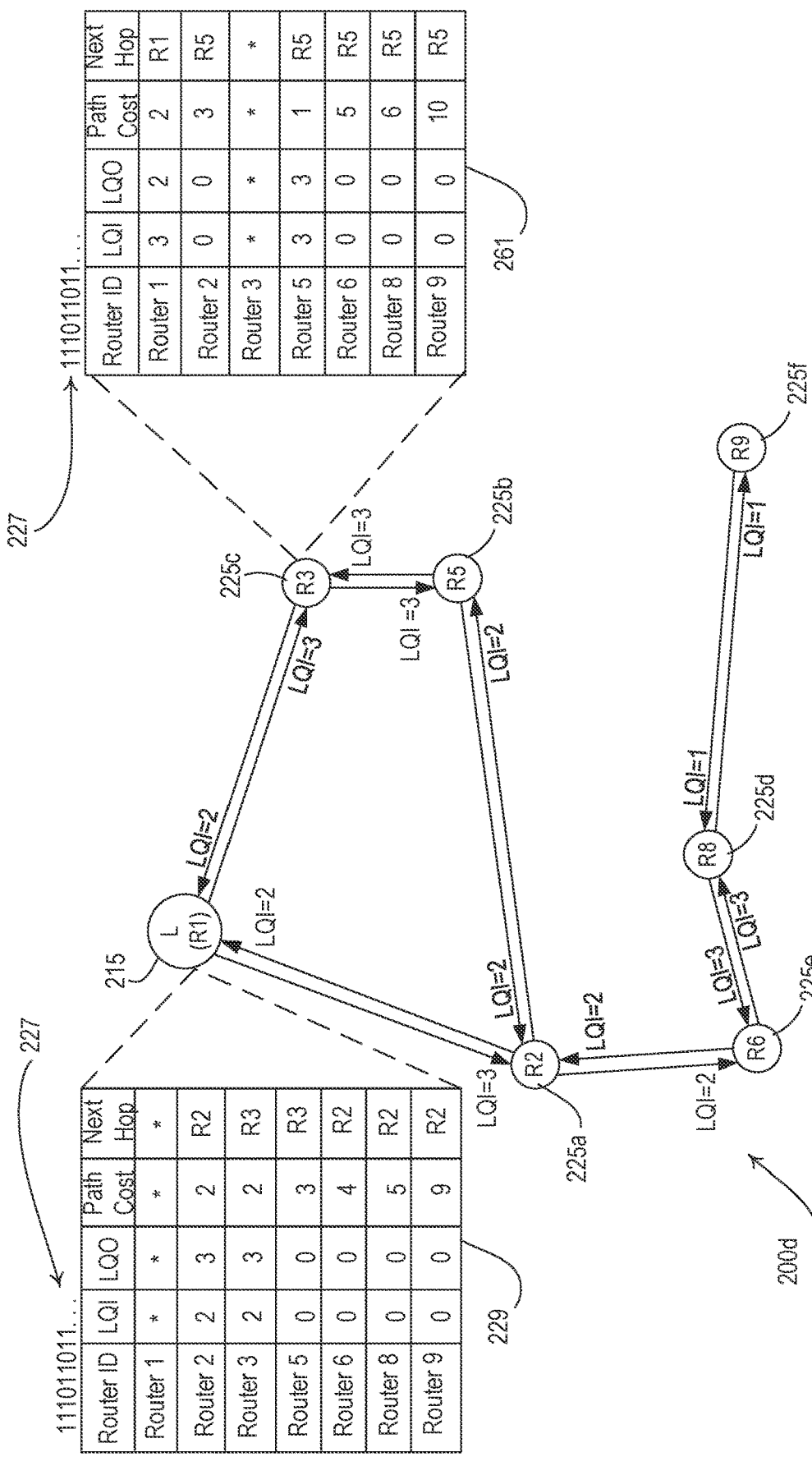
FIG. 2E is a diagram of another example network that illustrates the cost and network overhead associated with communication between the devices in the load control system of FIG. 1.

FIG. 2E is an illustration of an example network 200d. As illustrated in FIG. 2E, the network 200d may include a leader device 215 and router devices 225a, 225b, 225c, 225d, 225e, 225f. In the network 200d, the router devices (e.g., leader device 215 and router devices 225a, 225b, 225c, 225d, 225e, 225f) may periodically transmit advertisement messages that may be used for calculating cost and/or quality of communications in the network 200d. For example, router device 225c may send an advertisement message that is received by leader device 215 and leader device 215 may send an advertisement message that is received by router device 225c. Each router device may measure the received signal strength magnitude (e.g., received signal strength indicator (RSSI)) of the received advertisement message and calculate a link quality at which the advertisement message is received (e.g., link quality in (LQI)).

Each router device (e.g., leader device 215 and router devices 225a, 225b, 225c, 225d, 225e, 225f) may send an advertisement message as a multicast message. The advertisement messages transmitted by a router device may be received by neighboring router devices that share a single-hop communication link with the router device transmitting the advertisement messages. A single-hop communication link may be capable of communicating messages (e.g., digital messages) from a router device via a unicast and/or multicast communication directly to another router device. For example, the router devices 225a, 225c may be neighboring devices that share a single-hop communication link with the leader device 215, as the router devices 225a, 225c are capable of sending digital messages directly to and/or receiving digital messages directly from the leader device 215. The single-hop communication link may be a communication link on which router devices may be capable of directly receiving the advertisement messages above a given link quality (e.g., LQI greater than 0).

After a router device receives a periodic advertisement message from another router device, the router device may calculate a communication metric such as the link quality in (e.g., LQI) of the communication link via which the advertisement message is received. The LQI may be calculated as a predefined number that is within a range indicating different link qualities for the communication link between two devices. For example, the LQI may be indicated by values of 0, 1, 2, or 3. The different indicators of LQI may be assigned based on the RSSI of the received advertisement message and a link margin relative to a predefined receive level. The receive level may be a predefined minimum receive level. The receive level may be established as a predefined RSSI value for communications on the network. For example, the receive level may be defined by a noise floor that is set to an average RSSI value for noise generated on the network over a period of time. In an example using the receive level as a noise floor, a router device (e.g., leader device 215 or router device 225c) may calculate an LQI of 1 for communications received on a link from a neighboring router device when the RSSI value of one or more advertisement messages (e.g., average RSSI for advertisement messages over a period of time) is at least a link margin of 2 dB above the noise floor. The router device (e.g., leader device 215 or router device 225c) may calculate a link quality of 2 for communications received on a link with a neighboring router device when the RSSI value of one or more advertisement messages (e.g., average RSSI for advertisement messages over a period of time) is at least a link margin of 10 dB above the noise floor. The router device (e.g., leader device 215 or router device 225c) may calculate a link quality of 3 for communications received on a link with a neighboring router device when the RSSI value of one or more advertisement messages (e.g., average RSSI for advertisement messages over a period of time) is at least a link margin of 20 dB above the noise floor. A link quality value of zero may indicate that the link quality is unknown or infinite when the RSSI value of one or more advertisement messages (e.g., average RSSI value for advertisement messages over a period of time) is unable to be determined above the noise floor. Though examples are provided for predefined numbers indicating different levels of link quality, and/or different link margins that may be assigned to those levels, other indicators and/or values may be used to define link quality between two routing devices. Additionally, though individual routing devices may be provided as an example (e.g., leader device 215 or router device 225c), other routing devices may similarly calculate link quality for communication links between neighboring routing devices.

The LQI of the communication links measured locally at each control device (e.g., the leader device 215 and the router device 225c) may be exchanged with the other device on the communication link. For example, the LQI may be measured locally at each control device and transmitted to the other device via an advertisement message. The LQI that is measured by another router device (e.g., on the other side of the communication link) and received at a router device may be stored as the link quality out (LQO) for the communication link. The LQI and/or the LQO may be stored in a local router table at each routing device. For example, the leader device 215 may store the LQI and/or the LQO for the communication link with each router device in the network 200d in a router table 229. Similarly, the router device 225c may store the LQI and the LQO for communicating with each router device in the network 200d in a router table 261.

As described herein, the router tables 229, 261 may each identify network information for communicating with each router in the network 200d from the perspective of the devices at which the router tables 229, 261 are stored. The number of router devices in the network 200d and/or the router identifiers in use in the network 200d may be determined from a bitmap 227, as described herein. The bitmap 227 may be maintained by the leader device 215 and distributed to the other routing devices for locally maintaining their router tables. For example, the router devices 225a, 225c may receive the bitmap 227 and update their local router tables. The bitmap 227 may indicate the number of rows in the router tables (e.g., indicating the number of identified router devices in the network) and/or the router identifiers to include in the router tables. The router devices may maintain updated network information for the indicated router identifiers in the router tables. The updated network information in the router tables may include the LQI and/or LQO for the communication link between the routers identified in the bitmap 227. For example, the router 225c may receive the bitmap 227 from the leader device 215 and update the router table 261 to include routers in the table 261 that are indicated in the bitmap 277, or remove routers in the table 261 that are indicated in the bitmap 277 as failing to be used in the network.

The leader device 215 and router devices 225a, 225b, 225c, 225d, 225e, 225f may each use the LQI and LQO in their respective router tables to calculate a link cost for communicating on a communication link with other router devices. The link quality for the communication link between the two router devices may be the lesser of the value of the link quality for digital messages being transmitted out (e.g., LQO) and the value of the link quality for digital messages being received (e.g., LQI) on a single-hop communication link between two devices. An LQO or an LQI of zero may indicate that the router device fails to have a direct communication link with the router device listed in the router table.

A link cost for sending communications between devices on a communication link may correspond directly to the link quality of communications on the communication link. The link cost may indicate a relative cost or loss of communications on the communication link. Table 262, shown in FIG. 2F, illustrates example link costs that may correspond to different link qualities. As indicated in Table 262 of FIG. 2F, a greater link quality may correspond to a lower link cost for communications on the communication link between two neighboring devices.

The link cost for each communication link may be used by a router device to calculate a path cost for communications between the router device and another router device in the network 200d. The path cost may indicate the relative cost or loss of communications on an entire communication path that may include one or more router devices. The path cost for one communication path may be compared to another to determine a higher quality communication path for sending digital communications that may have a lower relative cost associated with transmission of digital messages.

The path cost may indicate the overall cost for communicating a digital message from a starting router device to an ending router device. For example, the path cost may be calculated as the total of the link costs for each hop between the starting router device from which a digital message may originate and the ending router device at which the digital message may be received in the network 200d. Each router device may calculate the path cost to a neighboring device on a single-hop communication link as being equal to the link cost and store the path cost in the locally-stored router table. For example, the router device 225c may set the path cost for communications with the leader device 215 equal to the link cost (e.g., lower of LQI and LQO) on the communication link and store the path cost in the router table 261. Similarly, the router device 225c may set the path cost for communications with the router device 225b equal to the link cost (e.g., lower of LQI and LQO) on communication link and store the path cost in the router table.

Each router device (e.g., leader device 215 and router devices 225a, 225b, 225c, 225d, 225e, 225f) may update the path cost for communicating digital messages to/from each router device in their respective router table based on the path cost information received from another router device. For example, as the router device 225b may be unable to directly communicate with the leader device 215, the router device 225b may receive path cost information for communicating digital messages through another router in the network 200d. The router 225c may transmit the path cost for communicating digital messages to/from the leader device 215 (e.g., path cost=2) in a multicast message that is received by other router devices. The multicast message may be an advertisement message, for example. The router device 225b may receive the path cost for communicating digital messages between the leader device 215 and the router device 225c (e.g., path cost=2). To calculate the total path cost for communicating digital messages between the router device 225b and the leader device 215 through the router device 225c, the router device 225b may add the link cost for communications between the router device 225b and the router device 225c (e.g., link cost=1) to the path cost received from the router device 225c (e.g., path cost=1) to get a total path cost (e.g., path cost=3). The link cost for communications between the router device 225b and the router device 225c may be determined from the link quality of the communication link between the router device 225b and the router device 225c, which may be the smaller of the LQI and LQO of the communication link (e.g., link quality=3).

Each router device may send/broadcast an advertisement message that includes the path cost to one or more other router devices in the network 200d. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through which digital messages may be communicated. For example, digital messages transmitted from the router device 225b to the leader device 215 may be communicated through the router device 225a or the router device 225c. The router device 225b may receive respective advertisement messages from the router device 225a and the router device 225c that indicate the path cost for communication of digital messages between the router device 225a and the leader device 215 is the same as the path cost for communication of digital messages between the router device 225c and the leader device 215 (e.g., path cost=2 on each communication link). The router device 225b may add the link cost calculated for communicating messages between the router device 225b and the router device 225c (e.g., link cost=1) to the path cost information received in the advertisement message from the router 225c (e.g., path cost=2) to determine the total path cost for communicating with the leader device 215 through the router device 225c (e.g., total path cost=3). The router device 225b may similarly add the link cost calculated for communicating messages between the router 225b and the router 225a (e.g., link cost=2) to the path cost information received in the advertisement message from the router 225a (e.g., path cost=2) to determine the total path cost for communicating with the leader device 215 through the router device 225a (e.g., total path cost=4). The router device 225b may update a locally-stored router table with the lowest calculated path cost for communicating with the leader device 215 and/or the identifier of the router device through which digital messages are to be transmitted (e.g., router 225c). Each router device may similarly update their respective locally-stored router table with the lowest calculated path cost for communicating with the other router devices in the network 200d. For example, as shown in FIG. 2E, the leader device 215 and the router device 225c may each calculate the lowest path cost for communicating to other router devices in the network 200d and store the path cost in the respective router tables 229, 261. The router tables 229, 261 may also have stored therein the router identifier of the next hop from the respective devices 215, 225c through which digital messages are to be communicated to achieve the calculated path cost for communications to the destination router device.

Through periodically updating the link quality (e.g., LQI and/or LQO), link cost, and/or path cost, and communicating the path cost to other router devices in periodic advertisement messages, each router device may have up-to-date path cost information for communicating digital messages to other router devices in the network 200d. The router device may use the best communication path (e.g., lowest cost path) for communicating digital messages to another device. This routing mechanism may allow router devices to detect when other router devices have dropped off the network 200d, or a path cost between routers has changed, and calculate the next lowest cost path to maintain connectivity to other router devices in the network 200d.

In an effort to distinguish relatively older data being transmitted in the periodic advertisement messages from relatively newer data transmitted in the periodic advertisement messages, the advertisement messages may be communicated with a sequence number. The leader device, such as leader device 215, may be responsible for updating the sequence number and distributing the updated sequence number to the other router devices in the network (e.g., router devices 225a, 225b, 225c, 225d, 225e, 225f in network 200d). For example, the leader device 215 may increment the sequence number periodically (e.g., after transmission of one or more advertisement messages) and/or after a router device is added to the network. The sequence number may be updated to allow router devices in the network (e.g., leader device 215 and/or router devices 225a, 225b, 225c, 225d, 225e, 225f in network 200d) to identify updated network information transmitted in advertisement messages.

For example, as router devices (e.g., leader device 215 and/or router devices 225a, 225b, 225c, 225d, 225e, 225f in network 200d) may be periodically communicating advertisement messages that include path cost information that indicates the path cost for communicating with other router devices in the network, the sequence number may be updated to identify the updated path cost information.

After the leader device 215 updates the sequence number, the leader device 215 may distribute the sequence number to other router devices in the network. For example, the leader device 215 may use the sequence number in its own advertisement messages. After receiving the updated sequence number, each router device may use the updated sequence number for subsequent advertisement messages transmitted from the router device on the network. Each sequence number transmitted from the leader device 215 to the other router devices may be used in the advertisement messages for the router devices until a subsequent sequence number is distributed by the leader device 215. For example, the router device 225c may receive the sequence number directly from the leader device 215 and use the sequence number in subsequent advertisement messages. The router device 225b may receive the sequence number in the advertisement messages transmitted from the router device 225c and use the sequence number in subsequent advertisement messages transmitted from the router device 225b. The routers may each use the current sequence number until an updated sequence number is received that is originated at and distributed from the leader device 215. Each router device may update the locally-stored network information in the router table when the router device receives an advertisement message from a non-leader router device (e.g., router devices 225a, 225b, 225c, 225d, 225e, 225f) that has an updated sequence number. If a router device receives an advertisement message that has the same sequence number as a previously received advertisement message, and/or previously received from the same non-leader router device, the router device may fail to process the advertisement message. If a router device fails to receive an updated sequence number within a predefined period of time (e.g., minutes, seconds, etc.), the router may assume the leader device 215 is unavailable for communications (e.g., offline, powered off, dropped from the network, changed roles, or is otherwise unable to communicate with the router device) and attempt to form another network or network partition having another leader device 215.

As described herein, the control devices that are attached to a network, such as the network 200a, 200b, 200d, may each be assigned a respective role. Control devices that are assigned certain roles, such as a leader device or a router device, may facilitate communication with control devices that are assigned other roles, such as end devices. The roles of control devices may be assigned on a first-come-first-serve basis. For example, the control devices that join a network first are assigned roles that facilitate the communication of other control devices that subsequently join the network. This may result in degradation of the quality of communication links as the network evolves and other devices are added to the network, or in the vicinity of the network. For example, control devices may establish links (e.g., parent-child link, auxiliary parent link, router-to-router links) with one another that provide the best quality communication link at the time.

After the network 200d is formed (e.g., claiming procedures initially performed, joining procedures initially performed, attachment procedures initially performed and/or other procedures performed for establishing the network), the control devices may lose power and/or be reset upon receiving power. For example, the control devices in the network 200d may be turned off and turned back on after a power outage or some other event that causes the network 200d to lose power. After the reset (e.g., after power is restored), the leader device 215 and the router devices 225a, 225b, 225c, 225d, 225e, 225f may attempt to re-form the network 200d, for example, by reattaching to the network and resuming their previous roles on the network. However, if the leader device 215 and the router devices 225a, 225b, 225c, 225d, 225e, 225f attempt to reattach to the network at the same or substantially the same time, the likelihood of message collisions may increase, which may cause network re-formation to fail or become delayed.

After a reset, the control devices that were attached to the network 200d may attempt to re-form the network. In an attempt to decrease the likelihood of message collisions and decrease the period of time for network re-formation to complete, the control devices that were attached to the network 200d prior to the reset may attempt to attach to the network in a predefined manner (e.g., sequentially). For example, the control devices that were attached to the network 200d may sequentially attach to the network in a set sequential manner according to a value of a stored identifier. In addition, the control devices that were attached to the network 200d may attach to the network based on their respective hop count from the leader device 215. The hop count and/or role in the previously-formed network may be stored at each control device, or otherwise communicated from another device after being powered on.

Referring to FIG. 2E, the leader device 215 may resume its role as the leader device of the network and re-form the network 200d. After the leader device 215 resumes it role and/or transmits a leader advertisement message, the router devices 225a, 225b, 225c, 225d, 225e, 225f may attach to the network based on their respective hop count from the leader device 215. For example, the router devices with lower hop counts may receive the leader advertisement message from the leader device 215 and may join the previously-formed network and/or reattach to the previously-formed network to resume their respective roles sooner than the router devices with higher hop counts.

The router devices 225a, 225b, 225c, 225d, 225e, 225f may attempt to join the previously-formed network 200d and/or attach to the parent device in the previously-formed network based on a coordinated startup time for each device. The coordinated startup time may be individualized for a respective router devices 225a, 225b, 225c, 225d, 225e, 225f, such that the coordinated startup times trigger the router devices 225a, 225b, 225c, 225d, 225e, 225f to start their respective joining procedures, and/or attachment procedures. Referring to FIG. 2E, router devices 225a, 225c may rejoin the network and/or reattach to the leader device 215. After the router devices 225a, 225c reattach to the leader device 215, the router devices 225b, 225d, 225e may rejoin the previously-formed network and/or reattach to the router devices 220a, 220c to which the router devices 225b, 225d, 225e were attached in the previously-formed network. After the router devices 225b, 225d, 225e reattach to the router devices 225a, 225c, router device 225f may rejoin the previously-formed network and/or reattach to the router device 225d.

Figure 3:
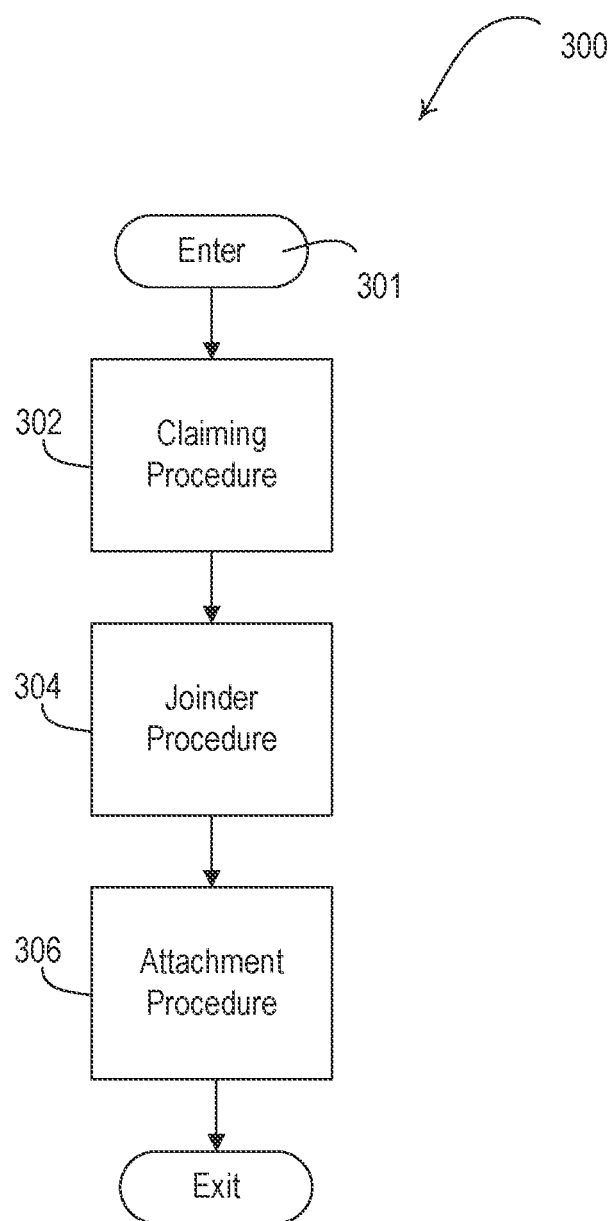
FIG. 3 is a flowchart of an example commissioning procedure.

As described herein, a network may be used to facilitate communication between the respective devices of a load control system. For a respective control device to communicate via the network, the control device may join the network, for example, by initiating a commissioning procedure. FIG. 3 is a flowchart of an example commissioning procedure 300. The procedure 300 may be may be performed by a control device (e.g., an end device, such as the end devices 230a, 230b, the router eligible end device 240, and/or the sleepy end device 250) that is attempting to join a network and/or attach to another device on the network (e.g., the networks 200, 200a, 200b, 200c, 200d, and/or the network partitions 201, 202, 203). For example, the control device may enter the procedure 300 at 301 when the control device is first powered and attempting to join the network and/or attach to another device on the network.

At 302, the control device may perform a claiming procedure. The claiming procedure may be used to discover and claim control devices for being added to the network. For example, control devices in the load control system (e.g., load control system 100 shown in FIG. 1) may be claimed using a user's mobile device (e.g., mobile device 190). Each control device may be claimed by a user's mobile device for joining the network (e.g., via a joining procedure, as described herein), and/or attaching to other devices on the network (e.g., via an attachment procedure, as described herein). Each control device may transmit a beacon (e.g., a control device beacon) via a short-range wireless communication link (e.g., using BLE technology, nearfield communication (NFC) technology, or other short-range wireless technology). The mobile device may discover (e.g., receive) beacons transmitted by the control devices in the load control system. Each beacon may include a unique beacon identifier of the control device that transmitted the respective beacon. The unique beacon identifier may be a BLUETOOTH® beacon identifier. The unique beacon identifier may include a unique device identifier (e.g., serial number) of the control device itself.

The mobile device may identify one or more control device beacons from which a respective beacon was received at a received signal strength indicator (RSSI) above a predefined value. For example, the mobile device may identify one or more of the beacons transmitting the beacons that are received having the strongest receives signal strength indicators, and the mobile device may transmit a connection message to the control device(s). The control device performing the commissioning procedure 300 may receive the connection message from the mobile device may be configured to establish a connection (e.g., a two-way communication connection) with the mobile device.

The connection message may indicate to the control device that the control device has been selected for claiming. The connection message may operate as a claiming message, or a separate claiming message may be sent after the connection is established between the mobile device and the control device. The claiming message may indicate that the control device has been claimed for being added to the network. In response to receiving the claiming message, the control device may transmit a claim confirmation message to the mobile device. The claim confirmation message may include a configuration information that may be used to join the control device to the network. For example, the configuration information may include a unique device identifier (e.g., serial number) of the control device and/or network credentials for joining a network. The network credentials may include a network key for the network, a network address for the control device (e.g., a Thread network address) and/or a joiner identifier for the control device. The control device may be programmed with the network credentials by receiving the credentials for the network via an RF communication (e.g., Bluetooth or other short-range communication) from a commissioning device, or the credentials may be prestored at the control device (e.g., at the time of manufacture). The unique device identifier (e.g., serial number) of the control device may be sent in the claim confirmation message when the unique beacon identifier is not the unique device identifier of the control device. The network address and/or the joining identifier may be used during the joining procedure to allow the control device to join the network.

During the claiming procedure at 302, or otherwise during the commissioning procedure 300, the mobile device may write information to the control device that is being claimed. For example, the mobile device may write a time the control device was claimed, an identifier of the mobile device and/or application executing a claiming procedure on the mobile device, and/or channel information to assist the control device in getting onto the thread network through the joining procedure. The information may be sent in the claiming message or in a separate message on the connection established with the mobile device for being stored at the control device. When the mobile device receives the claim confirmation message from the control device to which the mobile device is connected, the mobile device may store the unique device identifier of the control device, the network address for the control device (e.g., a Thread network address), and/or the joiner identifier for the control device in memory.

The user may continue to move the mobile device around the space in which the load control system is installed to perform the claiming procedure with additional control devices. When the user is done claiming control devices (e.g., the mobile device has claimed all or a portion of the control devices of the load control system), the mobile device may upload the configuration information from the claimed devices to a central computing device, such as a commissioning device (e.g., the system controller 110). The uploaded configuration information may be used to identify the devices for being joined to the network. The central computing device may be a system controller or other device capable of communicating with other control devices in the load control system. The central computing device may be installed at the space being commissioned, or may be a remote computing device. Though the mobile device is described as the device performing communications with the control device(s) during the claiming procedure at 302, other computing devices may perform similar communications with the control device(s) during the claiming procedure. For example, another computing device, such as the commissioning device or system controller, may perform the communications with the control device(s) to perform the claiming procedure, or portions thereof.

At 304, the control device may perform a joining procedure. During the joining procedure at 304, the control device may look for a network to join. The control device may periodically switch between a beaconing mode for being claimed during the claiming procedure at 302 and listening for a network to join during the joining procedure at 304. The control device may begin the joining procedure at 304 after being claimed. As described herein, during the joining procedure, the control device may transmit and/or receive joining messages (e.g., message to join a wireless network, such as joining request messages and/or joining response messages). As a result of the joining procedure, and as further described herein, the control device may be with a network key that may allow the device to send and/or receive messages over the network.

During the joining procedure, the control device may stop transmitting (e.g., periodically transmitting) the control device beacon continuously on a first wireless communication medium (e.g., using BLE technology) and/or a second wireless communication medium (e.g., the wireless communication network). The control device may listen on the wireless communication network to determine if joining messages (e.g., joining request messages) being transmitted on the wireless communication network. The control device may continue to periodically transmit the control device beacon via the first wireless communication medium (e.g., at a slower rate than in the claiming procedure) in case the mobile device attempts to reconnect to the control device while the mobile device is performing the claiming procedure.

The control device may receive a joining request message from the central computing device or the commissioning device during the joining procedure. The control device may respond with a request to join the network. The central computing device or the commissioning device may challenge the control device with one or more portions of the configuration information obtained during the claiming procedure. For example, the joining request message, or another message from the central computing device or the commissioning device, may include a request for one or more portions of the network credentials (e.g., a network key) from the user device. In an example, the central computing device or the commissioning device may identify the network address in the network credentials in the joining request message and request the joiner identifier from the control device. The control device may respond with the joiner identifier or the network address and the joiner identifier to join the network or network partition. The central computing device or the commissioning device may identify the control device from the unique identifier in the message as being a claimed device and confirm the accuracy of the network credentials to join the control device to the network. The central computing device may transmit the network key to the control device, which may use the network key to connect to the network.

At 306, the control device may initiate an attachment procedure. After the control device joins the network, the control device may, for example, attempt to attach to another device (e.g., a leader device or a router device) on the network to form the mesh network (e.g., formation of the network) at 306. In order to attach to another device on the network, the control device may send and receive a number of attachment messages via the network. For example, the control device may, at 306, initiate an execution of the procedure 500 (e.g., to start a back-off timer). The control device may also, or alternatively, perform other attachment procedures as described herein.

Though FIG. 3 describes a claiming procedure, joining procedure, and attachment procedure, one or more of these procedures may be performed. For example, the claiming procedure and/or the joining procedure may be omitted, or modified, as control devices may have network credentials prestored thereon (e.g., at manufacture or written to storage thereon by another device, such as the mobile device). Also, or alternatively, the claiming procedure, joining procedure, and attachment procedure illustrated in FIG. 3 may be combined. For example, the joining procedure and the attachment procedure may be combined (e.g., the joining procedure may include an attachment procedure). The attachment procedure may be performed as part of the joining procedure when a control device is joining a network. The attachment procedure may be independently performed after a control device has already joined a network to enable the control device to attach to another device in the network. That is, although each of the procedures illustrated in FIG. 3 are distinctly described, the claiming procedure, joining procedure, and attachment procedure may each be combined or performed in various combinations.

In addition, the central computing device may transmit the network credentials to the control device during the claiming procedure at 302. The network credentials may be used by a control device to directly attach to another device on the network. For example, the network device to which the control device attempts attachment may challenge the control device for the network credentials as described herein. As described herein one or more of the claiming, joining, and/or attachment procedures may be performed after power is provided to a control device and the device is turned on. One or more of these procedures may also be performed to re-form the network or reattach control devices to the network.

As described herein, a control device may join a network and/or attach to another device on the network in order to communicate with the other control devices on the network. However, if the control device attempts to attach to another device on the network at the same or substantially the same time as other control devices, the likelihood of message collisions may increase and/or the control device may fail to attach to another device on the network. In an attempt to decrease the likelihood of message collisions, the control device may delay its respective attachment procedure such that control devices attach to other devices on the network (e.g., attach sequentially rather than simultaneously, which may increase the likelihood of message collisions and/or increase the likelihood that a respective control device fails to attach to another device on the network). For example, the control devices that are attempting to attach to other devices on a network may delay their respective attachment procedures based on a coordinated startup time. In addition, the coordinated startup time may be individualized for a respective control device, such that the coordinated startup times trigger the control devices to start their respective attachment procedures in a coordinated manner.

As part of an initial startup procedure, when a control device is initially powered on and/or attempts to initially attach to another device on a network or network partition (e.g., initial attachment after initially being powered on after being configured and/or reconfigured) the device may perform a startup procedure that is coordinated with other devices on the network or network partition. As an initial startup procedure may be performed at a control device prior to the control device establishing a role on the network for performing communications, a coordinated startup of the devices on the network may be performed to decrease latency and/or potential collisions of messages on the network as devices are attempting to perform an attachment procedure. After the control device has been commissioned, the control device may perform an attachment procedure or initial startup procedure when turning on.

Figure 4:
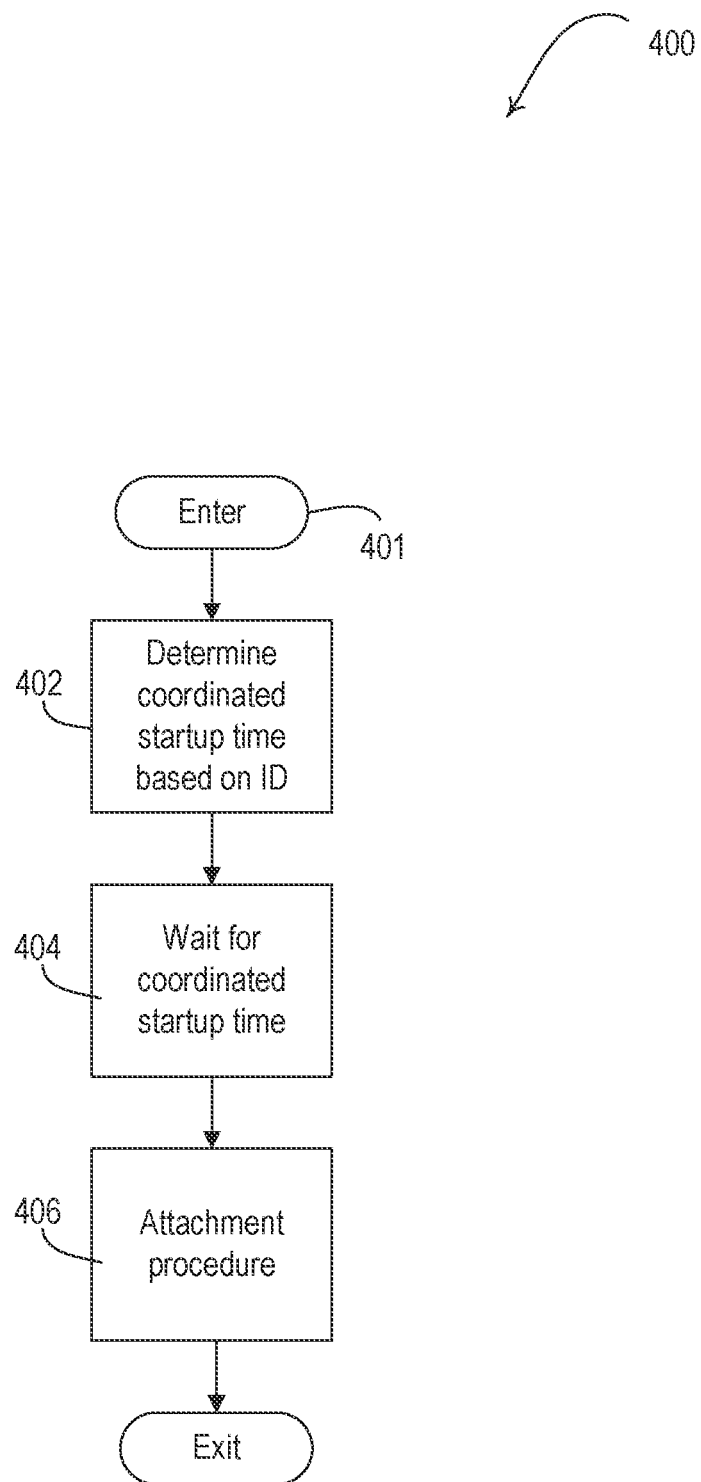
FIG. 4 is a flowchart of an example procedure that may be performed by a control device prior to attaching to another device on the network.

FIG. 4 is a flowchart of an example procedure 400 for determining a unique coordinated startup time at which a control device may initiate a joining procedure, which, as described herein may include an attachment procedure. As described herein, the unique coordinated startup time may be a period of time that is reserved for the control device to initiate the joining procedure (e.g., other devices may not be performing a joining procedure at the unique coordinated startup time). The procedure 400 may be performed by a control device (e.g., an end device, such as the end devices 230*a*, 230*b*, the router eligible end device 240, and/or the sleepy end device 250) that is attempting to attach to another device on a network (e.g., the networks 200, 200', 200" and/or the network partitions 201, 202, 203). For example, the control device may enter the procedure 400 at 401. The procedure may begin for each control device (e.g., claimed control device) in the system at 401 in response to a triggering event. The triggering event may be a message from a central computing device, such as the commissioning device. In another example, the triggering event at 401 may be a power on event or a reset event. In addition, the procedure 400 may be executed after other procedures (e.g., as an initial procedure for forming the network or after other procedures, such as the claiming and/or joining procedure).

At 402, the control device may determine the unique coordinated startup time, which may be based on an identifier associated with the control device. The identifier may be the unique identifier (e.g., serial number) assigned to the control device, as described herein, which may enable the determined coordinated startup time to also be unique. For example, each respective control device may be assigned or configured with an identifier. Identifiers may be assigned or configured such that a different identifier is assigned/configured for each control device. For example, identifiers may be sequentially assigned to and stored at control devices. The identifiers may be the same identifiers stored in the association information described herein and/or used for communicating messages between devices in the system. The identifiers may be stored at time of manufacture, or during an initial configuration or commissioning procedure at the load control system after installation of the control devices. The identifiers may be determined during operation or runtime of the control device based on the previous network status. The control device may determine the coordinated startup time by adding a delay for each identifier. For example, the control device may add an additional one second delay for each identifier in the sequence (e.g., first identifier gets a one-second delay, second identifier gets a two-second delay, etc.). The identifiers may be grouped for determining the coordinated startup time. For example, the control device may determine that its identifier is in a first group of identifiers and set the delay equal to the value for the first group. In an example, the control device may determine its identifier is in a first group of five control devices and wait a coordinated startup time of five to ten seconds, then the control devices in the next group may wait an additional five to ten seconds, and so on. The delay of each device in the group may be randomized within a time frame.

The unique coordinated startup time may be used by the control device to delay the start of a joining procedure. As described herein, a joining procedure may be performed by a control device to join a network (e.g., to enable the control device to send and receive messages to other devices joined to the network). For example, a joining procedure may include an attachment procedure for the control device to attach to another device joined to the network (e.g., a router device). Further, the attachment procedure may establish a parent-child link between the control device and the other device, such that the control device may send and receive messages from over the network through the other device. The unique coordinated startup time may be used by control devices such that each control device delays a respective joining procedure for a different period of time. As described herein, if numerous devices start their respective attachment procedures (e.g., to establish parent-child link, auxiliary parent link, and/or router-to-router links procedures) at the same or substantially the same time, the likelihood of message collisions may increase and/or the time for network formation to complete may increase.

The unique coordinated startup time may be determined such that control devices in the system delay initiating their respective joining procedures, allowing other devices in the system to begin joining the network, for example, by attaching to other devices on the network during an attachment procedure. For example, the unique coordinated startup times may be determined based on the identifier of the respective control device, which, as described herein, may be assigned or configured sequentially. The control device having the lowest or highest numbered identifier may begin a respective attachment procedure prior to the other control devices in the load control system.

The identifiers of the control devices may be used to determine the unique coordinated startup time of the control devices. Each control device may assign a predefined delay to the unique identifier stored thereon. For example, a control device with a unique identifier "0001" may initiate a first delay time (e.g., one-second delay, ten-second delay) from the triggering event, a control device with a unique identifier "0002" may initiate a second delay time that is longer than the first delay time (e.g., a two-second delay) from the triggering event, and so on. The predefined delay may be applied to any character (e.g., integer, letter, alphanumeric character, etc.) or series of characters in the identifier.

As the unique identifiers of control devices may be assigned at the time of manufacture, or otherwise prior to installation of the devices in the load control system, each period of delay may be assigned to control devices that come within a group of identifiers. For example, the control devices in a first group of identifiers (e.g., identifiers less than "0100") may initiate a first delay time, the control devices in a next group of identifiers (e.g., identifiers less than "0200") may initiate a second delay time, and so on.

The control devices may know their relative location in the sequence of devices and delay the coordinated startup time based on the relative location in the sequence. For example, a control device may receive a list or table of the identifiers of the other control devices in the system. The list or table may be received in a message from the central computing device, such as the commissioning device. For example, the other identifiers may be received in the message from the central computing device or commissioning device that is transmitted as the triggering event for initiating the attachment procedure at each control devices. The control device that identifies its identifier as the first or last in the list or table may begin its attachment procedure, or initiate the first delay time (e.g., a one-second delay). The next control device that identifies its identifier as the first or last in the list or table may begin its attachment procedure after a next delay time (e.g., a one-second delay when the first device initiates a delay, or a two-second delay when the first device does not).

The control devices may receive the delay time for the unique coordinated startup time from the central computing device or commissioning device. For example, the central computing device or commissioning device may identify the delay time for each device or group of devices herein and communicate the unique coordinated startup time for each control device to the respective devices. The unique coordinated startup time may be individually communicated to the control devices in a unicast message, or the coordinated startup times may be communicated in a multicast message.

The unique coordinated startup time of control devices may be grouped within a time frame. For example, the coordinated startup time of a group of control devices may be randomized within a time frame. Control devices having identifiers in a first group may be given a randomized coordinated startup time within a first time frame, control devices having identifiers in a second group may be given a randomized coordinated startup time within a second time frame, and so on.

Though the delay time for a unique coordinated startup time may be described using a certain magnitude of time (e.g., seconds), other magnitudes of time may be implemented (e.g., milliseconds, tens of seconds, etc.). The coordinated startup time of the control devices may be set at a time period to allow one or more control devices to power on and perform the described procedures prior to other devices in the system.

At 404, the control device may wait for the unique coordinated startup time determined at 402, and, after the waiting for the coordinated startup time, the control device may start a joining procedure at 406. Waiting for the coordinated startup time determined at 402 may allow the control device to start its respective joining procedure, which, as described herein, may include an attachment procedure, at a time before and/or after other control devices start their joining procedures, which may decrease the likelihood of message collisions and/or decrease the amount of time for network formation to complete. For example, if the unique coordinated startup times are determined based on the identifiers that are sequentially assigned or configured to the respective control devices, the unique coordinated startup times of the respective control devices may expire sequentially and the respective control devices may start their joining procedures sequentially.

The networks described herein may be used to facilitate communication within a load control system. The load control system may experience a loss of power (e.g., due to a blackout or another event that causes the power supplied to the load control system to cease) after formation of the network, or portions thereof. If the load control system experiences a loss of power (e.g., the control devices attached to the network attached to the network experience a loss of power) and/or the control devices are reset, the respective control devices within the load control system may regain power and attempt to re-form the network. However, the control devices within the control system may regain power and attempt to re-form the network at the same or substantially the same time, which may increase the likelihood of message collisions and/or increase the amount of time for network formation to complete. Additionally, the control devices may attempt to perform an attachment procedure, even though a network, or portions thereof, have already been formed.

Control devices may apply a back-off timer (e.g. a timer to run for a back-off period of time) before initiating an attachment procedure. In examples, the back-off period of time may be a period of time for which the control device will delay before attempting to attach to another device on the network. For example, the back-off timer may allow other control devices attempting to join the network to perform and complete their respective attachment procedures. The back-off timer may also decrease the likelihood that multiple control devices are initiating attachment procedures at the same or substantially the same time, which, as described herein, may cause message collisions/failures and increase the amount of time that it takes for network formation to complete. The back-off timer may be determined by the control device, for example, such that the control device initiates its attachment procedure while the network is not busy (e.g., when other devices are not currently performing an attachment procedure). Further, if the control device initiates its attachment procedure while the network is not busy, the likelihood that message collisions occur will be low and network formation will not be delayed. For example, the control device may listen to the network traffic (e.g., messages being transmitted over the network), and determine the back-off timer based on network traffic (e.g., estimating a time when the network will not be busy to initiate an attachment procedure). FIGS. 6 to 8B illustrate example procedures for determining a back-off time based on network traffic.

Figure 5:
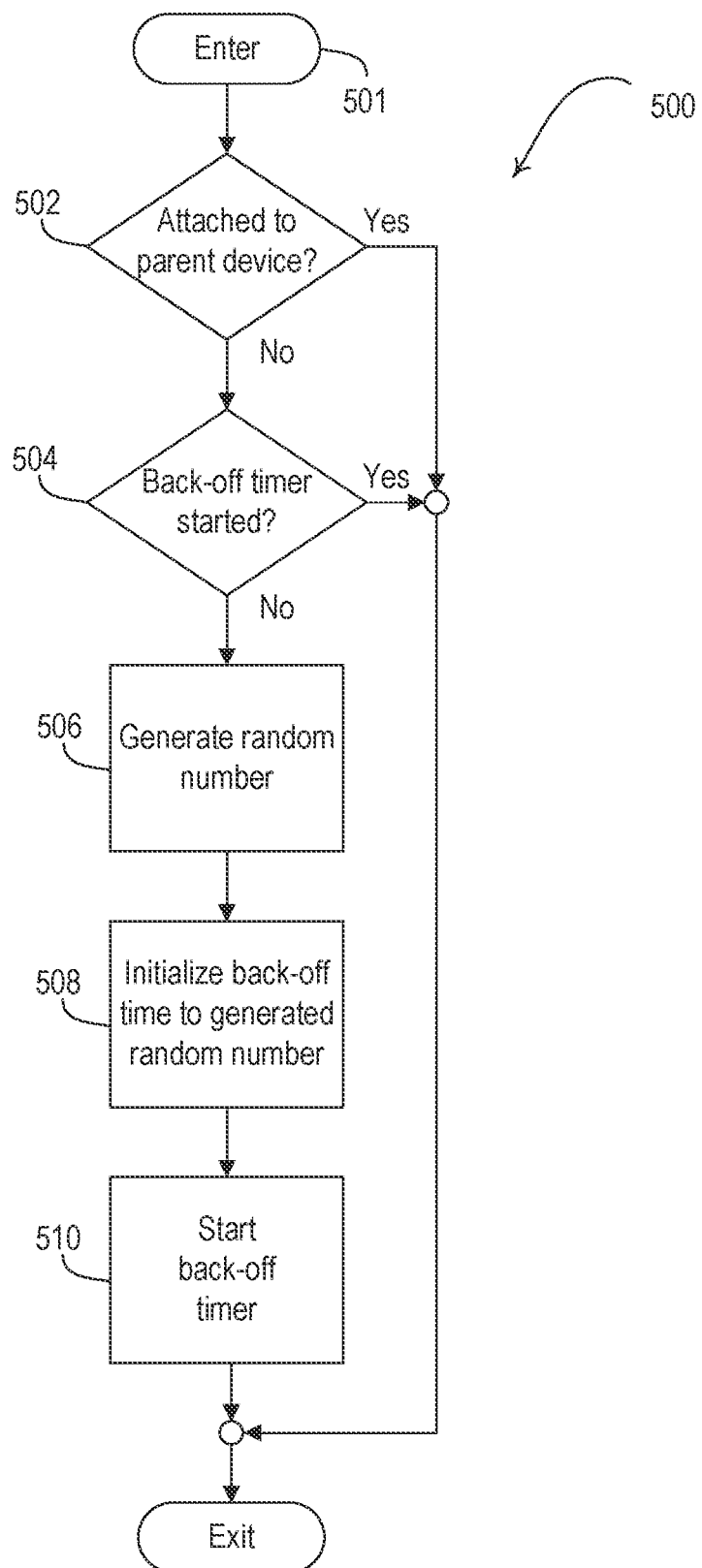
FIG. 5 is a flowchart of an example procedure for attaching to another device on a network.

FIG. 5 is a flowchart of an example procedure 500 for attaching to a control device on a network (e.g., the networks 200, 200', 200" and/or the network partitions 201, 202, 203). The procedure 500 may be performed by a control device (e.g., an end device, such as the end devices 230a, 230b, the router eligible end device 240, and/or the sleepy end device 250) that is attempting to attach to another device on the network (e.g., a potential parent device, such as the leader device 210 and/or the router devices 220a-220d). For example, the procedure 500 may be executed at 406 of procedure 400, at 530 of procedure 500, and/or at 568 of procedure 552. In addition, the control device may initiate the procedure 500 at 501 when the control device powers on. Further, the procedure 500 may be re-initiated after the control device has attached to a parent device on the network. For example, the control device may detach (e.g., by initiating a detachment procedure) from a parent device if the control device is unable to communicate with its parent device (e.g., the parent device is unplugged and/or otherwise unable to communicate with the network) and may re-initiate the procedure 500 at 501 to attach to another parent device. In addition, the control device may re-initiate the procedure 500 when the control device loses connectivity to the network (e.g., when the control device is unplugged or otherwise loses power).

At 502, the control device may determine whether the control device performing the procedure 500 is attached to a parent device on a network (e.g., the networks 200a, 200b, 200c, 200d, or network partitions 201, 202, 203). If the control device is not attached to a parent device on the network, the control device may determine if a back-off timer has been started and is running at 504. As described herein, after the back-off timer expires, the control device may attempt to attach to another device on a network to establish a link with the other device (e.g., router-to-router link, parent-child link, and/or auxiliary parent link), for example, by transmitting attachment messages to the other device. The control device may transmit a certain type of attachment message based on the type of link the control device wants to establish. For example, the control device may transmit attachment messages that are configured to establish a parent-child link, such as a parent-request message (e.g., a multicast parent-request message). The control device performing the procedure 500 may refrain from attaching to a parent device on the network (e.g., may not attempt to attach to a parent device the network) while a back-off timer is running. The resolution of the back-off timer may be in milliseconds and/or may be represented by a plurality of bits (e.g., thirty-two bits). The back-off timer may cause the control device to delay attempting to attach to a parent device on the network to allow for other devices to attach to parent devices on the network (e.g., networks 200a, 200b, 200c, 200d or network partitions 201, 202, 203). For example, the back-off timer may allow parent devices to process parent-request messages from other devices.

Accordingly, the procedure 500 may exit if the back-off timer has been started and is still running.

If, however, a back-off timer has not been started and/or is not currently running, a random number may be generated at 506. For example, the random number may be generated by randomly selecting a number from a predefined range of back-off times (e.g., zero to four seconds). At 508, the back-off timer may be initialized with the random number generated at 506 and, as described herein, the device may refrain from attaching to the network for the back-off timer period of time. Initializing the back-off timer to the generated random number may decrease the likelihood that multiple devices attempt to attach to the network at the same time or within the same time frame (e.g., as it is unlikely that a plurality of devices will generate the same random number) and increase the chance of the device successfully attaching to the network. As described herein, when multiple devices attempt to attach to a network at the same time, the messages transmitted to attach to the network (e.g., parent-request message and parent-response messages) may collide, which may cause the attachment to fail and/or be delayed. At 510, the back-off timer may be started (e.g., started counting down) and the procedure 500 may exit.

Figure 6A:
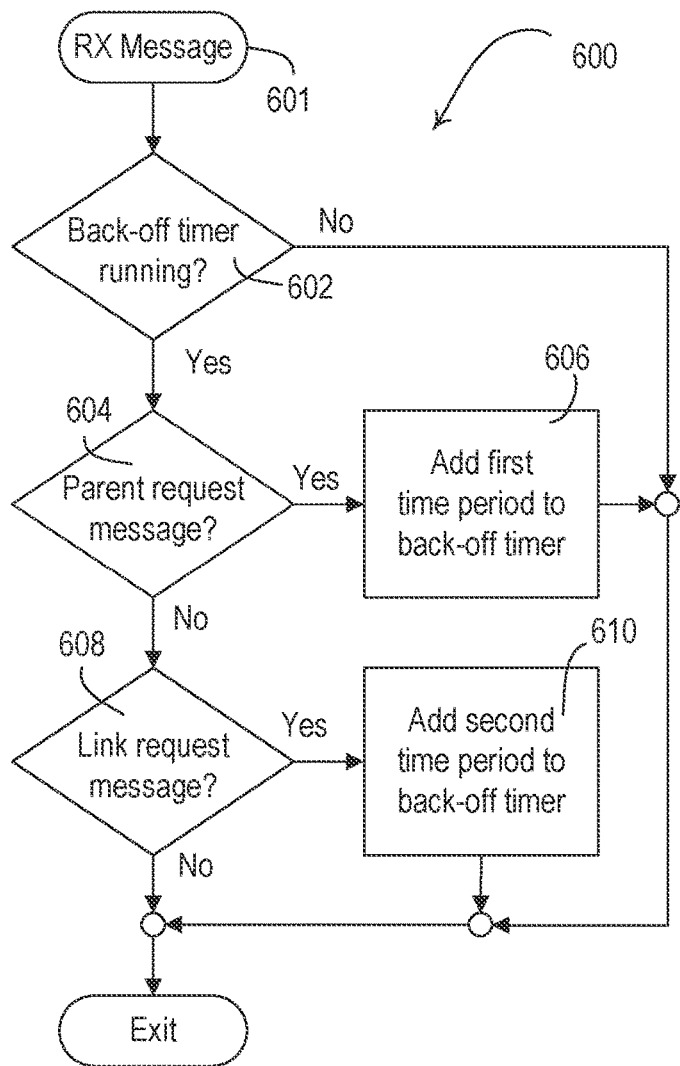
FIGS. 6A and 6B are flowcharts of other example procedures for attaching to another device on a network.

FIG. 6A is a flowchart of an example procedure 600 performed by a control device in response to receiving a message. For example, the message may be received via a network or network partition (e.g., the networks 200a, 200b, 200c, 200d and/or the network partitions 201, 202, 203). The procedure 600 may be performed by the control device while the control device is attempting to attach to another device (e.g., a parent device) on the network. For example, the procedure 600 may be performed by control devices that are not attached to a parent device (e.g., the end devices 230a, 230b, the router eligible end device 240, and/or the sleepy end device 250). As illustrated in FIG. 6A, the procedure 600 may be performed by the control device in response to receiving a message (e.g., a message transmitted by a control device in the network described herein) at 601.

At 602, the control device may determine if a back-off timer (e.g., the back-off timer started at 510 of the procedure 500) is running (e.g., to determine if the control device performing the procedure 600 is presently attempting to attach to a parent device on a network), for example, while listening to traffic on the network. If the back-off timer is not running at 602, the procedure 600 may exit. If the back-off timer is running at 602 (e.g., the control device is presently trying to attach to a parent device on the network), the control device may determine whether the message received is a parent-request message at 604. As described herein, a parent-request message may be transmitted by a control device attempting to attach to a another device (e.g., a router device or leader device, also referred to herein as potential parent devices) on the network and establish a parent-child link with the router device (e.g., a control device attempted to attach to the network as a child device of the router device attached to the network). Further, the potential parent devices (e.g., leader devices and/or router devices) that receive the parent-request message may transmit responses to the parent-request message. The responses to the parent-request message may be transmitted at the same or substantially the same time, which may increase the likelihood of message collisions within the network. Messages that collide with each other, for example, may not be received and the device that transmitted the parent-request message may fail to attach to another device on the network. Accordingly, if the message is a parent-request message at 604, the control device may add a first period of time to a back-off timer (e.g., the back-off timer started at 510 of the procedure 500) at 606. In examples, the control device may add the first period of time to a back-off timer (e.g. the back-off timer started at 510 of the procedure 500) based on a number of attachment messages transmitted on the network during the back-off period of time (e.g., while listening to traffic on the network during the back-off period). For example, the first period of time may be a period of time that includes 300 ms. Adding time to the back-off timer (e.g., extending a back-off period of time) may reduce the likelihood that message collisions occur and allow other devices to attach to parent devices on the network without interference, which may optimize formation of the network (e.g., a reduce in the amount of time to form the network having the single network partition). In addition, adding time to the back-off timer may allow for devices to attach to the network sequentially, for example, such that a plurality of parent-request messages are not transmitted at the same or substantially the same time.

At 608, the control device may determine if the received message is a link-request message or not. A link-request message may be transmitted by another router device (e.g., a router eligible end device that has just been upgraded to a router device) to establish a link (e.g., an auxiliary parent link and/or a router-to-router link) with the other router devices on the network. Similar to the parent-request message, the leader devices and/or router devices that receive the link-request message may each transmit link-response messages in response to the link-request messages. The link-response messages transmitted by the leader devices and/or router devices may be transmitted at the same or substantially the same time, which may increase the likelihood of message collisions within the network. Accordingly, if the received message is a link-request message at 608, the control device may add a second period of time to a back-off timer (e.g., the back-off timer started at 510 of the procedure 500) at 710. The second period of time may be a period of time that is greater than the first period of time. For example, the second period of time may be 625 ms. As described herein, adding time to the back-off timer may allow a greater number of messages to be processed by a receiving device and/or reduce the likelihood that message collisions occur by allowing other devices to attach to the network, which may optimize formation of the network (e.g., a reduce in the amount of time to form the network having the single network partition). In addition, adding time to the back-off timer may allow for devices to attach to the network sequentially, for example, such that a plurality of link-request messages are not transmitted at the same or substantially the same time. If the message is not a link-request message at 604 or a parent-request message at 608, the procedure 600 may exit.

Figure 6B:
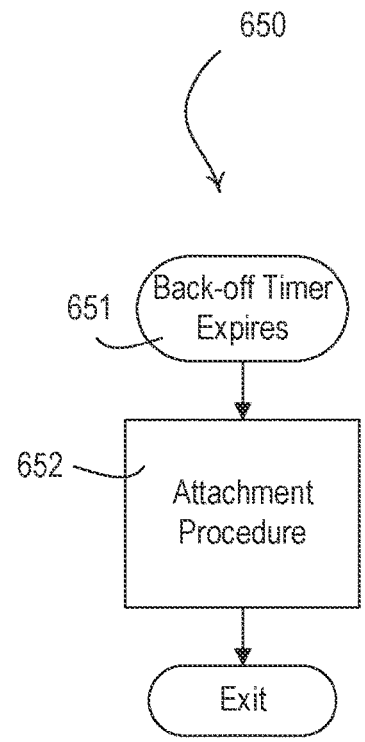

FIG. 6B is a flowchart of an example procedure 650 that may be performed by a control device in response to expiration of (e.g., after the expiration of) the back-off timer (e.g., the back-off timer started at 510 of the procedure 500). The procedure 650 may be performed by the control device while the control device is attempting to attach to another device (e.g., a parent device) on a network or network partition (e.g., the networks 200a, 200b, 200c, 200d and/or the network partitions 201, 202, 203). For example, the procedure 650 may be performed by the end devices 230a, 230b, the router eligible end device 240, and/or the sleepy end device 250 when these devices are not attached to a parent device. When the back-off timer expires at 651, the control device may initiate an attachment procedure at 652 (e.g., to enable the control device to attach to the router device and transmit and receive messages on the network through the router device). As described herein, the attachment procedure may include transmitting one or more attachment messages (e.g., parent-request messages and parent-response messages). For example, a parent-request message may be transmitted by the control device to a router device to attach to a router devices on the network to establish a parent-child link (e.g., a request to make the router device a parent device of the device) between the control device (e.g., the child device) and a router device (e.g., the parent device). After the parent-request message is transmitted, the control device performing the procedure 650 may receive a plurality of parent-response messages in response to the transmitted parent-request message (e.g., from any router device that receives the transmitted parent-request message). Due to the transmission of the parent-request message after the expiration of the back-off timer (e.g., which is initialized to a random value as shown in FIG. 5), the parent-request messages transmitted from the plurality of devices attempting to join the network may be sent at different times and allow for a greater number of messages to be properly processed by the router devices.

As the number of control devices attempting to attach to a network increases, the back-off timers running on each of the respective control devices may expire at the same or substantially the same time. If the control device receives a message while the back-off timer is running, the control device may add a period of time to the back-off timer. In addition, each of the respective control devices may transmit a parent-request message to attach to the network in response to expiration of the back-off timer. However, the back-off timer of a respective control device may "lose time" while processing the messages that are received while the back-off timer is running (e.g., keep the back-off timer running while processing the message). In addition, as described herein, the back-off timer of a respective control device may be initialized to a number randomly generated from a range of numbers. As the number of control devices attempting to attach to a network increases, the likelihood that multiple control devices initialize their respective back-off timer to the same random number may increase. Similarly, as the number of load control devices attempting to attach to a network increases, the likelihood that each of the respective back-off timers expire at the same or substantially the same time may increase. If the back-off timers expire at the same or substantially the same time, the parent-request messages may be transmitted at the same or substantially the same time, which may result in message collisions and/or the control devices failing to attach to the network. Accordingly, the control device may vary the back-off timer, for example, based on the number and/or type of messages received while the back-off timer is running.

Figure 7A:
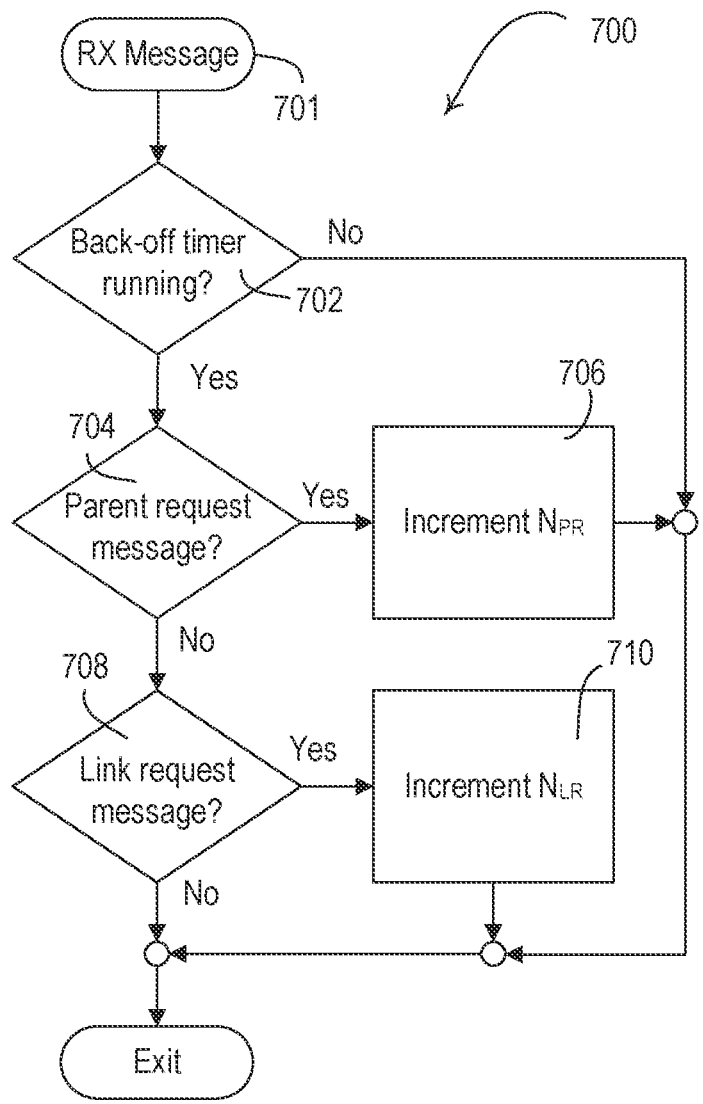
FIG. 7A is a flowchart of an example procedure for counting the number of parent-request message attachment messages received while a back-off timer is running.

FIG. 7A is flowchart of an example procedure 700 performed by a control device in response to receiving a message. For example, the message may be received via a network or network partition (e.g., the network 200a, 200b, 200c, 200d, and/or the network partitions 201, 202, 203). The procedure 700 may be performed by the control device while the control device is attempting to join a network, for example, by initiating an attachment procedure to attach to another device (e.g., a router device) on the network. For example, the procedure 700 may be performed by the end devices 230a, 230b, the router eligible end device 240, and/or the sleepy end device 250 when these devices are not joined to a network or attached to a control device joined to the network. As illustrated in FIG. 7A, the procedure 700 may be performed in response to receiving a message (e.g., a message transmitted by a control device in the network described herein) at 701. Although not shown in FIG. 7A, the procedure 700 may also be performed while a back-off timer is not running.

At 702, the control device may determine if a back-off timer (e.g., the back-off timer started at 510 of the procedure 500) is running (e.g., to determine if control device performing the procedure 700 is presently attempting to attach to a parent device on a network). If the back-off timer is not running at 702, the procedure 700 may exit. If, however, the back-off timer is running at 702 (e.g., the control device is presently trying to attach to a parent device on the network), the control device may determine whether the message received at 701 is a parent-request message at 704.

A control device may track the number of parent-request messages and link-request messages received while a back-off timer is running. At 704, the control device may determine whether the message is a parent-request message. As described herein, a parent-request message may be transmitted to attach to another device on a network, and multiple messages may be transmitted in response to the transmission of a parent-request message (e.g., transmitted by the parent devices attached to the network). If the received message is a parent-request message at 704, the control device may increment a first count $N_{PR}$ (e.g., a variable) at 706. The first count $N_{PR}$ may indicate the number of parent-request messages received by the control device while a back-off timer is running.

At 708, the control device may determine whether the message is a link-request message. As described herein, a link-request message may be transmitted by a parent device to attach to other router devices attached to a network. In addition, multiple messages may be transmitted in response to the transmission of a link-request message. If the received message is a link-request message, the control device may increment a second count $N_{LR}$ (e.g., a variable) at 710. The second count $N_{LR}$ may indicate the number of link-request messages received by the control device while a back-off timer is running. If the message is not a link-request message at 704 or a parent-request message at 708, the procedure 700 may exit.

Figure 7B:
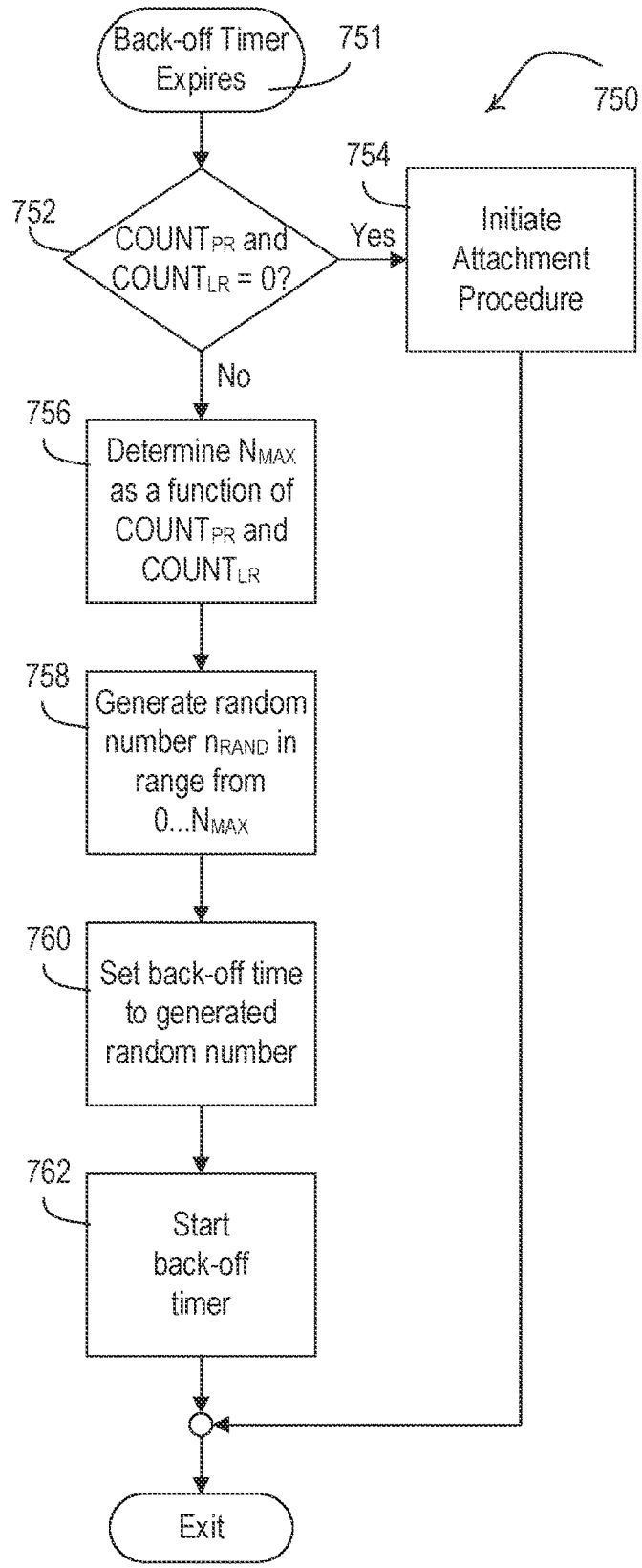
FIG. 7B is a flowchart of an example procedure to be performed after a back-off timer expires.

FIG. 7B is flowchart of an example procedure 750 performed by a control device in response to the expiration of a back-off timer (e.g., the back-off timer started at 510 of the procedure 500). The procedure 750 may be performed by the control device while the control device is attempting to attach to another device (e.g., a parent device) on a network or network partition (e.g., the networks 200a, 200b, 200c, 200d and/or the network partitions 201, 202, 203). For example, the procedure 750 may be performed by the end devices 230a, 230b, the router eligible end device 240, and/or the sleepy end device 250 when these devices are not attached to a parent device. As illustrated in FIG. 7B, the procedure 750 may be performed in response to the expiration of a back-off timer at 751. At 752, the control device may determine whether any parent-request messages or link-request messages were received while the back-off timer was running. For example, the control device may determine whether the first count $N_{PR}$ and the second count $N_{LR}$ are both equal to 0. As described herein, the first count $N_{PR}$ and the second count $N_{LR}$ may respectively indicate the number of parent-request messages and link-request messages that were received by the control device while the back-off timer is running. Accordingly, if both of the first count $N_{PR}$ and the second count $N_{LR}$ are equal to 0, neither a parent-request message nor a link-request message have been received.

When a control device fails to receive a parent-request message or a link-request message, the control device may determine that another device did not attempt to attach to another device on the network or attempt to attach to a parent device on the network. In addition, the control device may determine that the present conditions of the network are optimal for the control device to attempt to attach to another device on the network by transmitting a parent-request message (e.g., another device may not attempt to attach to the network at the same or substantially the same time, which may decrease the likelihood of message collisions and/or network attachment failure). For example, when the first count $N_{PR}$ and the second count $N_{LR}$ are both equal to 0, the control device may assume that another device may not attempt to attach to another device the network as the control device. Accordingly, if the first count $N_{PR}$ and the second count $N_{LR}$ are both equal to 0 (e.g., no parent-request messages or link-request messages were received while the back-off timer was running) at 752, the control device may initiate an attachment procedure at 754. For example, the attachment procedure may include transmitting one or more attachment messages (e.g., parent-request messages and/or parent-response messages).

If, however, the both of the first count $N_{PR}$ and the second count $N_{LR}$ are not equal to 0 (e.g., one or more parent-request messages or link-request messages were received while the back-off timer was running), the control device may determine a maximum random number value $N_{MAX}$ as a function (e.g., a weighed sum) of the first count $N_{PR}$ and the second count $N_{LR}$ at 756. The weights of each of the first count $N_{PR}$ and the second count $N_{LR}$ may, for example, be different. For example, as the values of the first count $N_{PR}$ and the second count $N_{LR}$ increase, the maximum random number value $N_{MAX}$ may also increase. Similarly, as the values of the first count $N_{PR}$ and the second count $N_{LR}$ decrease, the maximum random number value $N_{MAX}$ may decrease. The maximum random number $N_{MAX}$ may be the maximum number in a range of numbers, from which another value for the back-off timer may be selected (e.g., randomly selected).

At 758, the control device may generate a random number $N_{RAND}$ from a range of numbers that spans 0 to maximum random number value $N_{MAX}$, inclusively. For example, as the maximum random number value $N_{MAX}$ increases (e.g., the range of numbers from which the random number may be generated increases), the likelihood that multiple devices select the same random number (e.g., select the same back-off timer) may decrease, which may decrease the likelihood of message collision. At 860, the control device may set the back-off timer to the random number $N_{RAND}$ generated at 758. At 862, the control device may start the back-off timer (e.g., counting down), and the procedure 750 may exit.

As described herein, control devices may join a network by initiating an attachment procedure with a router device. Completion of the attachment procedure may result in the control device being assigned the role of an end device on the network that is attached to the router device. In addition, the control device and the router device may form a parent-child link, e.g., the control device may be a child device of the router device, and the router device may be a parent device of the control device. Over time, other devices may join the network, for example, by attaching to the router device (e.g., or another router device joined to the network). As the number of devices joined to the network increases, the network my upgrade the role of certain devices joined to the network to the role of a router device (e.g., upgrading certain router eligible end devices to the role of a router device, as described herein). Other devices may join to the network by initiating attachment procedures with the upgraded router devices, growing the network.

Figure 8A:
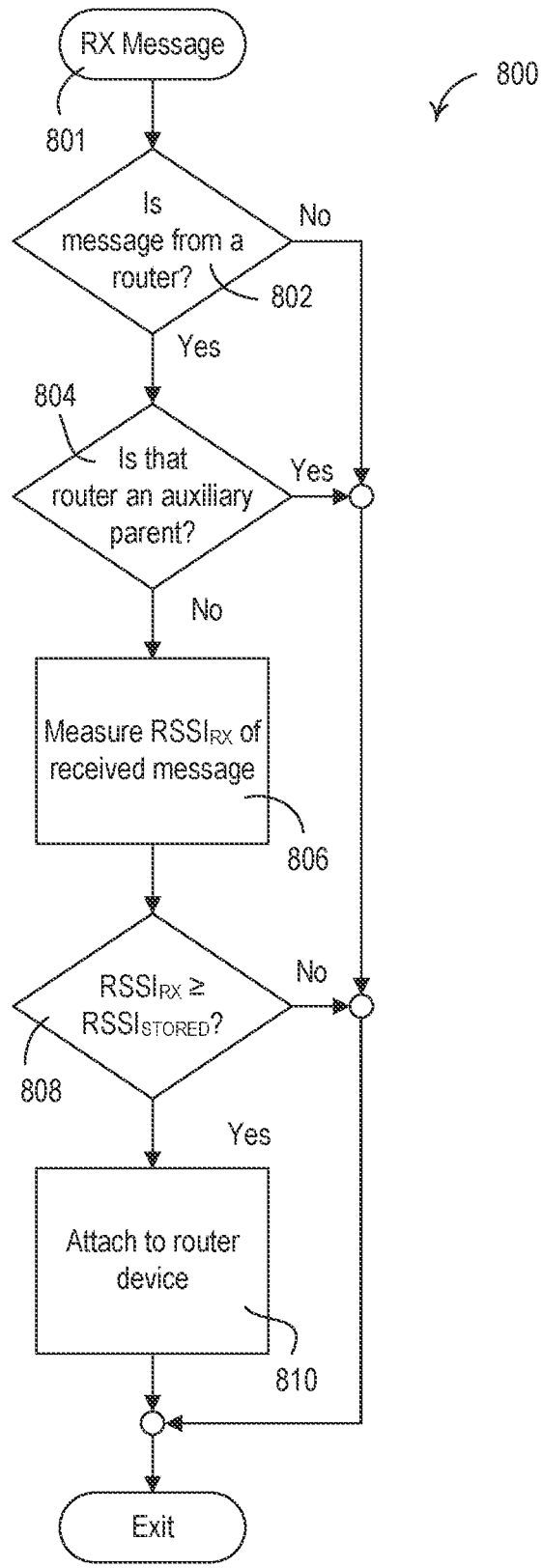
FIGS. 8A and 8B are flowcharts of example procedures associated with attaching to a parent device.
Figure 8B:
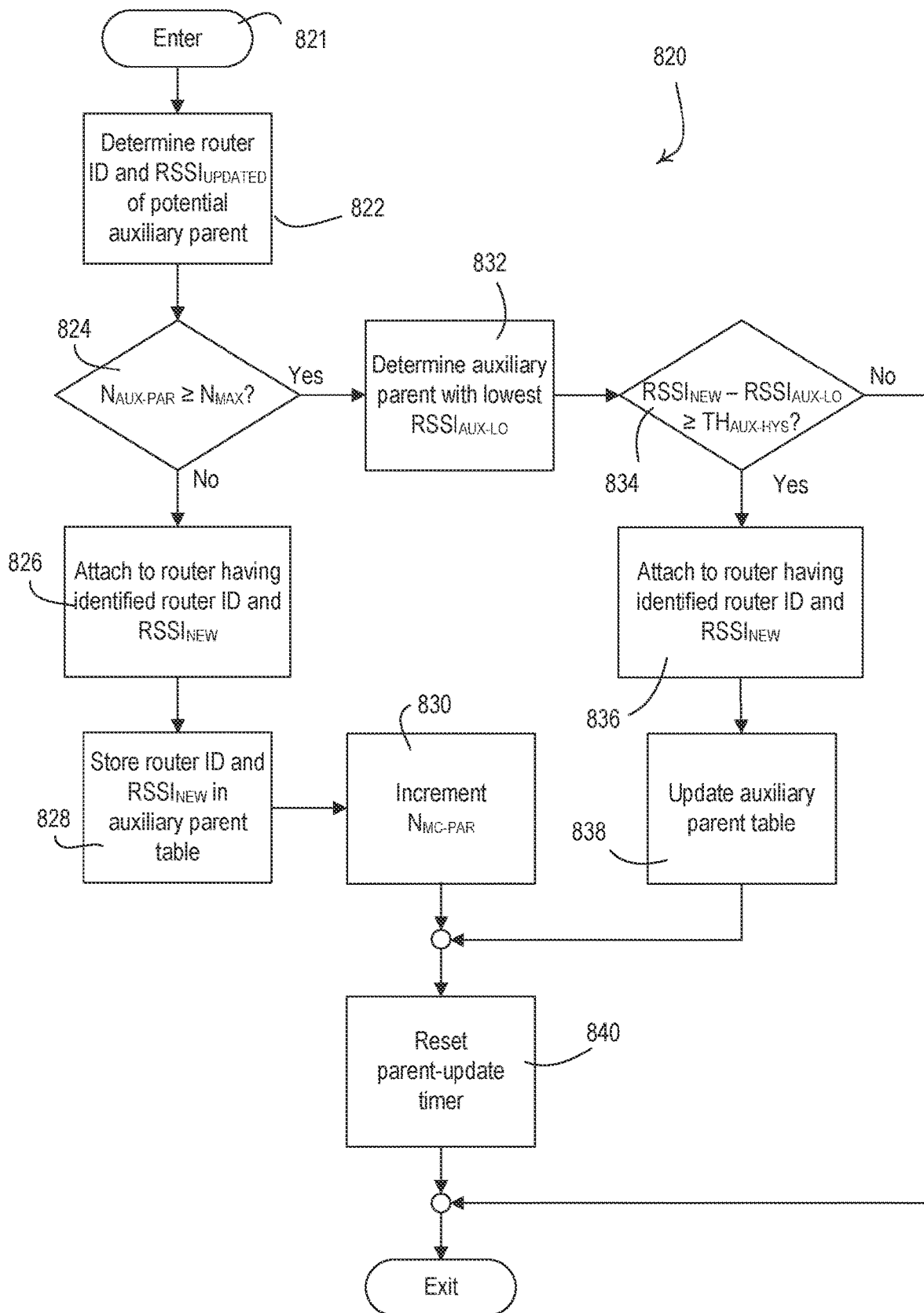
Figure 8C:
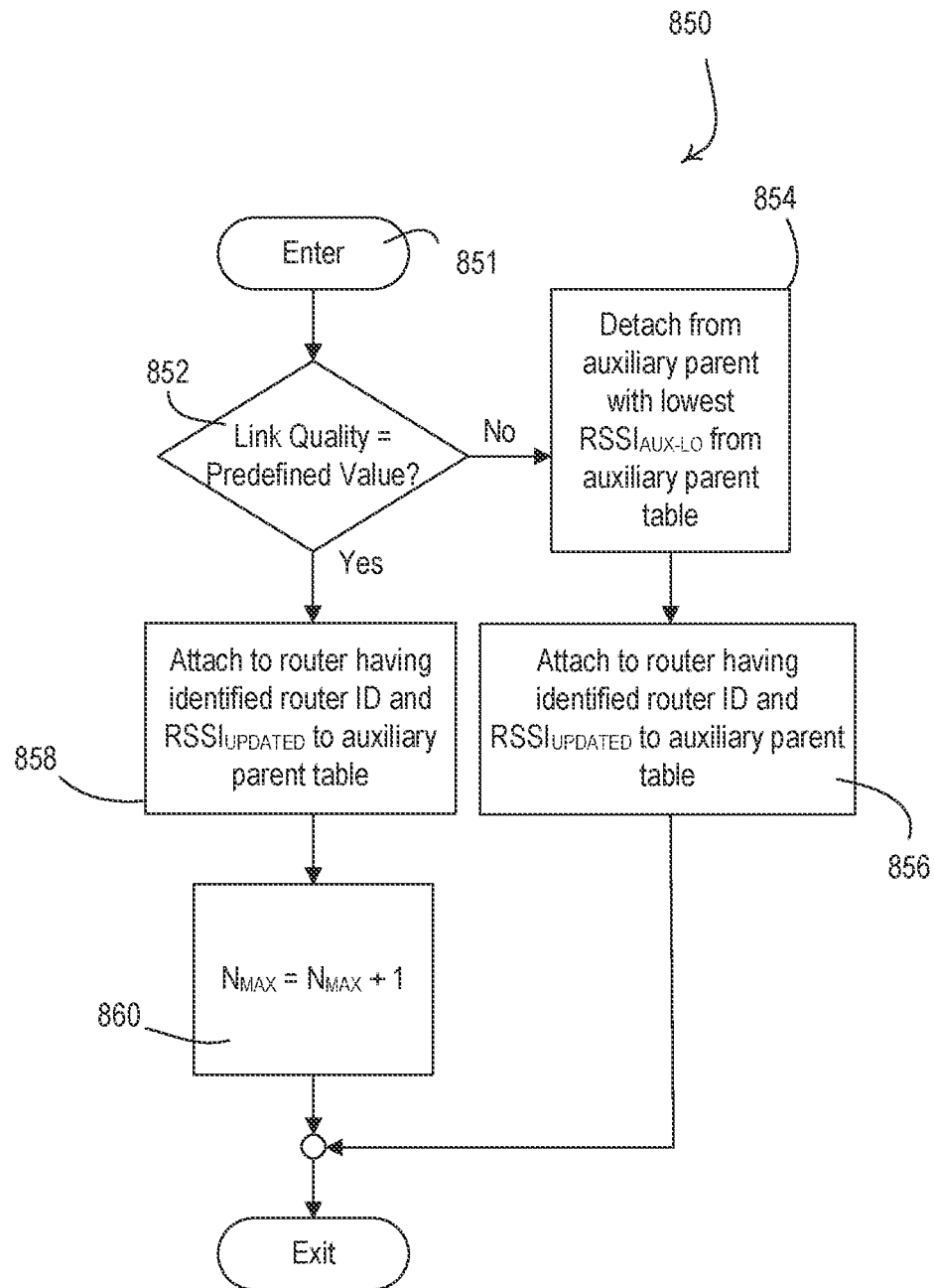
FIG. 8C is a flowchart of an example procedure to be performed by a control device to update an auxiliary parent table of one or more auxiliary parent devices.

As the number of router devices on the network increases, however, certain parent-child links may no longer be optimal. For example, the router device that a control device attaches to when it initially joins the network may no longer be the optimal router device to be attached to (e.g., the optimal parent device of the control device), because another router device may exist on the network and the control device may have a greater link quality and/or lower link cost on the communication link with the other router device. A similar situation may arise for the auxiliary parent devices attached to the control device. As a result, the control device may attach to another router device to establish a parent-child link with the other router device joined that network and/or attach to another auxiliary parent device. FIGS. 8A to 8C illustrate example procedures for determining to establish a parent-child link with another router device joined that network and/or attach to another auxiliary parent device.

FIG. 8A is a flowchart of an example procedure 800 performed by a control device in response to receiving a message. For example, the message may be received via a network or network partition (e.g., the networks 200a, 200b, 200c, 200d and/or the network partitions 201, 202, 203). The procedure 800 may be performed by the control device after the control device has attached to another device (e.g., a parent device) on the network. For example, the control device performing the procedure 800 may be a child device attached to a parent device on the network. Referring now to FIG. 2A, the procedure 800 may be performed by the end devices 230a, 230b, the router eligible end device 240, and/or the sleepy end device 250. As illustrated in FIG. 8A, the procedure 800 may be performed by the control device in response to receiving a message at 801.

At 802, the control device may determine whether the received message is from a router device on the network (e.g., a leader device, such as the leader device 210, and/or a router device, such as one of the router devices 220a-220d). If the message is received from a control device other than a router device, the procedure 800 may end. If, however, the messages is received from a router device, the control device may determine if the router device is already an auxiliary parent device of the control device at 804 (e.g., determine if the message received at 801 is an auxiliary parent of the control device). If the message was received from an auxiliary parent device of the control device, the procedure 800 may exit (e.g., as the control device is already attached to that router device).

If the message was received from a router device that is not an auxiliary parent device of the control device, the control device may determine (e.g., measure) a present received signal strength indicator magnitude of the received message at 806. For example, the control device may measure a present received signal strength indicator $RSSI_{RX}$ of the received message at 9\806. The present received signal strength indicator $RSSI_{Rx}$ may indicate the signal strength of the message and/or quality of communications from the router device from which the message was received to the control device. The control device may use the present received signal strength indicator $RSSI_{RX}$ to determine which of the plurality of router devices on the network to attempt to establish as an auxiliary parent device (e.g., which router device to attach to as an auxiliary parent device). The control device may store (e.g., may have previously stored) a stored received signal strength indicator $RSSI_{STORED}$, which may indicate the router device from which the control device received a message having the highest received signal strength indicator (e.g., as compared to messages received from other router devices).

The control device may determine whether a communication metric of an a router device that is not attached to the control device indicates a stronger potential communication link than the communication metric of a parent device. For example, as illustrated in FIG. 8, the control device may compare the present received signal strength indicator $RSSI_{RX}$ to the stored received signal strength indicator $RSSI_{STORED}$ at 808. The stored received signal strength indicator $RSSI_{STORED}$ may be a predefined threshold and/or may indicate the router device from which the control device received a message having the highest received signal strength indicator. If the present received signal strength indicator $RSSI_{RX}$ is less than the stored received signal strength indicator $RSSI_{STORED}$, the procedure 800 may exit. If, however, the present received signal strength indicator $RSSI_{RX}$ is greater than or equal to the stored received signal strength indicator $RSSI_{STORED}$, the control device may initiate an attachment procedure with the router device at 810 to establish an auxiliary parent link (e.g., by transmitting attachment messages configured to establish an auxiliary parent link, such as a link request message). In addition, a router identifier (e.g., a router ID) for the router device and the present received signal strength indicator $RSSI_{RX}$ may be stored (e.g., the present received signal strength indicator $RSSI_{RX}$ may be stored as the stored received signal strength indicator $RSSI_{STORED}$) in memory. As described herein, the control device may, for example, initiate an attachment procedure with the router device (e.g. attaching to the router device such that the router device becomes an auxiliary parent of the control device) that corresponds to the router identifier of the router device stored in the memory (e.g., as described herein with reference to FIG. 8B). For example, the router identifier for the router device and the present highest received signal strength indicator $RSSI_{RX}$ may be stored in memory in an auxiliary parent table. As described herein, the auxiliary parent table may include a list of auxiliary parent devices with which a respective child device is attached to (e.g., synchronized with and/or able to process messages received from)

FIG. 8B is a flowchart of an example procedure 820 performed by a control device to attach to one or more auxiliary parent devices. As described herein, a child device may attach with an auxiliary parent device to increase the reliability of communications within a network (e.g., the networks 200a, 200b, 200c, 200d and/or the network partitions 201, 202, 203). A router device on the network (e.g., a leader device, such as the leader device 210, and/or a router device, such as one of the router devices 220a-220d) may operate as an auxiliary parent device. The procedure 820 may be periodically performed by the control device at 821. For example, the procedure 820 may be performed at a periodic interval of thirty-two (32) seconds.

At 822, the control device may determine a router identifier and a received signal strength identifier $RSSI_{UPDATED}$ of a router device that the control device may determine whether to establish an auxiliary parent link with (e.g., a potential auxiliary parent device). For example, the control device may, at 822, retrieve a router ID and received signal strength indicator of a stored router device that the control device may determine whether to establish an auxiliary parent link with (e.g., the router device stored at 810 of the procedure 800). In addition, the control device may, at 822, determine a router ID of a router device having a highest stored received signal indicator of router devices stored in an auxiliary parent table. At 824, the control device may determine if a variable $N_{AUX-PAR}$ indicating a number of auxiliary parent devices with which the control device is already attached is greater than or equal to a maximum value $N_{MAX}$. The maximum value $N_{MAX}$ may indicate a maximum number of auxiliary parent devices with which the control device may be attached. The maximum value $N_{MAX}$ may be pre-configured and/or updated (e.g., updated based on changes to the network). For example, the maximum value $N_{MAX}$ may be pre-configured to 10.

If the variable $N_{AUX-PAR}$ is less than the maximum value $N_{MAX}$ at 824, the control device may, at 826, initiate an attachment procedure to establish an auxiliary parent link with the router device that was identified as the potential auxiliary parent (e.g., at 822). As described herein, an attachment procedure may include transmitting one or more attachment messages that are configured to establish an auxiliary parent link with the identified router device (e.g., link-request messages). After attaching to the identified router device, the router ID and the received signal strength indicator $RSSI_{UPDATED}$ of the updated auxiliary parent may be stored in an auxiliary parent table at 828, and the variable $N_{AUX-PAR}$ may be incremented at 830, before the procedure 820 exits.

If the variable $N_{AUX-PAR}$ is greater than or equal to the maximum value $N_{MAX}$ at 824, the control device may determine the auxiliary parent having a lowest received signal strength indicator $RSSI_{AUX-LO}$ in the auxiliary parent table at 832. The auxiliary parent with the lowest received signal strength indicator $RSSI_{AUX-LO}$ may be an auxiliary parent that the control device attached to during initial network formation. However, as described herein, after time elapses the network may include other routers that may provide the control device with improved communications over the network (e.g., increase the likelihood that the control device successfully sends and/or receives messages). In addition, if the control device were to attach to a router that has a stronger communications link with the control device, the control device may experience improved communications on the network.

The control device may determine whether a respective communication metric of a potential auxiliary parent device indicates a stronger potential communication link than the communication metric of a current auxiliary parent device. For example, as illustrated in FIG. 8B, the control device may determine if the difference between the received signal strength indicator $RSSI_{UPDATED}$ of the potential auxiliary parent and the lowest received signal strength indicator $RSSI_{AUX-LO}$ in the auxiliary parent table is greater than or equal to a hysteresis threshold $TH_{AUX-HYS}$ (e.g., $RSSI_{UPDATED} - RSSI_{AUX-LO} \geq TH_{AUX-HYS}$) at 834. The hysteresis threshold $TH_{AUX-HYS}$ may be predefined (e.g., approximately 10 dB) or variable, for example, based on the lowest received signal strength indicator $RSSI_{AUX-LO}$ in the auxiliary parent table. If the difference between the received signal strength indicator $RSSI_{UPDATED}$ of the potential auxiliary parent and the lowest received signal strength indicator $RSSI_{AUX-LO}$ in the auxiliary parent table is less than the hysteresis threshold $TH_{AUX-HYS}$ at 834, the procedure 820 may exit.

If the difference between the received signal strength indicator $RSSI_{UPDATED}$ of the potential auxiliary parent and the lowest received signal strength indicator $RSSI_{AUX-LO}$ in the auxiliary parent table is greater than or equal to the hysteresis threshold $TH_{AUX-HYS}$ at 8344, the control device may, at 836, initiate an attachment procedure with the router identified as the potential auxiliary parent (e.g., at 822) to establish an auxiliary parent link, which may improve communications for the control device on the network. As described herein, an attachment procedure to establish an auxiliary parent link may include transmitting one or more attachment messages configured to establish an auxiliary parent link (e.g., link-request messages) to the router identified as the potential auxiliary parent. At 838, the control device may update the auxiliary parent table (e.g., to indicate attachment/auxiliary parent link with the updated auxiliary parent device). For example, the control device may remove the router ID of the auxiliary parent having the lowest received signal strength indicator $RSSI_{AUX-LO}$ from the auxiliary parent table and add the router ID and corresponding received signal strength indicator $RSSI_{UPDATED}$ of the updated auxiliary parent to the router table at 838.

After adding a router ID and a received signal strength indicator of a new auxiliary parent may in an auxiliary parent table at 828 and/or after updating the auxiliary parent table at 838, the control device may reset a parent-update timer (e.g., to 5 minutes) at 840, before the procedure 820 may exit. The parent-update timer may be used as a trigger for the child device to determine if the child device should attach to an updated parent device to improve communications between the child device and its parent device (e.g., as will be described in greater detail below with reference to FIG. 11).

FIG. 8C is a flowchart of an example procedure 850 performed by a control device to update an auxiliary parent table of one or more auxiliary parent devices. For example, the procedure 850 may be performed at 838 of procedure 820 illustrated in FIG. 8B to add an auxiliary parent to the auxiliary parent table. Referring again to FIG. 8C, the control device may be a child device that is attached to a current parent device (e.g., by establishing a parent-child link with the current parent device) and one or more auxiliary parent devices (e.g., by establishing auxiliary parent links with the one or more auxiliary parent devices). As described herein, a child device may attach to an auxiliary parent device to increase the reliability of communications within a network (e.g., the networks 200a, 200b, 200c, 200d, and/or the network partitions 201, 202, 203). A router device on the network (e.g., a leader device, such as the leader device 210, and/or a router device, such as one of the router devices 220a-220d) may operate as an auxiliary parent device of the child device, and the child device may receive multicast messages via the auxiliary parent device. The auxiliary parent table stored at the child device may include a list of auxiliary parent devices with which the child device is configured to communicate (e.g., attached to via an auxiliary parent link and/or able to process messages received from).

As shown in FIG. 8C, a control device may determine whether a respective communication metric of a potential auxiliary parent device indicates a stronger potential communication link than the communication metric of a current auxiliary parent device. At 851, the procedure 850 may begin, which, as described herein, may add a potential auxiliary parent to the auxiliary parent table (e.g., at 838 during an execution of the procedure 820). At 852, the control device may determine whether the potential auxiliary parent has a link quality of a predefined number. The communications link between a respective control device and another device (e.g., a router device) may be measured and/or defined by a link quality, as described herein. The link quality may be communication metric that indicates the quality of communications link. The link quality may be defined for a respective communication link as 0, 1, 2, or 3, for example. A lowest link quality (e.g., a link quality equal to 0 or 1) may be indicative of a relatively low quality communication link between the respective control devices (e.g., a communications link where the likelihood of failed transmission is relatively high). A highest link quality (e.g., a link quality equal to 3) may be indicative of a relatively high quality communication link between the respective control devices (e.g., a communications link where the likelihood of successful transmission is relatively high).

The control device may determine whether the potential auxiliary parent has a link quality equal to a predefined value. The predefined value may be the highest quality value assigned to the link quality for a communication link (e.g., link quality equal to 3). The potential auxiliary parent being analyzed may be a router device having a highest stored received RSSI of router devices stored in the auxiliary parent table.

If the auxiliary parent to be added to the auxiliary parent table has a link quality equal to the predefined value (e.g., link quality of 3), the control device may, at 858, initiate an attachment procedure with the auxiliary parent to be added to the auxiliary parent table. In addition, the control device may add the auxiliary parent to the auxiliary parent table. The control device may also increment the maximum value $N_{MAX}$ by one (e.g., $N_{MAX}=N_{MAX}+1$) at 960. As described herein, the maximum value $N_{MAX}$ may indicate a maximum number of auxiliary parent devices that the control device may be attached to.

If, the auxiliary parent to be added to the auxiliary parent table does not have a link quality equal to the predefined value (e.g., link quality of 3), the control device may, at 854, detach from an auxiliary parent with a lowest received signal strength indicator ($RSSI_{AUX-LO}$) from the auxiliary parent table. In addition, the control device may initiate an attachment procedure to attach to the potential auxiliary parent and add the router identifier and a received signal strength identifier $RSSI_{UPDATED}$ of the potential auxiliary parent to the auxiliary parent table at 856. As described herein, the router identifier and a received signal strength identifier $RSSI_{UPDATED}$ of potential parent device may have been determined during an execution of the procedure 820 (e.g., at 822 of the procedure 820).

The role of a control device attached to a network may be adjusted over time. For example, a router eligible end device may be adjusted to the role of a router device. A router eligible end device may be adjusted to the role of router device when the number of router devices joined to the network are below a threshold. In addition, a router eligible end device may be adjusted to the role of a router device when another device requests that the router eligible end device adjusts to the role of a router device (e.g., when the other device is unable to attach to a router device joined to the network). The other device may request that the router eligible end device adjusts to the role of a router device when the other device fails to attach to a parent device, which may result in the other device failing to join to the network. As described herein, the other device may fail to attach with a parent device when the other device fails to receive a response to a parent-request message, for example, due to message collisions in the network. In response to failing to receive a response to a parent-request message, a control device may attempt to form a new network or network partition (e.g., which as described herein may increase the time for formation of a single network), or request that another device upgrade to the role of a router device so that the control device may initiate an attachment procedure with the newly upgraded router device. When the router eligible end device received a request to adjust to the role of a router device, the router eligible end device may request permission to adjust to the role of the router device, for example, from a leader device. The leader device may accept request to adjust to the role of a router device by providing the router eligible end device with a router identifier.

A router device that is already joined to a network or network partition may attach to another network and maintain the role of a router device on the other network. For example, the router device may attach to the other network and attempt to use the router identifier assigned for the initial network or network partition. If the router device maintains the assigned router identifier, the child devices of the router device may also attach (e.g., migrate) to the other network, for example, without transmitting additional messages (e.g., additional parent-request messages to attach to the other network).

Figure 9A:
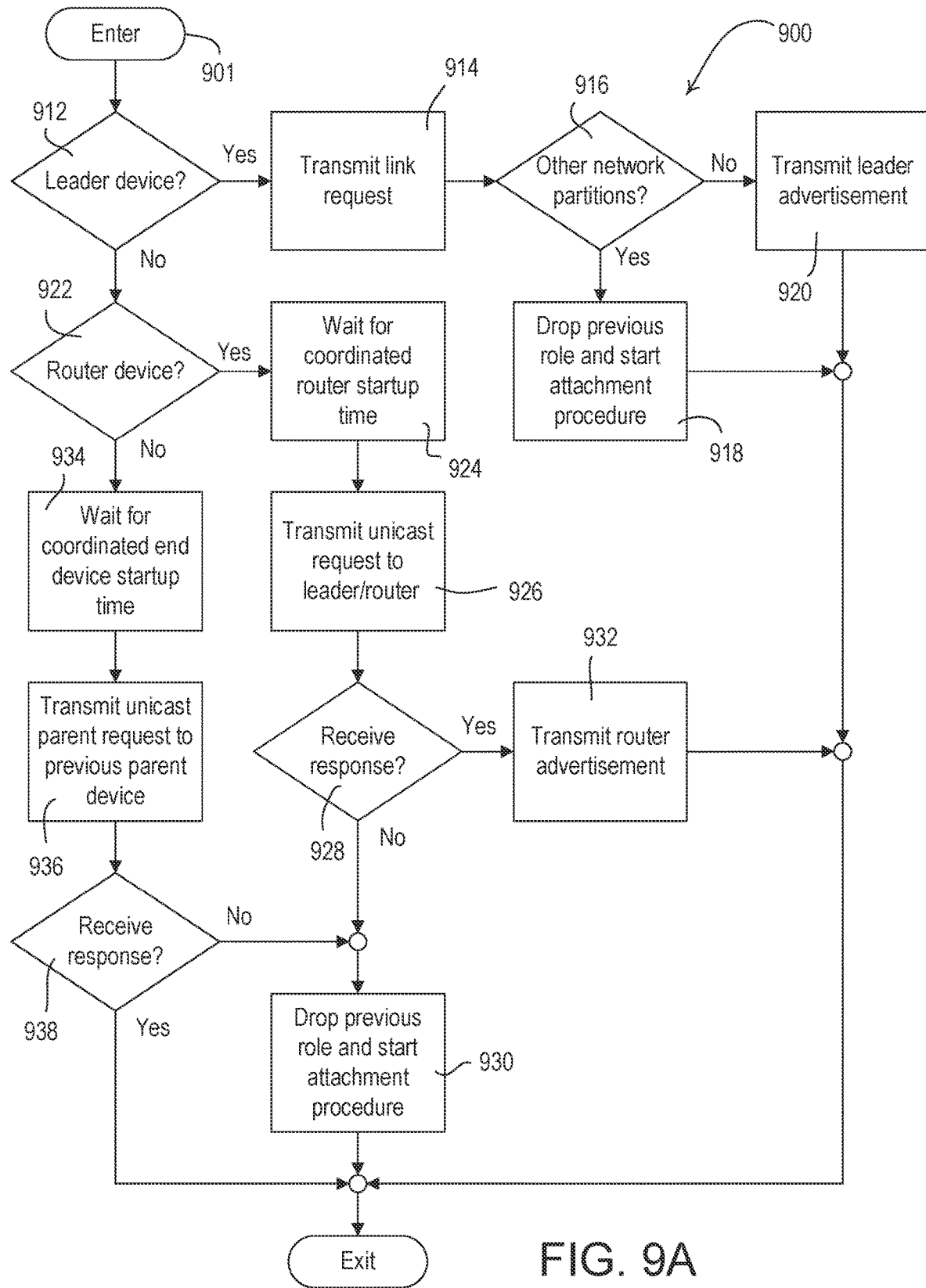
FIGS. 9A and 9C are flowcharts of example procedures to be performed by a control device prior to attaching to another device on the network.

The network may be re-formed using information stored at the control devices during a prior formation of the network. FIGS. 9A and 9C illustrate example procedures for re-forming a previously-formed network (e.g., a network reformation procedure). For example, the procedures illustrated in FIGS. 9A and 9C may be performed after a blackout or another event that causes the power supplied to the respective control devices in the network to cease. As described herein, after a previously-formed network loses power and the devices therein subsequently regains power, the control devices that were attached to the network (e.g., attached to the network prior to the loss of the power) may attempt to reattach to and/or re-form the previously-formed mesh network. However, as the control device may regain power at the same or substantially the same time, each of the respective control devices may attempt to reattach to and/or re-form the network simultaneously, which may increase the likelihood of message collisions and increase the amount of time until network formation is complete.

In order to reduce the likelihood of message collisions and the amount of time until network formation is complete, the control devices may attempt to reattach to parent devices and re-form the network. After being powered on, control devices may attempt to resume a previous role in the previously-formed network. The previous role may be stored locally on each of the control devices. The control device that was the leader device of the previously-formed network may begin a startup procedure prior to other control devices in the load control system. The control devices that were non-leader router devices in the previously-formed network may delay their startup procedures to allow the leader device to startup and begin transmitting advertisement messages to the other router devices. The other router devices may begin their startup procedure during a predefined interval after being powered on (e.g., to allow the leader device to startup). For example, the other router devices may begin their startup procedure at a random time during the interval after the leader initiates its startup procedure. During the startup procedure at the router devices, each router device may attempt to attach to the leader device or another router device to which the router device was attached in the previously-formed network. The end devices may begin their startup procedures during a predefined interval after being powered on to allow the routers to perform their startup procedures and attached to the leader device or other router device. For example, the end devices may begin their startup procedure at a random time during the interval after the routers initiate their startup procedures. The predefined interval at the end devices may be longer than the predefined interval for which the router devices delay their startup procedure to allow the router devices time to perform attachment and re-form the previously-formed network.

FIG. 9A is a flowchart of an example procedure 900 for devices to reattach to parent devices and/or re-form a previously-formed network after a power loss and/or reset. The procedure 900 may be performed by a control device that was previously attached to the network prior to the power loss and/or reset. As illustrated in FIG. 9A, the procedure 900 may be begin at 901. For example, as described herein, the procedure 900 may be executed after a network power loss and/or reset, which may occur after a blackout or another event that causes the power supplied to the respective control devices attached to the previously-formed network to be interrupted.

At 912, the control device may determine whether the control device was the leader device of the previously-formed network. As described herein, the leader device may manage other control devices on the network. For example, the leader device may assign and maintain router identifiers for each of the router devices attached to the network. The leader device may be the first device role to attempt to re-form the previously-formed network. The control device may have a role identifier stored thereon in memory that may indicate the role of the control device in the previously-formed network. For example, the role identifier may indicate that the control device was a leader device of a previously-formed network. The role identifier may be stored with one or more network credentials for the network, such as the network address for the control device (e.g., a Thread network address). The control device may determine from this stored role identifier for the previously-formed network that it was a leader device of the previously-formed network at 912.

At 914, the control device (e.g., the leader device of the previously-formed network) may transmit a link-request message. For example, the link-request message may be sent as a multicast message. The link-request messages may be used to determine whether the network has already formed with another leader device. In one example, the previously-formed network may have been powered down and additional devices may have been added to the system, the location of devices may have been moved, and/or the space may have been reconfigured to cause interferers between devices to be added or removed. Due to potential changes to the network and/or the space in which the network is located, the leader device may transmit the link-request message to determine if there is another leader device on the network. For example, the link-request message may be transmitted to identify whether there is an already formed network being implemented. As such, the leader device may transmit the link-request message to determine whether other devices have powered on and already formed a network having another leader device. If the leader device receives a response to the link-request message, the leader device may be incapable of being the leader device on the network and may revert back to being an end device or another role on the network. The other control devices of the previously-formed network may fail to respond to the link request, as they may await a leader advertisement from the leader device and/or a coordinated startup time after powering up and turning on.

At 916, the control device may determine whether other network partition(s) exist, for example, based on receiving a response to the link request. For example, if another leader device receives the link-request message transmitted by the control device in the space in which the control device is located and transmits a response to the link-request message, the control device may determine that other network partitions exist and may drop the previous role as the leader device of the previously-formed network. The control device may drop the previous role as the leader device of the previously-formed network to start another attachment procedure at 918 (e.g., as described herein in conjunction with FIG. 5). The attachment procedure at 918 may be performed to form a network that may be differently configured than the previously-formed network.

If, however, a response to the link-request message fails to be received, the control device may determine that another network partition does not exist, and may transmit a leader advertisement message at 920. The leader advertisement message may be used to re-form the previously-formed network, for example, by triggering the router devices of the previously-formed network to attach to the leader device (e.g., transmit a link-request message to the leader device) and re-form the mesh of the previously-formed network. The router devices that were attached to the leader device in the previously-formed network may listen for the leader advertisement before initiating their attachment procedure.

At 922, the control device may determine whether the control device was a router device of the previously-formed network. The determination at 922 may be based on the role identifier stored in memory at the control device that indicates that the role of the router device in the previously-formed network. At 924, the control device (e.g., a router device of the previously-formed network) may wait for a coordinated startup time for a router device (e.g., a coordinated router startup time). The coordinated startup time may be unique for the device and/or based on the role identifier. For example, the coordinated startup time may be based on the time at which the control device is powered on, and/or an identifier that is assigned to a control device (e.g., during a claiming procedure). The coordinated startup time for a router device may be equal to a base delay time (e.g., which may be same for each router device) plus an offset delay time. The offset delay time may be based on the hop count between a respective router device and the leader device. For example, the base delay time may be the same for each of the routers that were previously attached to the previously-formed network and may allow the leader device of the previously-formed network to re-form to the network and be available for router devices to reattach. The offset delay time may be based on the hop count back to the leader device and such that the offset delay time for router devices that are farther away from the leader device is longer than for router devices that are closer to the leader device. Referring to FIG. 2E, for example, the offset delay time for router devices 225a, 225c, which are directly attached to the leader device 215, may be shorter than the offset delay time for router devices 225b, 225d, 225e, which are not directly attached to the leader device 215. Accordingly, the coordinated router startup time for router devices 225a, 225c may end before the coordinated startup time for router devices 225b, 225d, and 225e.

The offset delay time for each device may be a predefined period of time that is multiplied by the hop count for the control device. The hop count may be determined from the previously-formed network and may be stored at the control device. After awaiting the base delay time, the control device may await the offset delay time, which may be a hop-count-multiple of a predefined period of time, prior to starting the attachment procedure. The offset delay time being calculated based on the hop count of a control device from the leader device may allow for the router devices having a lower hop count from the leader device, or that are closer to the leader device, to perform the attachment procedure prior to router devices having a higher hop count from the leader device, or that are further from the leader device. In an example, the predefined period of time that is multiplied by the hop count to calculate the offset delay time may be in a range of ten to thirty seconds. However, this time may vary to allow for other delays to enable the router devices time to power on, perform the attachment procedure, and/or start advertising.

In another example, different amounts of time may be added for each hop count when calculating the offset delay time of a control device. The amount of time added for each hop count may be more or less as the hop count increases. For example, the amount of time added to the offset delay time may increase by a predefined delta as the hop count increases, to allow more time for processing messages in a larger network. The amount of time added to the offset delay time may vary based on the number of control devices having the same hop count. This may allow for a shorter delay when less control devices are performing the attachment procedure, and a greater delay when more devices are performing the attachment procedure. The control devices may have stored thereon from the previously-formed network the control devices having the same hop count, or this may be communicated to the control devices from a central computing device or commissioning device.

Referring back to FIG. 9A, after waiting for the coordinated startup time for the router device at 924, the control device may transmit a request to resume its role in the previously-formed network at 926. For example, the control device may transmit the attachment message at 926 as a unicast message to one of the router devices and/or the leader device. The control device may have stored thereon in memory the identifier of the router device through which network communications are to be transmitted through the network to reach the leader device, which may be the leader device or another router device (e.g., depending on whether the control device was previously attached to the leader device of the previously-formed network or another router device). For example, if the control device was directly attached to the leader device in the previously-formed network (e.g., the router devices 225a, 225c of FIG. 2E), the control device may transmit a link-request message (e.g., as a unicast message) to the leader device of the previously-formed network. If, however, the control device was not directly attached to the leader device (e.g., the router devices 225b, 225d, 225e, 225f of FIG. 2E), the control device may transmit a link-request message (e.g., as a unicast message) to the router device through which the control device may communicate to communicate with the leader device. For example, the router device 225b may store the identifier of the router device 225c, which may represent the next hop back to the leader device 215. The router device 225b may transmit the link-request message as a unicast message to the router device 225c after waiting for the coordinated startup time.

At 928, the control device may determine whether a response to the link-request message transmitted at 926 is received. As described herein, the response to the link-request message may be a link accept message that may indicate that a communication link is established for communications with the control device in the previously-formed network. The link accept message may include information (e.g., a frame counter) that allows the control device to decrypt messages from the device with which the communication link is established.

If a response to the link-request message fails to be received at 928, the control device may drop its role in the previously-formed network and start another attachment procedure at 930. The control device may await the response for a predetermined period of time. If, however, a response to link-request message is received, the control device may transmit a router advertisement message at 932. The router advertisement message informs the other router devices on the network that the control device is now operating as a router device.

Referring again to FIG. 9A, the control device may determine that control device is an end device. For example, if the control device determines at 932 that the control device was not a router device in the previously-formed network, the control device may determine that the control device was an end device. The role identifier stored thereon in memory may indicate that the control device was an end device of the previously-formed network. If the control device was an end device, the control device may wait for a coordinated startup time for an end device (e.g., a coordinated end device startup time) at 934. The coordinated startup time for the end device may be a predetermined time that is longer than the coordinated startup times of the router devices (e.g., to allow the router devices to establish communications with each other before the end devices attempt to attach to the router devices), which may be later than the coordinated startup times of the leader device (e.g., a predetermined time/offset may be added to the coordinated startup time for the leader device). In addition, the coordinated startup time for the end device may be calculated, for example, in a manner similar to or different than the manner in which the coordinated startup times for router devices are calculated. For example, the coordinated startup time for an end device may be calculated as described herein based on the hop count of the end device. The coordinated startup times for end devices may be longer than the coordinated startup times for router devices. For example, router devices may be given priority over end devices for performing attachment to devices on the previously-formed network.

After waiting for the coordinated startup time to expire, the control device may transmit a parent-request message (e.g., as a unicast message) to a parent device of the control device in the previously-formed network at 936. The identifier of the previous parent device may be stored in memory thereon. The parent-request message may be transmitted as a unicast message to the previous parent device for being reattached to the parent device. At 938, the control device may determine whether a response to the parent-request message was received. The response to the parent-request message may be a parent-response message. If a response to the parent-request message fails to be received (e.g., within a predefined period of time), the control device may drop its role in the previously-formed network and start another attachment procedure at 930. The attachment procedure may be performed to attach to another network or network partition as described herein.

Figure 9B:
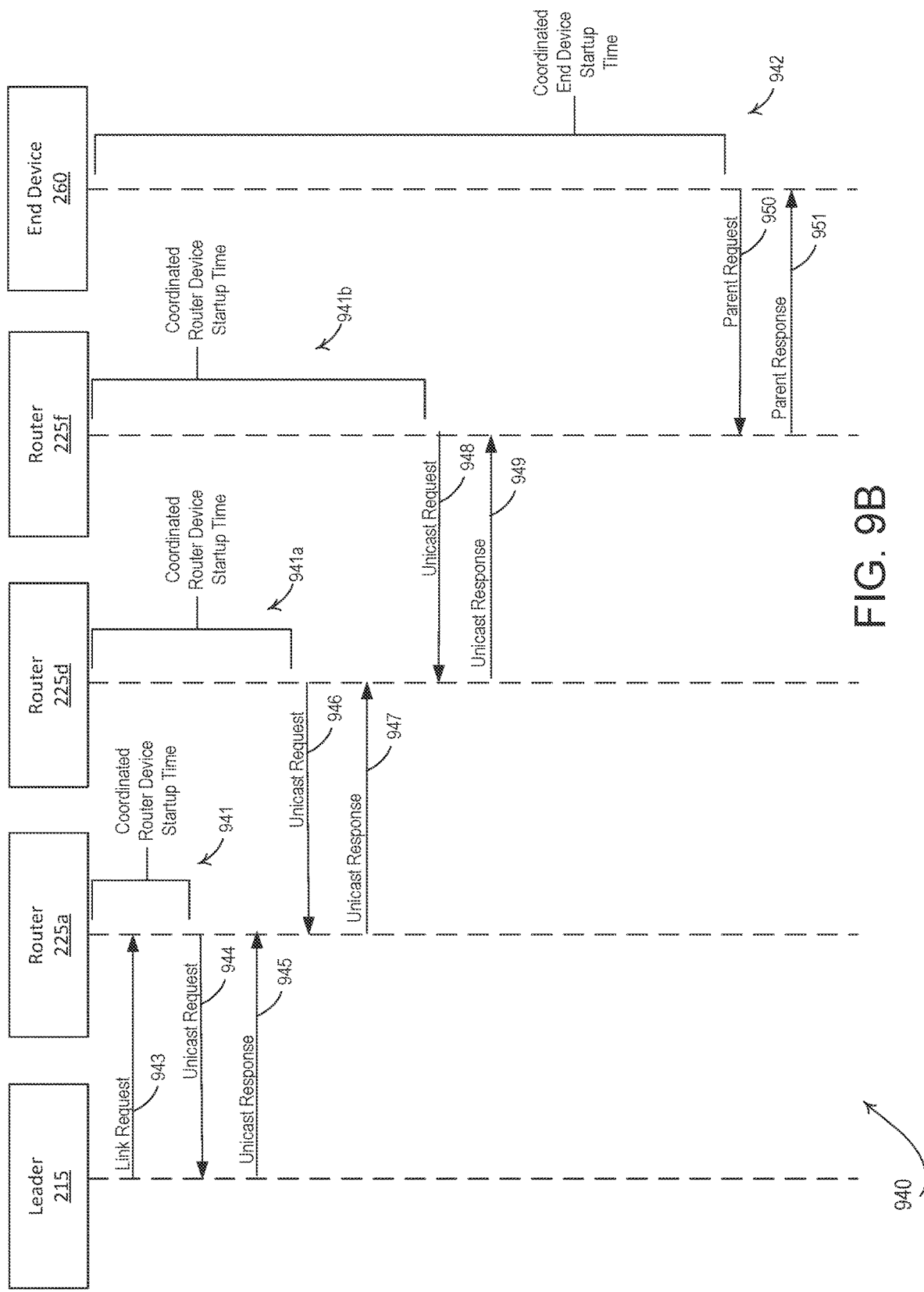
FIGS. 9B and 9D are sequence diagrams of example procedures to be performed by devices on a network prior to attaching to another device on the network.
Figure 9C:
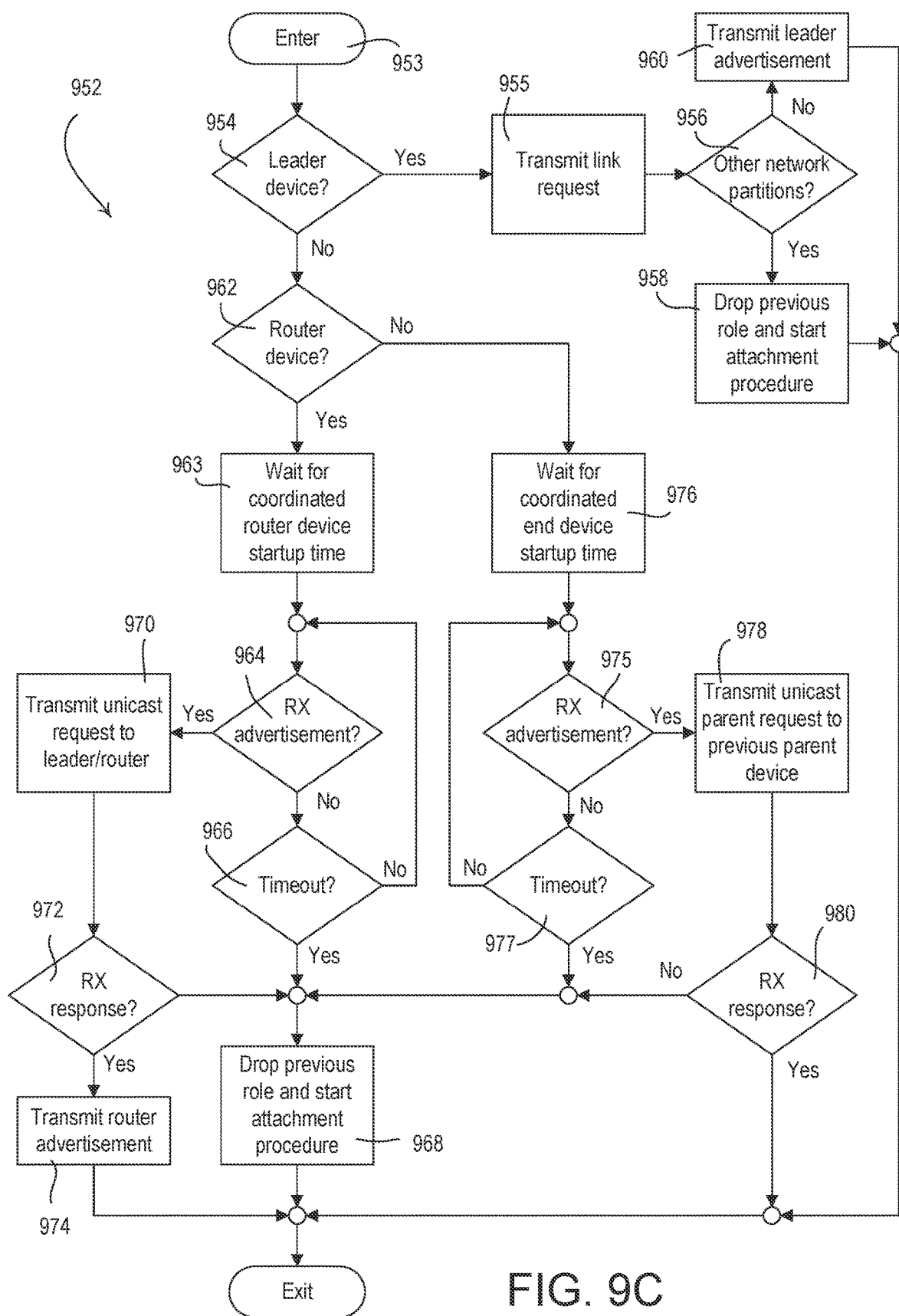

FIG. 9B is a sequence flow diagram illustrating example messages communicated between devices in network 940 when performing startup and/or attachment procedures for attaching to devices in a previously-formed network. The startup and/or attachment procedure illustrated in the sequence flow diagram illustrated in FIG. 9B may reflect the sequence flow of messages in the network 940 when devices in the network 940 execute one or more portions of the flow diagram 900 illustrated in FIG. 9A and described herein. Referring again to FIG. 9B, the example network 940 may include a subset of the devices in the network 200c shown in FIG. 2E as an example, though other networks having other configurations may operate similarly. For example, the network 940 may include the leader device 215 and router devices 225a, 225d, 225f. The network 940 may also include an end device 260 that is attached to router device 225f.

As shown in FIG. 9B, the leader device 215 may share a single-hop communication link with router device 225a. During network formation, the router device 225a may store the router identifier of the leader device 215 through which single-hop communications may be performed toward the leader device 215 and a hop count from the leader device (e.g., hop count=1). The router device 225a may share a single-hop communication link with router device 225d. During network formation, the router device 225d may store the router identifier of the router device 225a through which single-hop communications may be performed toward the leader device 215 and a hop count from the leader device (e.g., hop count=2). The router device 225d may share a single-hop communication link with router device 225f. During network formation, the router device 225f may store the router identifier of the router device 225d through which single-hop communications may be performed toward the leader device 215 and a hop count from the leader device (e.g., hop count=3). Though not shown in FIG. 2E, the end device 260 may share a single-hop communication link with router device 225f. During network formation, the end device 260 may store the router identifier of the router device 225f.

When the devices in the network 940 are powered off and powered on after network formation, each of the devices may perform a startup and/or attachment procedure in an attempt to re-form the previously-formed network. The leader device 215 may identify itself as a leader device and transmit a link-request message 943. The link-request message 943 may be sent as a multicast message. The link-request message 943 may be used to determine whether the network has already formed with another leader device. When the leader device 215 fails to receive a response to the link-request message 943, the leader device 215 may maintain its role as the leader device and allow for attachment of non-leader router devices that were previously attached to the leader device 215 on the previously-formed network.

The router device 225a may await a coordinated router device startup time 941 before transmitting a unicast request message 944. The coordinated startup time 941 for the router device 225a may be equal to a base delay time (e.g., which may be same for each router device 225a, 225d, 225f) plus an offset delay time. The offset delay time for the coordinated router device startup time 941 may be based on the hop count between the router device 225a and the leader device 215. The offset delay time may be weighted higher for router devices that are a greater number of hops from the leader device 215. For example, the offset delay time may be a multiple based on the hop count back to the leader device 215 (e.g., hop count=1). The hop count may be stored locally at the router device 225a during formation of the previously-formed network.

After the router device 225a waits the coordinated router device startup time 941, the router device 225a may send the unicast request message 944. The unicast request message 944 may be transmitted by the router device 225a for the router device 225a to attempt to resume its role in the previously-formed network. The unicast request message 944 may be a link-request message to re-form the communication link between the router device 225*a* and the leader device 215. The router device 225*a* may identify in memory that the router device 225*a* was attached to the leader device 215 in the previously-formed network. The router device 225*a* may transmit the unicast request message 944 to the leader device 215 to which the router device 225*a* was attached in the previously-formed network. The unicast request message 944 may include the router identifier of other unique identifier of the leader device 215.

The leader device 215 may receive the unicast request message 944 and respond with a unicast response message 945. As described herein, the unicast response message 945 may be a link accept message that may indicate that a communication link is formed for communications between the router device 225*a* and the leader device 215, as in the previously-formed network. The link accept message may include information (e.g., a frame counter) that allows the router device 225*a* to decrypt messages from the leader device 215 with which the communication link is established. After the unicast response message 945 is received at the router device 225*a*, the router device 225*a* may transmit router advertisement messages in the network 940.

The router device 225*d* may await a coordinated router device startup time 941*a* before transmitting a unicast request message 946. The coordinated startup time 941*a* for the router device 225*d* may be equal to the base delay time (e.g., which may be same for each router device 225*a*, 225*d*, 225*f*) plus an offset delay time. The offset delay time for the coordinated router device startup time 941*a* may be based on the hop count between the router device 225*d* and the leader device 215. The offset delay time may be weighted higher for router devices that are a greater number of hops from the leader device 215. For example, the offset delay time may be a multiple based on the hop count back to the leader device 215 (e.g., hop count=2). The offset delay time for router device 225*d* may be longer than the offset delay time for the router device 225*a*, as the router device 225*d* is a greater number of hop counts from the leader device 215. The hop count may be stored locally at the router device 225*d* during formation of the previously-formed network.

After the router device 225*d* waits the coordinated router device startup time 941*a*, the router device 225*d* may send the unicast request message 946. The unicast request message 946 may be transmitted by the router device 225*d* for the router device 225*d* to attempt to resume its role in the previously-formed network. The unicast request message 946 may be a link-request message to re-form the communication link between the router device 225*d* and the router device 225*a*. The router device 225*d* may identify in memory that the router device 225*d* was attached to the router device 225*a* in the previously-formed network for communicating messages to the leader device 215. For example, the identifier of the router device 225*a* may represent the next hop back to the leader device 215. The router device 225*d* may transmit the unicast request message 946 to the router device 225*a* to which the router device 225*d* was attached in the previously-formed network. The unicast request message 946 may include the router identifier of other unique identifier of the router device 225*a*.

The router device 225*a* may receive the unicast request message 946 and respond with a unicast response message 947. As described herein, the unicast response message 947 may be a link accept message that may indicate that a communication link is formed for communications between the router device 225*d* and the router device 225*a*, as in the previously-formed network. The link accept message may include information (e.g., a frame counter) that allows the router device 225*d* to decrypt messages from the router device 225*a* with which the communication link is established. After the unicast response message 947 is received at the router device 225*d*, the router device 225*d* may transmit router advertisement messages in the network 940.

The router device 225*f* may await a coordinated router device startup time 941*b* before transmitting a unicast request message 948. The coordinated startup time 941*b* for the router device 225*f* may be equal to the base delay time (e.g., which may be same for each router device 225*a*, 225*d*, 225*f*) plus an offset delay time. The offset delay time may be weighted higher for router devices that are a greater number of hops from the leader device 215. The offset delay time for the coordinated router device startup time 941*b* may be based on the hop count between the router device 225*f* and the leader device 215. For example, the offset delay time may be a multiple based on the hop count back to the leader device 215 (e.g., hop count=3). The offset delay time for router device 225*f* may be longer than the offset delay time for the router devices 225*a*, 225*d*, as the router device 225*f* is a greater number of hop counts from the leader device 215. The hop count may be stored locally at the router device 225*f* during formation of the previously-formed network.

After the router device 225*f* waits the coordinated router device startup time 941*b*, the router device 225*f* may send the unicast request message 948. The unicast request message 948 may be transmitted by the router device 225*f* for the router device 225*f* to attempt to resume its role in the previously-formed network. The unicast request message 948 may be a link-request message to re-form the communication link between the router device 225*f* and the router device 225*d*. The router device 225*f* may identify in memory that the router device 225*f* was attached to the router device 225*d* in the previously-formed network for communicating messages to the leader device 215. For example, the identifier of the router device 225*d* may represent the next hop back to the leader device 215. The router device 225*f* may transmit the unicast request message 948 to the router device 225*d* to which the router device 225*f* was attached in the previously-formed network. The unicast request message 948 may include the router identifier of other unique identifier of the router device 225*d*.

The router device 225*d* may receive the unicast request message 948 and respond with a unicast response message 949. As described herein, the unicast response message 949 may be a link accept message that may indicate that a communication link is formed for communications between the router device 225*f* and the router device 225*d*, as in the previously-formed network. The link accept message may include information (e.g., a frame counter) that allows the router device 225*f* to decrypt messages from the router device 225*d* with which the communication link is established. After the unicast response message 949 is received at the router device 225*f*, the router device 225*f* may transmit router advertisement messages in the network 940.

The end device 260 may await a coordinated end device startup time 942 before transmitting a parent-request message 950. The coordinated startup time 942 for the end device 260 may be a predetermined time that is longer than the coordinated startup times of the router devices 225*a*, 225*d*, 225*f* (e.g., to allow the router devices 225*a*, 225*d*, 225*f* to establish communications with each other before the end device 260 attempts to attach to the router device 225*f*). In addition, the coordinated startup time 942 for the end device 260 may be calculated, for example, in a manner similar to or different than the manner in which the coordinated startup times 941, 941*a*, 941*b* for router devices 225*a*, 225*d*, 225*f* are calculated. For example, the coordinated startup time 942 for end device 260 may be calculated as described herein with a base delay time (e.g., which may be same for each end device) and/or an added delay time based on the hop count of the end device. The coordinated startup time 942 for end device 260 may have a longer base delay time (e.g., which may be same for each end device in the network) and/or offset delay time than the router devices 225a, 225d, 225f. For example, the base delay time for router devices 225a, 225d, 225f may be a time between zero seconds to one second, and the base delay time for end device 260 may be a time between ten and twenty-five seconds. The base delay time for end device 260 may be a multiple of the base delay time for the router devices 225a, 225d, 225f. The longer coordinated startup time 242 for the end device 260 may give priority to router devices 225a, 225d, 225f to allow the router devices 225a, 225d, 225f to perform a startup and/or attachment procedure and be ready to receive parent requests from end devices. The amount of time added for each hop count for the coordinated startup time 942 for end device 260 may be the same or different than the time added for each hop count for router devices 225a, 225d, 225f.

After the end device 260 waits the coordinated router device startup time 942, the end device 260 may send a parent-request message 950. The parent-request message 950 may be sent as a unicast request message for the end device 260 to attempt to resume its role in the previously-formed network. The parent-request message 950 may be a request to re-form the communication link between the end device 260 and the router device 225f. The end device 260 may identify in memory that the end device 260 was attached to the router device 225f in the previously-formed network for communicating messages to the leader device 215. For example, the identifier of the router device 225f may represent the next hop back to the leader device 215. The end device 260 may transmit the parent-request message 950 to the router device 225f to which the end device 260 was attached in the previously-formed network. The parent-request message 950 may include the router identifier of other unique identifier of the router device 225f.

The router device 225f may receive the parent-request message 950 and respond with a parent-response message 951. As described herein, the parent-response message 951 may indicate that the router device 225f has accepted the end device 260 as a child device and re-forms a communication link for communications between the end device 260 and the router device 225f, as in the previously-formed network. The parent-response message 951 may include information (e.g., a frame counter) that allows the end device 260 to decrypt messages from the router device 225f with which the communication link is established. After the parent-response message 951 is received at the end device 260, the end device 260 may communicate messages out to other devices in the network 940 through the router device 225f.

In addition to delaying startup during a predefined interval to allow the leader device and/or other router devices to perform their startup procedure and/or attach to other devices on the network, the router devices and end devices may await receipt of an advertisement message from the router device to which the router device or end device was attached on the previously-defined network. Again, the control device that was the leader device of the previously-formed network may begin a startup procedure prior to other control devices in the load control system. The control devices that were non-leader router devices in the previously-formed network may delay their startup procedures to allow the leader device to startup and begin transmitting advertisement messages to the other router devices. The other router devices may begin their startup procedure during the predefined interval after being powered on (e.g., to allow the leader device to startup). For example, the other router devices may begin their startup procedure at a random time during the interval after the leader initiates its startup procedure. During the startup procedure at the router devices, each router device may await an advertisement message from the leader device or another router device to which the router device was attached in the previously-formed network. The receipt of the advertisement message may indicate that the device to which the router device was attached in the previously-formed network is powered on and established its former role in the previously-formed network. After receipt of the advertisement message from the leader device or other router device to which the router device was attached in the previously-formed network, the router devices may attempt to attach to the device. The end devices may begin their startup procedures during a predefined interval after being powered on to allow the routers to perform their startup procedures and attached to the leader device or other router device. The predefined interval at the end devices may be longer than the predefined interval for which the router devices delay their startup procedure to allow the router devices time to perform attachment and re-form the previously-formed network. During the startup procedure at the end devices, each end device may await an advertisement message from the leader device or another router device to which the end device was attached in the previously-formed network. The receipt of the advertisement message may indicate that the device to which the end device was attached in the previously-formed network is powered on and established its former role in the previously-formed network. After receipt of the advertisement message from the leader device or other router device to which the end device was attached in the previously-formed network, the end devices may attempt to attach to the device.

FIG. 9C is a flowchart of an example reattaching procedure 952 for reattaching devices in a previously-formed network and/or re-forming the previously-formed network (e.g., after loss of power or another network reset). The procedure 952 may be performed by a control device that was attached to other devices on the previously-formed network prior to a power loss or other network reset. As illustrated in FIG. 9C, the procedure 952 may begin at 953. For example, as described herein, the procedure 953 may be executed after a control device reset, which may occur after a blackout or another event that causes the power supplied to the respective control devices attached to the previously-formed network to be interrupted.

At 954, the control device may determine whether the control device was the leader device of the previously-formed network. As described herein, the leader device may manage other control devices on the network. For example, the leader device may assign and maintain router identifiers for each of the router devices attached to the network. The leader device may be the first device role to attempt to re-form the previously-formed network. The control device may have a role identifier stored thereon in memory that may indicate the role of the control device in the previously-formed network. For example, the role identifier may indicate that the control device was a leader device of a previously-formed network. The role identifier may be stored with one or more network credentials for the network, such as the network address for the control device (e.g., a Thread network address). The control device may determine from this stored role identifier for the previously-formed network that it was a leader device of the previously-formed network at 954.

At 955, the control device (e.g., the leader device of the previously-formed network) may transmit a link-request message. For example, the link-request message may be sent as a multicast message. The link-request messages may be used to determine whether the network has already formed with another leader device. In one example, the previously-formed network may have been powered down and additional devices may have been added to the system, the location of devices may have been moved, and/or the space may have been reconfigured to cause interferers between devices to be added or removed. Due to potential changes to the network and/or the space in which the network is located, the leader device may transmit the link-request message to determine if there is another leader device on the network. For example, the link-request message may be transmitted to identify whether there is an already formed network being implemented. As such, the leader device may transmit the link-request message to determine whether other devices have powered on and already formed a network having another leader device. If the leader device receives a response to the link-request message, the leader device may be incapable of being the leader device on the network and may revert back to being an end device or another role on the network. The other control devices of the previously-formed network may fail to respond to the link request, as they may await a leader advertisement from the leader device and/or a coordinated startup time after powering up and turning on.

At 956, the control device may determine whether other network partition(s) exist, for example, based on receiving a response to the link-request message. If another leader device receives the link-request message and transmits a response to the link-request message, the control device may determine that another network partition exists, drop the control device's previous role (e.g., the role of leader device in the previously-formed network), and start another attachment procedure at 958 (e.g., as described herein in conjunction with FIG. 5). As described herein, the control device may drop the previous role to form a network that may be differently configured than the previously-formed network. The fact that a leader device responds to the link-request message may indicate another network that is differently configured than the previously established network has formed (e.g., in the absence of the control device that was previously the leader device).

At 956, the control device may determine whether other network partition(s) exist, for example, based on receiving a response to the link request. If another leader device receives the link-request message and transmits a response to the link-request message, the control device may determine that other network partitions exist and may drop the previous role as the leader device of the previously-formed network. The control device may drop the previous role as the leader device of the previously-formed network to start another attachment procedure at 958 (e.g., as described herein in conjunction with FIG. 5). The attachment procedure at 958 may be performed to form a network that may be differently configured than the previously-formed network. The fact that a leader device responds to the link-request message may indicate another network that is differently configured than the previously established network has formed (e.g., in the absence of the control device that was previously the leader device).

If, however, a response to the link-request message is not received, the control device may determine that another network partition does not exist, and may transmit a leader advertisement message at 960. The leader advertisement message may be used to re-form the previously-formed network, for example, by triggering the router devices of the previously-formed network to attach to the leader device (e.g., transmit a link-request message to the leader device) and re-form the mesh of the previously-formed network. The router devices that were attached to the leader device in the previously-formed network may listen for the leader advertisement before initiating their attachment procedure.

At 962, the control device may determine whether the control device was a router device of the previously-formed network. The determination at 962 may be based on the role identifier stored in memory at the control device that indicates that the role of the router device in the previously-formed network. If the control device was defined as a router device in the previously-formed network, the control device may determine to wait for a coordinated startup time for a router device (e.g., a coordinated router startup time) at 963. As described herein, the coordinated startup time for a router device may be equal to a base delay time (e.g., which may be same for each router device) plus an offset delay time. The offset delay time may be based on the hop count between a respective router device and the leader device. For example, the base delay time may be the same for each of the routers that were previously attached to the previously-formed network and may allow the leader device of the previously-formed network to re-form to the network and be available for router devices to reattach. The offset delay time may be based on the hop count back to the leader device and such that the offset delay time for router devices that are farther away from the leader device is longer than for router devices that are closer to the leader device. Referring to FIG. 2E, for example, the offset delay time for router devices 225a, 225c, which are directly attached to the leader device 215, may be shorter than the offset delay time for router devices 225b, 225d, 225e, which are not directly attached to the leader device 215. Accordingly, the coordinated router startup time for router devices 225a, 225c may end before the coordinated startup time for router devices 225b, 225d, 225e.

The offset delay time for each device may be a predefined period of time that is multiplied by the hop count for the control device. The hop count may be determined from the previously-formed network and may be stored at the control device. After awaiting the base delay time, the control device may await the offset delay time, which may be a hop-count-multiple of a predefined period of time, prior to starting the attachment procedure. The offset delay time being calculated based on the hop count of a control device from the leader device may allow for the router devices having a lower hop count from the leader device, or that are closer to the leader device, to perform the attachment procedure prior to router devices having a higher hop count from the leader device, or that are further from the leader device. In an example, the predefined period of time that is multiplied by the hop count to calculate the offset delay time may be in a range of ten to thirty seconds. However, this time may vary to allow for other delays to enable the router devices time to power on, perform the attachment procedure, and/or start advertising.

In another example, different amounts of time may be added for each hop count when calculating the offset delay time of a control device. The amount of time added for each hop count may be more or less as the hop count increases.

For example, the amount of time added to the offset delay time may increase by a predefined delta as the hop count increases, to allow more time for processing messages in a larger network. The amount of time added to the offset delay time may vary based on the number of control devices having the same hop count. This may allow for a shorter delay when less control devices are performing the attachment procedure, and a greater delay when more devices are performing the attachment procedure. The control devices may have stored thereon from the previously-formed network the control devices having the same hop count, or this may be communicated to the control devices from a central computing device or commissioning device.

Referring back to FIG. 9C, after waiting for the coordinated startup time for the router device at 963, the control device may determine whether it received an advertisement message at 964 from another control device that the control device was attached to in the previously-formed network. The control device may receive advertisement messages from the leader device (e.g., the advertisement message transmitted at 960) or another router device (e.g., an advertisement message transmitted at 974). For example, the control device may wait to receive an advertisement message at 964 from any of the leader device and/or the router devices in the network. In addition, the control device may wait to receive an advertisement message at 964 from a selected router device. For example, the selected router device may be a router device through which network communications were transmitted through the network to reach the leader device in the previously-formed network, which may be the leader device or a router device (e.g., depending on whether the control device was previously attached to the leader device of the previously-formed network or another router device). The unique identifier of the selected router device (e.g., the router device through which network communications were transmitted through the network to reach the leader device in the previously-formed network) may be stored in memory. The control device may await an advertisement message from the selected router device whose unique identifier is stored in memory. If the control device has not received an advertisement message from the selected router device, the control device may determine if a timeout period of time has elapsed at 966. If the timeout period of time has elapsed and the advertisement message has not been received, the control device may drop its previous role and start another attachment procedure at 968. If the control device receives an advertisement message from the selected router device, the control device may attempt to attach to that router device at 970 (e.g., as will be described in greater detail below).

After waiting for the coordinated router device startup time at 963, the control device may, at 964, wait for a first period of time (e.g., approximately 30 seconds) to receive an advertisement message from the selected router device whose unique identifier is stored in memory. When the control device receives an advertisement message from the selected router device during the first period of time, the control device may attempt to attach to the selected router device at 970. If the control device does not receive an advertisement message from the selected router device before the end of the first period of time, the control device may wait for a second period of time (e.g., approximately 30 seconds) to receive an advertisement message from other router devices (e.g., other than the selected router device and/or including the selected router device). For example, the control device may wait to receive an advertisement message from any of the leader device and/or the router devices in the network during the second period of time. When the control device receives an advertisement message from a router device during the second period of time, the control device may attempt to attach to the router device from which the advertisement message received at 970. For example, the control device may attempt to attach to any of the leader device and/or the router devices in the network when the control device receives an advertisement message during the second period of time. In addition, the control attempt to attach to a router device when the control device receives an advertisement message from that router device during the second period of time and a received signal strength magnitude (e.g., RSSI) of the received advertisement message exceeds a threshold. If the control device does not receive an advertisement message from a router device before the end of the second period of time, the control device may drop its previous role and start another attachment procedure at 968.

If the control device receives an advertisement message from the selected router device whose unique identifier is stored in memory at 964, the control device may attempt to attach to that router device by transmitting a unicast request to the selected router device at 970. At 970, the control device may transmit a link request message (e.g., as a unicast message) to the selected router device whose unique identifier is stored in memory, which may be used by the control device to resume its role in the previously-formed network. The control device may choose the prior leader or router device depending on whether the control device was attached to the leader device of the previously-formed network or another router device. For example, if the control device was directly attached to the leader device in the previously-formed network (e.g., the router devices 220a, 220c of FIG. 2E), the control device may transmit an attachment messages configured to establish a router-to-router link, such as a link request message (e.g., as a unicast message), to the leader device of the previously-formed network. If, however, the control device was not directly attached to the leader device (e.g., the router devices 220b, 220d of FIG. 2E), the control device may transmit a link request message (e.g., as a unicast message) to the router device through which the control device may communicate to communicate with the leader device. For example, referring to FIG. 2E, the router device 225b may store the identifier of the router device 225c, which may represent the next hop back to the leader device 215. The router device 225b may transmit the link request message as a unicast message to the router device 225c after waiting for the coordinated startup time. At 972, the control device may determine whether a response to the link-request message transmitted at 970 is received. As described herein, the response to the link-request message may be a link accept message that may indicate that a communication link is established for communications with the control device in the previously-formed network. The link accept message may include information (e.g., a frame counter) that allows the control device to decrypt messages from the device with which the communication link is established.

If a response to the link-request message fails to be received at 972 (e.g., after a period of time), the control device may drop its role in the previously-formed network and start another attachment procedure at 968. The response to the link-request message may indicate that the leader or other router device of the previously-formed network is powered on and accepting link requests from other devices in the network. If a response to the link-request message is received, the control device may transmit a router advertisement message at 974. Transmitting a router advertisement message may inform other router devices on the network that the control device is operating as a router device. Transmitting the advertisement message may trigger the other router devices and/or end devices that were attached to the control device in the previously-formed network to reattach to the control device and re-form the previously-formed network. For example, referring to FIG. 2A, if the router device 220*a* transmits a router advertisement message, the end device 230*a* and the sleepy-end device 250 may be triggered to reattach to the router device 220*a*. Referring to FIG. 2E, if the router devices 225*a*, 225*c* transmit router advertisement messages, router devices 225*e*, 225*d* may be triggered to reattach to router device 225*a* and router device 225*b* may be triggered to reattach to router device 225*c*. The router devices 225*b*, 225*d*, 225*e* may be awaiting for the router advertisements of their respective router devices to which they were previously attached during their coordinated startup times.

Referring again to FIG. 9C, the control device may determine that the control device is an end device. For example, if at 962 the control device determines that the control device was not a router device in the previously-formed network, the control device may determine that it was an end device and wait for a coordinated startup time at 976. The coordinated startup time for the end device may be a predetermined time. The coordinated startup time for end devices may be longer than the coordinated startup time for router devices. The coordinated startup time for end devices may be long enough to allow the router devices to establish communications with each other before the end devices attempt to attach to the router devices. For example, the coordinated startup time for router devices (e.g., coordinated startup time at 963) may be a random time between zero seconds to one second, and the coordinated startup time for end devices (e.g., coordinated startup time at 976) may be a random time between ten and twenty-five seconds. In addition, the coordinated startup time may be calculated as described herein.

The coordinated startup time may end after the router devices of the previously-formed network have reattached to other devices in the network. After waiting for the coordinated startup time to end at 976, the control device may determine whether an advertisement message is received from the control device's parent device on the previously-formed network at 975.

The control device may receive advertisement messages from its previous parent device. For example, the control device may wait to receive an advertisement message at 975 from a router device through which network communications were transmitted in the previously-formed network (e.g., a previous parent device). The unique identifier of the router device to which the control device was attached in the previously-formed network may be stored in memory. The control device may await an advertisement message from the previous parent device whose unique identifier is stored in memory for enabling communication in the previously-formed network. If the control device has not received an advertisement message from the previous parent device whose unique identifier is stored in memory for enabling communication in the previously-formed network, the control device may determine if a timeout period of time has elapsed at 977. If the timeout period of time has elapsed and the advertisement message has not been received, the control device may drop its previous role and start another attachment procedure at 968.

If the control device receives an advertisement message from the previous parent device whose unique identifier is stored in memory, the control device may transmit a unicast an attachment message configured to establish a parent-child link (e.g., a parent-request message) to the previous parent device at 978. At 978, the control device may transmit the parent-request message (e.g., as a unicast message) to the parent router device whose unique identifier is stored in memory, which may be used by the control device to resume its role in the previously-formed network. The control device may choose the previous parent device depending on whether the control device was a child device attached to the leader device of the previously-formed network or another router device. For example, if the control device was directly attached as a child to the leader device in the previously-formed network (e.g., the end device 234*a* of FIGS. 2C and 2D and the end device 223 of FIG. 2B), the control device may transmit a parent-request message (e.g., as a unicast message) to the leader device of the previously-formed network. If, however, the control device was not directly attached to the leader device (e.g., the end devices 230*a*, 230*b*, sleepy end device 250, and/or REED device 240 of FIG. 2A), the control device may transmit the parent-request message (e.g., as a unicast message) to the router device through which the control device may communicate to communicate on the network (e.g., with the leader device). For example, referring to FIG. 2A, the end device 230*a* may store the identifier of the router device 220*a*, which may represent the next hop back to the leader device 210. The end device 230*a* may transmit the parent-request message as a unicast message to the router device 220*a* after waiting for the coordinated startup time.

Referring again to FIG. 9C, at 980 the control device may determine whether a response to the parent-request message transmitted at 978 is received. The response to the parent-request message may be a parent-response message. If a response to the parent-request message fails to be received (e.g., within a predefined period of time), the control device may drop its role in the previously-formed network and start another attachment procedure at 968. The response to the unicast message may indicate that the parent device of the previously-formed network is powered on and accepting children. The attachment procedure may be performed to attach to another network or network partition as described herein. If the response to the parent-request message is received, the control device may continue communicating with the same parent device of the previously-formed network.

Figure 9D:
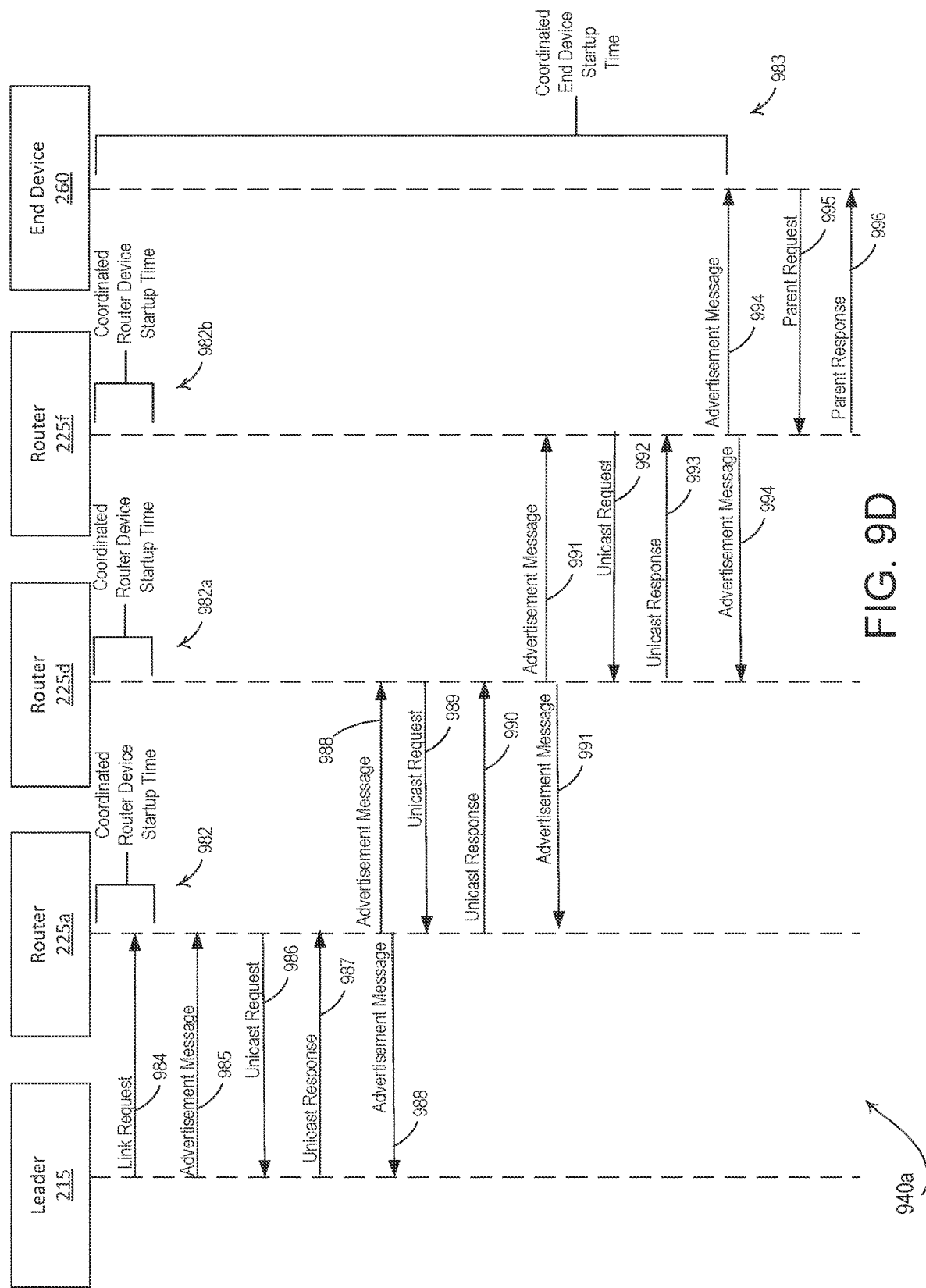

FIG. 9D is a sequence flow diagram illustrating example messages communicated between devices in network 940*a* when performing startup and/or attachment procedures for attaching to devices in a previously-formed network. The startup and/or attachment procedure illustrated in the sequence flow diagram illustrated in FIG. 9D may reflect the sequence flow of messages in the network 940*a* when devices in the network 940*a* execute one or more portions of the flow diagram 952 illustrated in FIG. 9C and described herein. Referring again to FIG. 9D, the example network 940*a* may include a similar configuration of devices as the network 940 shown in FIG. 9B. Similarly, the network 940*a* may include a subset of the devices in the network 200*c* shown in FIG. 2E as an example, though other networks having other configurations may operate similarly. The network 940*a* may include the leader device 215, router devices 225*a*, 225*d*, 225*f*, and an end device 260 that is attached to the parent device (e.g., router device 225*f*).

As shown in FIG. 9D, the leader device 215 may share a single-hop communication link with router device 225a. During network formation, the router device 225a may store the router identifier of the leader device 215 through which single-hop communications may be performed toward the leader device 215 and a hop count from the leader device (e.g., hop count=1). The router device 225a may share a single-hop communication link with router device 225d. During network formation, the router device 225d may store the router identifier of the router device 225a through which single-hop communications may be performed toward the leader device 215 and a hop count from the leader device (e.g., hop count=2). The router device 225d may share a single-hop communication link with router device 225f. During network formation, the router device 225f may store the router identifier of the router device 225d through which single-hop communications may be performed toward the leader device 215 and a hop count from the leader device (e.g., hop count=3). Though not shown in FIG. 2E, the end device 260 may share a single-hop communication link with router device 225f. During network formation, the end device 260 may store the router identifier of the parent device 225f.

When the devices in the network 940a are powered off and powered on after network formation, each of the devices may perform a startup and/or attachment procedure in an attempt to re-form the previously-formed network. The leader device 215 may identify itself as a leader device and transmit a link-request message 984. The link-request message 984 may be sent as a multicast message. The link-request message 984 may be used to determine whether the network has already formed with another leader device. When the leader device 215 fails to receive a response to the link-request message 984, the leader device 215 may maintain its role as the leader device, begin transmitting advertisement messages, and allow for attachment of non-leader router devices that were previously attached to the leader device 215 on the previously-formed network.

The router device 225a may await a coordinated router device startup time 982 before listening for an advertisement message transmitted from the leader device 215 to which the router device 225a was attached in the previously-formed network. The coordinated router device startup time for the router device 225a may be the same or different than a coordinated router device startup time 982a, 982b of other router devices 225d, 225f in the network 940a. The coordinated router device startup time 982, 982a, 982b may be the same predefined time, as each respective router device 225a, 225d, 225f may await receipt of an advertisement message before performing communications on the network 240a. The delay caused by awaiting an advertisement message of another router device may allow the router device 225a that is closer to the leader device 215 (e.g., having a lower hop count from the leader device 215) to have priority over router devices 225d, 225f that are further from the leader device 215 (e.g., having a greater hop count from the leader device 215).

The coordinated startup time 982 for the router device 225a may be different than the coordinated startup time 982a, 982b of the other router devices 225d, 225f. For example, the coordinated startup time 982 may be equal to a base delay time (e.g., which may be same for each router device 225a, 225d, 225f) plus an offset delay time. The offset delay time for the coordinated router device startup time 982 may be based on the hop count between the router device 225a and the leader device 215. The offset delay time may be weighted higher for router devices that are a greater number of hops from the leader device 215. For example, the offset delay time may be a multiple based on the hop count back to the leader device 215 (e.g., hop count=1). The hop count may be stored locally at the router device 225a during formation of the previously-formed network.

After the router device 225a waits the coordinated router device startup time 982, the router device 225a may listen for and receive an advertisement message 985 from the leader device 215. The advertisement message 985 may be transmitted as a multicast message. The router device 225a may have the router identifier or other unique identifier of the leader device 215 stored locally to identify the leader device 215 as the device to which the router device 225a was attached in the previously-formed network. The router device 225a may identify the advertisement message 985 from the leader device 215 and determine that the leader device 215 is powered on and is capable of receiving link requests. In response to the advertisement message 985, the router device 225a may transmit a unicast request message 986 to the leader device 215. The unicast request message 986 may be transmitted by the router device 225a for the router device 225a to attempt to resume its role in the previously-formed network. The unicast request message 986 may be a link-request message to re-form the communication link between the router device 225a and the leader device 215. The unicast request message 986 may include the router identifier of other unique identifier of the leader device 215.

The leader device 215 may receive the unicast request message 986 and respond with a unicast response message 987. As described herein, the unicast response message 987 may be a link accept message that may indicate that a communication link is formed for communications between the router device 225a and the leader device 215, as in the previously-formed network. The link accept message may include information (e.g., a frame counter) that allows the router device 225a to decrypt messages from the leader device 215 with which the communication link is established. After the unicast response message 987 is received at the router device 225a, the router device 225a may transmit router advertisement messages in the network 940a.

The router device 225d may await a coordinated router device startup time 982a before listening for an advertisement message transmitted from the router device 225a to which the router device 225d was attached in the previously-formed network. As described herein, the coordinated router device startup time for the router device 225d may be the same or different than a coordinated router device startup time 982, 982b of other router devices 225a, 225f in the network 940a. The coordinated startup time 982a for the router device 225d may be equal to the base delay time (e.g., which may be same for each router device 225a, 225d, 225f) plus an offset delay time. The offset delay time for the coordinated router device startup time 982a may be based on the hop count between the router device 225d and the leader device 215. The offset delay time may be weighted higher for router devices that are a greater number of hops from the leader device 215. For example, the offset delay time may be a multiple based on the hop count back to the leader device 215 (e.g., hop count=2). The offset delay time for router device 225d may be longer than the offset delay time for the router device 225a, as the router device 225d is a greater number of hop counts from the leader device 215. The hop count may be stored locally at the router device 225d during formation of the previously-formed network.

After the router device 225d waits the coordinated router device startup time 982a, the router device 225d may listen for and receive an advertisement message 988 from the router device 225*a*. The advertisement message 988 may be transmitted as a multicast message. The router device 225*d* may have the router identifier or other unique identifier of the router device 225*a* stored locally to identify the router device 225*a* as the device to which the router device 225*d* was attached in the previously-formed network. The router device 225*d* may identify the advertisement message 988 from the router device 225*a* and determine that the router device 225*a* is powered on and is capable of receiving link requests.

In response to the advertisement message 988, the router device 225*d* may transmit a unicast request message 989 to the router device 225*a*. The unicast request message 989 may be transmitted by the router device 225*d* for the router device 225*d* to attempt to resume its role in the previously-formed network. The unicast request message 989 may be a link-request message to re-form the communication link between the router device 225*d* and the router device 225*a*. The unicast request message 989 may include the router identifier of other unique identifier of the router device 225*a*.

The router device 225*a* may receive the unicast request message 989 and respond with a unicast response message 990. As described herein, the unicast response message 990 may be a link accept message that may indicate that a communication link is formed for communications between the router device 225*d* and the router device 225*a*, as in the previously-formed network. The link accept message may include information (e.g., a frame counter) that allows the router device 225*d* to decrypt messages from the router device 225*a* with which the communication link is established. After the unicast response message 990 is received at the router device 225*d*, the router device 225*d* may transmit router advertisement messages in the network 940*a*.

The router device 225*f* may await a coordinated router device startup time 982*b* before listening for an advertisement message transmitted from the router device 225*d* to which the router device 225*f* was attached in the previously-formed network. As described herein, the coordinated router device startup time for the router device 225*f* may be the same or different than a coordinated router device startup time 982, 982*a* of other router devices 225*a*, 225*d* in the network 940*a*. The coordinated startup time 982*b* for the router device 225*f* may be equal to the base delay time (e.g., which may be same for each router device 225*a*, 225*d*, 225*f*) plus an offset delay time. The offset delay time may be weighted higher for router devices that are a greater number of hops from the leader device 215. The offset delay time for the coordinated router device startup time 982*b* may be based on the hop count between the router device 225*f* and the leader device 215. For example, the offset delay time may be a multiple based on the hop count back to the leader device 215 (e.g., hop count=3). The offset delay time for router device 225*f* may be longer than the offset delay time for the router devices 225*a*, 225*d*, as the router device 225*f* is a greater number of hop counts from the leader device 215. The hop count may be stored locally at the router device 225*f* during formation of the previously-formed network.

After the router device 225*f* waits the coordinated router device startup time 982*b*, the router device 225*f* may listen for and receive advertisement message 991 transmitted from the router device 225*d*. The advertisement message 991 may be transmitted as a multicast message. The router device 225*f* may have the router identifier or other unique identifier of the router device 225*d* stored locally to identify the router device 225*d* as the device to which the router device 225*f* was attached in the previously-formed network. The router device 225*f* may identify the advertisement message 991 from the router device 225*d* and determine that the router device 225*d* is powered on and is capable of receiving link requests.

In response to the advertisement message 991, the router device 225*f* may transmit a unicast request message 992 to the router device 225*d*. The unicast request message 992 may be transmitted by the router device 225*f* for the router device 225*f* to attempt to resume its role in the previously-formed network. The unicast request message 992 may be a link-request message to re-form the communication link between the router device 225*f* and the router device 225*d*. The unicast request message 992 may include the router identifier of other unique identifier of the router device 225*d*.

The router device 225*d* may receive the unicast request message 992 and respond with a unicast response message 993. As described herein, the unicast response message 993 may be a link accept message that may indicate that a communication link is formed for communications between the router device 225*f* and the router device 225*d*, as in the previously-formed network. The link accept message may include information (e.g., a frame counter) that allows the router device 225*f* to decrypt messages from the router device 225*d* with which the communication link is established. After the unicast response message 993 is received at the router device 225*f*, the router device 225*f* may transmit router advertisement messages in the network 940*a*.

The end device 260 may await a coordinated end device startup time 983 before listening for an advertisement message transmitted from the router device 225*f*, which is stored locally as the parent device of the end device 260 in the previously-formed network. The coordinated startup time 983 for the end device 260 may be a predetermined time that is longer than the coordinated startup times of the router devices 225*a*, 225*d*, 225*f* (e.g., to allow the router devices 225*a*, 225*d*, 225*f* to establish communications with each other before the end device 260 attempts to attach to the router device 225*f*). In addition, the coordinated startup time 983 for the end device 260 may be calculated, for example, in a manner similar to or different than the manner in which the coordinated startup times 982, 982*a*, 982*b* for router devices 225*a*, 225*d*, 225*f* are calculated. For example, the coordinated startup time 983 for end device 260 may be calculated as described herein with a base delay time (e.g., which may be same for each end device) and/or an added delay time based on the hop count of the end device. As described herein, the hop count of control device, such as the end device 260, may be stored at the control device or otherwise communicated to the control device. The coordinated startup time 983 for end device 260 may have a longer base delay time (e.g., which may be same for each end device in the network) and/or offset delay time than the router devices 225*a*, 225*d*, 225*f*. For example, the base delay time for router devices 225*a*, 225*d*, 225*f* may be a time between zero seconds to one second, and the base delay time for end device 260 may be a time between ten and twenty-five seconds. The base delay time for end device 260 may be a multiple of the base delay time for the router devices 225*a*, 225*d*, 225*f*. The longer coordinated startup time 283 for the end device 260 may give priority to router devices 225*a*, 225*d*, 225*f* to allow the router devices 225*a*, 225*d*, 225*f* to perform a startup and/or attachment procedure and be ready to receive parent requests from end devices. The amount of time added for each hop count for the coordinated startup time 983 for end device 260 may be the same or different than the time added for each hop count for router devices 225*a*, 225*d*, 225*f*.

After the end device 260 waits the coordinated router device startup time 983, the end device 260 may listen for and receive an advertisement message 994 from the router device 225f. The advertisement message 994 may be transmitted as a multicast message. The end device 260 may have the router identifier or other unique identifier of the router device 225f stored locally to identify the router device 225f as the parent device to which the end device 260 was attached in the previously-formed network. The end device 260 may identify the advertisement message 994 from the router device 225f and determine that the router device 225f is powered on and is capable of receiving parent requests.

In response to the advertisement message 994, the end device 260 may transmit a parent-request message 995 to the router device 225f. The parent-request message 995 may be transmitted as a unicast message. The parent-request message 995 may be transmitted by the end device 260 for the end device 260 to attempt to resume its role as a child device of the router device 225f in the previously-formed network. The parent-request message 995 may be a request to re-form the communication link between the end device 260 and the router device 225f. The end device 260 may identify in memory that the end device 260 was attached to the router device 225f in the previously-formed network for communicating messages to the leader device 215. For example, the identifier of the router device 225f may represent the next hop back to the leader device 215. The end device 260 may transmit the parent-request message 995 to the router device 225f to which the end device 260 was attached in the previously-formed network. The parent-request message 995 may include the router identifier of other unique identifier of the router device 225f.

The router device 225f may receive the parent-request message 995 and respond with a parent-response message 996. As described herein, the parent-response message 996 may indicate that the router device 225f has accepted the end device 260 as a child device and re-forms a communication link for communications between the end device 260 and the router device 225f, as in the previously-formed network. The parent-response message 996 may include information (e.g., a frame counter) that allows the end device 260 to decrypt messages from the router device 225f with which the communication link is established. After the parent-response message 996 is received at the end device 260, the end device 260 may communicate messages out to other devices in the network 940a through the router device 225f.

Figure 10A:
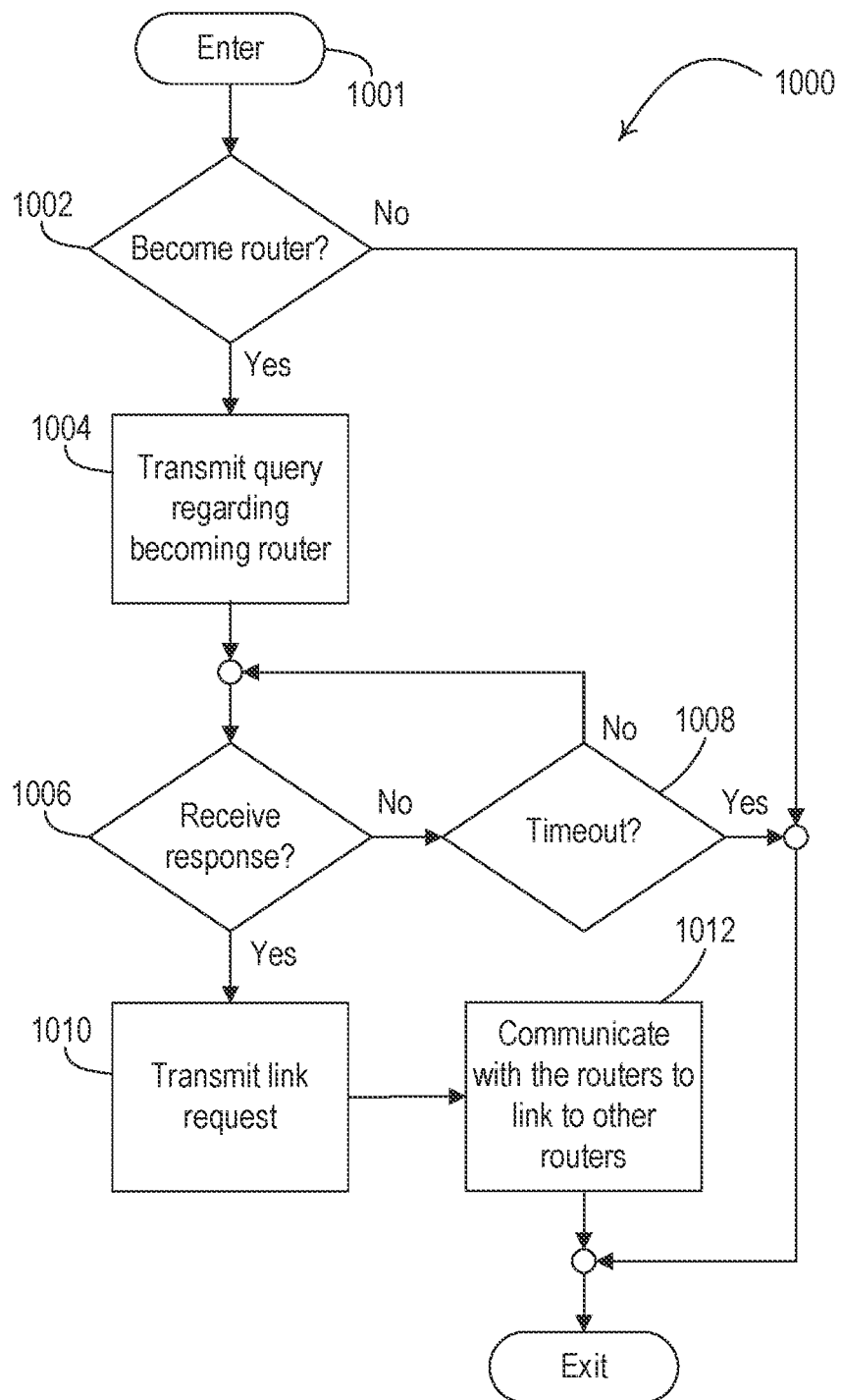
FIG. 10A is a flowchart of an example procedure for becoming a router device.
Figure 10B:
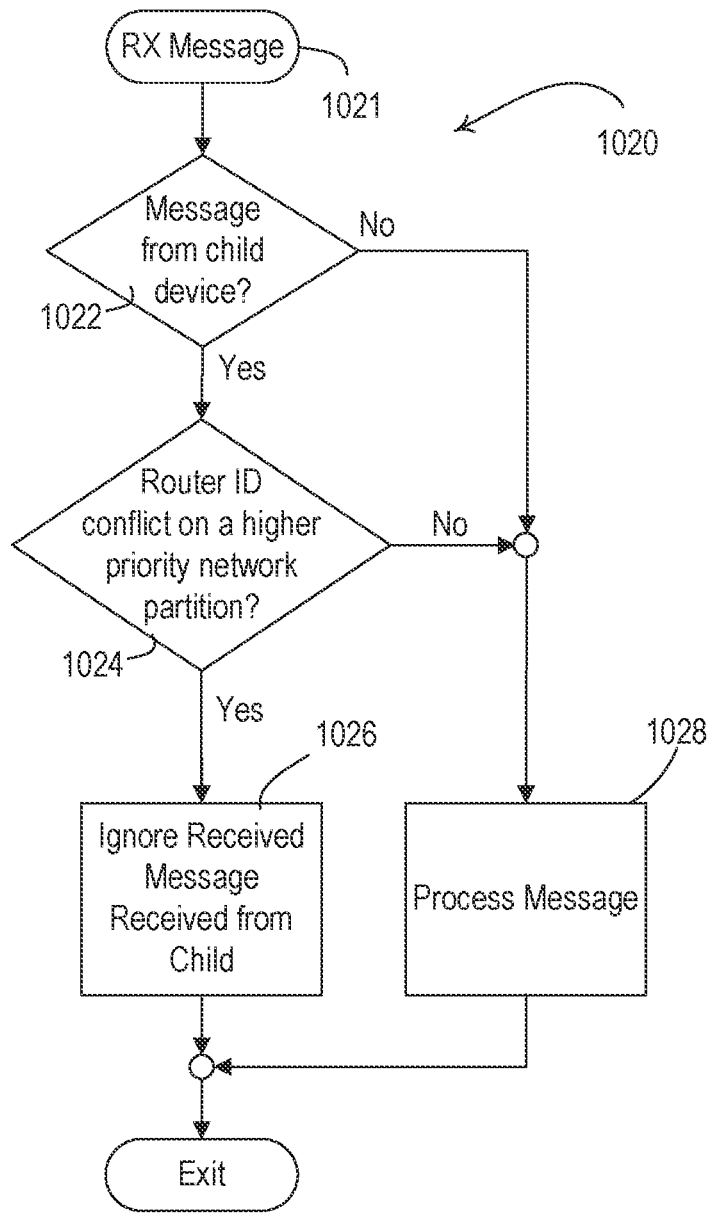
FIG. 10B is a flowchart of an example procedure performed by a parent device in response to receiving a message.
Figure 10C:
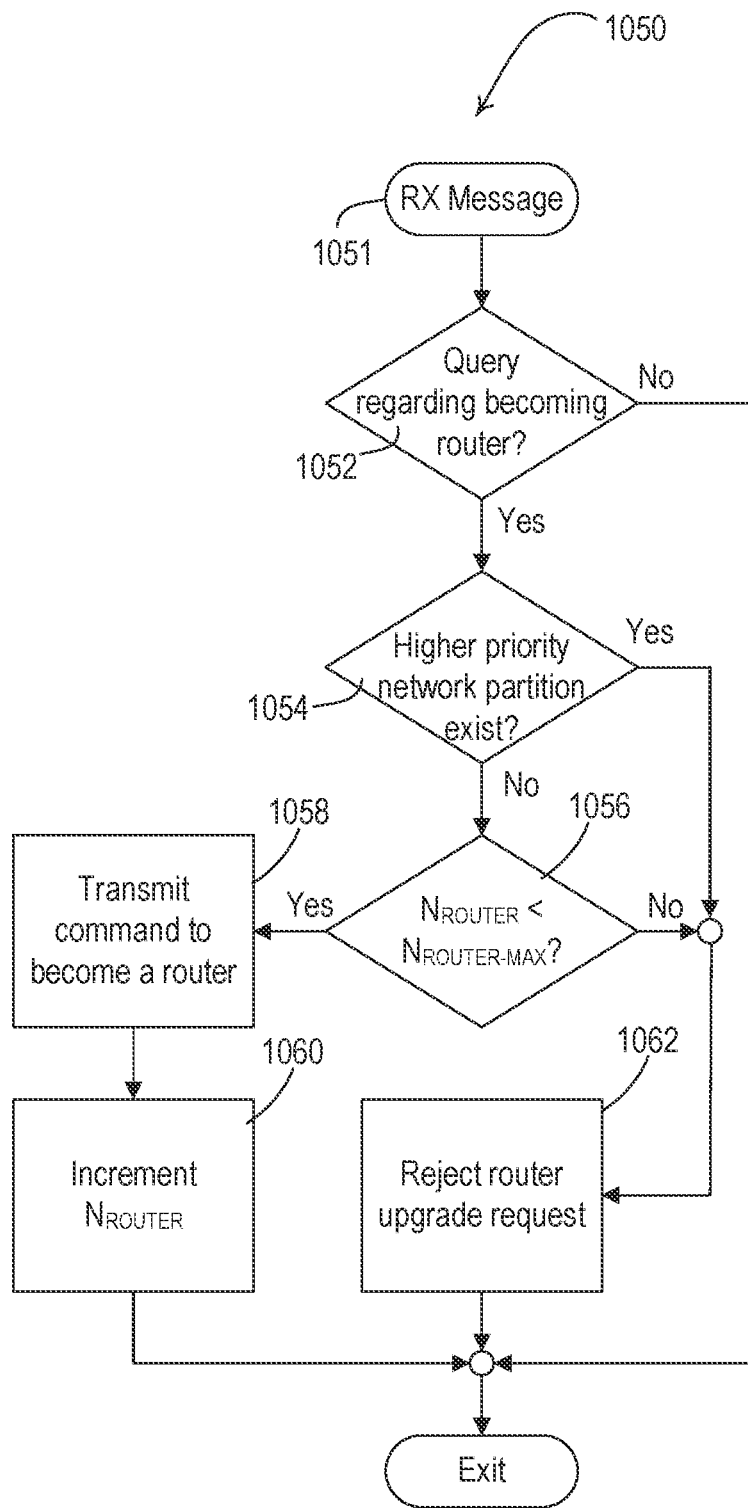
FIG. 10C is a flowchart of an example procedure performed by a leader device in response to receiving a message.

As described herein, control devices that are joined to different networks or network partitions may be unable to communicate with each other. Therefore, in order for all of the control devices in a load control system to communicate with each, the control devices in the load control system may be joined to a single network or network partition. However, in certain scenarios multiple networks or network partitions may be formed in a load control system. For example, when a control device is unable to attach to a router device on an already formed network or network partition, the control device may form a new network or network partition. FIGS. 10A to 10C illustrate example procedures to form a single network or network partition that the control devices in a load control system are attached to.

FIG. 10A is a flowchart of an example procedure 1000 for a control device to transition to the role of a router device (e.g., be upgraded to a router device). The procedure 1000 may be performed by a control device that is capable of being assigned to the role of a router device, such as the router eligible end device 240. At 1002, the control device may determine whether to transition to the role of a router device. The control device may determine to transition to the role of a router device in a plurality of scenarios. For example, the control device may determine to transition to the role of a router device when: the control device determines that number of router devices within the network (e.g., or network partition) is insufficient (e.g., below a threshold). As described herein, the control device may determine to transition to the role of a router device when another device that is attempting to attach to the network (e.g., or network partition) requests to use the control device as its parent device (e.g., transmits a an attachment message configured to establish parent-child link, such as a parent-request message, to the control device). If the control device fails to determine to transition to the role of a router device, the procedure 1000 may exit.

If the control device determines that the control device should transition to the role of a router device, the device may transmit a message to become a router device at 1004. For example, the control device may transmit an address solicit request message to the leader device of the network or network partition. At 1006, the control device may determine whether a response to the message to become a router device is received or not. For example, a response to a message to transition to a router device may include an assigned router identifier. If a response is not received at 1006, the control device may determine if a timeout period of time has elapsed at 1008. If the timeout period of time has elapsed and the response has not been received, the procedure 1000 may exit. The timeout period of time may be predefined and indicate the period of time during which a response to a message to become a router device is to be received.

If the response to the message to become a router device is received at 1006, the control device may transmit a link-request message at 1010. As described herein, the router devices within a network may respond to a link-request message with a link accept message, and the control device may now be assigned to the role of router device. After upgrading of router device, other device may attach to and establish parent-child links with the control device, which may decrease the likelihood that a control device forms a new network partition because it failed to attach to a device on an already formed network or network partition Accordingly, at 1012, the control device performing the procedure 1000 may communicate with the router devices that respond to the link request transmitted at 1010, and the procedure 1000 may exit.

Referring again to FIG. 2B, the multiple network partitions 201, 202, 203 may be formed in the single network 200b However, the devices in one partition (e.g., the first network partition 201) may not be able to communicate with devices in another partition (e.g., the second network partition 202 and/or the third network partition 203). For example, referring now to FIG. 1, if the network device 190 is attached to a different network partition than the floor lamp 142, the network device 190 may be unable to communicate with (e.g., send load control instructions) to the floor lamp 142. Similarly, if the system controller 110 is attached to a different network partition than the motorized window treatments 150, the system controller 110 may be unable to communicate with the motorized window treatments 150. However, referring back to FIG. 2B, the devices in a network, such as the network 200b, may eventually be able to communicate with each other when each of the devices are in a single network partition (e.g., as shown in FIG. 2A). Accordingly, in an attempt to consolidate multiple network partitions into a single network partition, devices may attempt to attach to higher-priority network partitions. For example, the network partition with the higher-priority value may be the network partition with the higher partition identifier. Referring again to FIG. 2B, the network partition 201 may have a higher priority than the network partitions 202, 203 (e.g., as the network partition 201 has a partition identifier of 3, and the network partitions 202, 203 have partition identifiers of 1 and 2, respectively). In addition, a network partition that includes at least one router device (e.g., at least one router device other than the leader device) may be a higher-priority network partition than a network partition that does not include a router device, irrespective of the priority value of the network partitions. For example, referring to FIG. 2B, as the network partition 202 include router devices 222a, 222b, 222c, 222d, the network partition 202 may have a higher priority than the network partition 203 (e.g. even though the network partition 203 has a higher priority value of 2). Accordingly, if the leader device 213 hears an advertisement message form a control device in the network partition 202, the leader device 213 may attempt to attach to the network partition 202.

As described herein, the router devices in a network partition may be assigned a router identifier (e.g., a router ID) by the leader device of a respective network partition. When a control device attempts to attach to another control device on the network partition and then attempts to become a router device, the device may be randomly assigned a router identifier (e.g., from a range of pre-defined router identifiers). Also, or alternatively, when a control device attempts to attach to another control device on the network partition and then attempts to become a router device, the device may request to be assigned a certain router identifier. For example, a router device may request to be assigned a certain router identifier when the router device was assigned the requested router identifier in a network partition to which the device was previously attached. In addition, if the router device subsequently attach to another network partition and uses the router identifier assigned in the previous network partition, the children of the router device from the previous network partition may automatically attach (e.g., with using an attachment procedure) to the router device in other network partition (e.g., without attempting to attach to the another router device on network partition as described herein in conjunction with FIGS. 6-8B). If, however, the router device attaches to the other network partition and is unable to use the requested router identifier (e.g., the router device is assigned a different router identifier), the child devices of the router device may not automatically attach to the other network partition. Rather the child devices may have to attach to another router device on network partition using the procedures described in conjunction with FIGS. 6-8B (e.g., using an attachment procedure to establish parent-child links).

The child devices of the parent device that detaches from a network partition may fail to communicate with the other devices on the network partition (e.g. as the parent device facilitates communication for the child device) and, the child devices may attempt to attach to and establish a parent-child link with another router device in the partition. In certain instances, the parent device detaches from the network partition to attach to another network partition may be the leader device of the network partition. As described herein, when a leader device detaches from a network partition, the network partition may cease to exist (e.g., as every network partition must include at least one leader device). As a result, when the leader device detaches from the network partition, the child devices of the leader device and any router devices on the network partition may attempt to attach to another network partition. As described herein, as the number of devices attempting to attach to the other network partitions increases, attachment of the devices to another partition network may be delayed (e.g., due to the back-off time periods as described herein). However, if the devices initiate the attachment procedure earlier, the formation of a single network partition in the network may be expedited.

FIG. 10B is a flowchart of an example procedure 1020 performed by a control device (e.g., a parent device) in response to receiving a message (e.g., from a child device). For example, the message may be received via a network or network partition (e.g., the network 200a, 200b, 200c, 200d and/or the network partitions 200, 201, 202). The procedure 1020 may be performed by a control device that is a parent device (e.g., a leader device or a router device) that has established at least on parent-child relationship with a child device (e.g., an end device, a sleepy-end device, and/or a router eligible end device). As illustrated in FIG. 10B, the procedure 1020 may be performed by a control device in response to receiving a message at 1021. At 1022, the parent device may determine whether the received message is from a child device (e.g., a child device attached to the control device performing the procedure 1020). If the message is received from a control device other than a child device, the parent device may process the message accordingly at 1028. For example, the message received at 1021 may be an advertisement message from a router device that is attached to another network partition. Further, the control device may process the router advertisement message at 1028 to determine a priority associated with the other network partition (e.g., to determine if the other network partition is of a higher priority), and/or determine if a conflict exists on the other network partition (e.g., a router ID conflict). After processing the message at 1028, the procedure 1020 may exit.

As illustrated in FIG. 10, a control device that is a parent device to at least one child device may ignore messages from it child devices when it detects a conflict (e.g., a router ID conflict) on a higher priority network. For example, if, at 1022, the received message is from a child device, the parent device may determine whether a conflict between its router identifier and router identifiers of router devices on a higher-priority network partition (e.g., a router ID conflict) exists at 1024. As described herein, the control device may determine that a router ID conflict exists when a control device receives an advertisement message from a router device that is attached to a higher-priority network partition and is assigned the same router identifier as the device that receives the advertisement message (e.g., while processing received messages that are not received from child devices of the control device at 1028 of a previous invocation of procedure 1020). For example, an advertisement messages received from a control device attached to another network or network partition may include an indication of the router IDs of each of the respective router devices that are attached to the other network or network partition, which may provide the control device with the ability to determine whether a router ID conflict exists. If a router ID conflict does not exist at 1024, the control device may process the message from its child device accordingly at 1028. For example, the control device may respond to or route the message received from the child device. Again, after processing the message at 1028, the procedure 1020 may exit.

If, however, the control device determines that a router ID conflict does exist (e.g., while processing received messages that are not received from child devices of the control device at 1028 of a previous invocation of procedure 1020), the control device may ignore the message received from the child device at 1026. As described herein, when a router ID conflict exists, the control device may be unable to attach to the higher-priority network partition and continue to use the same router identifier. In addition, the child devices of the parent device may not be able to automatically attach to the higher-priority network partition. Instead, the parent device may detach from its present network partition and attempt to attach to the higher-priority network partition (e.g., using the procedures described in conjunction with FIGS. 3-5B), which may decrease the time it takes to form a single network partition. The parent device may be assigned an updated router identifier by the higher-priority network partition (e.g., a different router identifier from the router identifier assigned in the previous network partition). When the parent device detaches from the network partition, the child devices of the parent device may fail to communicate with other devices in the network partition (e.g., as child devices communicate in the network partition via the parent device) and trigger the child device to attempt to attach to another network partition (e.g., the higher-priority network partition). For example, child devices may check in or poll for data from the respective parent device periodically (e.g., up to every four minutes) and the child device may be triggered to attempt to attach to another network partition when the parent device is unresponsive when the child device checks in or polls for data.

When a higher-priority network partition exists, the growth of lower priority network partitions (e.g., the growth in the number of devices attached to the lower-priority network partitions) may increase the amount of time it takes to form a single network partition. For example, the devices that are attached to a lower-priority network partition may eventually attach to the highest-priority network partition. In addition, if the leader devices of each of the respective lower priority network partitions detach from their respective network partitions, the lower-priority network partitions may cease to exist, which, as described herein, may cause the devices attached to the lower-priority network partition to lose network connectivity and attempt to attach a higher-priority network partition. Accordingly, the devices attached the lower-priority network partition may attempt to attach to the higher-priority network partition at the same or substantially the same time, which may cause attachment of the devices to the higher-priority network partition to be delayed (e.g., due to the back-off time period as described herein).

FIG. 10C is a flowchart of an example procedure 1050 performed by a control device (e.g., a leader device) in response to receiving a message. For example, the message may be received via a network or network partition (e.g., the network 200a, 200b, 200c, 200d, and/or the network partitions 200, 201, 202). The procedure 1050 may be executed by the leader device to determine whether to upgrade a control device (e.g., a router eligible end device) to the role of a router device. As illustrated in FIG. 10C, the procedure 1050 may be performed in response to receiving a message at 1051. At 1052, the leader device may determine whether the message is an attachment message configured to request to be upgraded to a router device (e.g., a router upgrade request message and/or an address solicit message). As described herein, certain devices within a network partition (e.g., router eligible end devices) may be upgraded to the role of a router device. In order to upgrade to the role of a router device, the device may transmit a message to the leader device of a network partition. If the leader device accepts the request to upgrade the role of the device to a router device, the leader device may assign a router identifier to the device. If the received message is not a request to upgrade to the role of a router device, the procedure 1050 may exit.

At 1054, the leader device (e.g., the leader device 211) may determine whether a higher-priority network partition exits. As described herein, devices may attempt to attach to the higher-priority network partitions, for example, to form a single network partition in the network. If a higher-priority network partition does exist and has been identified by the leader device, the leader device may refuse to upgrade (e.g., reject the router upgrade request message) the device to the role of the router device at 1062. For example, if the leader device refuses to allow the device to upgrade to the role of the router device, additional devices may fail to attach to the lower-priority network partition to which the leader device is currently attached (e.g., as additional child devices may not attach to the network partition by attaching to the device that requested to upgrade to the role of a router device). If additional devices are unable to attach to the lower-priority network partition, the time it takes to form a single network partition in the network may decrease.

If, however, a higher-priority network partition does not exist, or has yet to be identified by the leader device, the leader device may determine whether a present router count $N_{ROUTER}$ is less than a maximum router count $N_{ROUTER-MAX}$. The present router count $N_{ROUTER}$ may indicate the number of router devices currently attached to the network partition. The maximum router count $N_{ROUTER-MAX}$ may indicate the maximum number of router devices that may be attached to the network partition, which, as described herein, may be pre-configured and/or pre-defined. If the present router count $N_{ROUTER}$ is less than the maximum router count $N_{ROUTER-MAX}$ (e.g., an additional router device may be attached to the network partition), the leader device may transmit a command to upgrade the device to the role of a router device at 1058 (e.g., by assigning a router identifier to the device). In addition, the parent device may increment the present router count $N_{ROUTER}$ at 1060, for example, to indicate that a router device has attached to the network partition. If, however, the variable $N_{ROUTER}$ is greater than or equal to the maximum router count $N_{ROUTER-MAX}$ (e.g., the maximum number of router devices are attached to the network partition), the parent device may refuse to upgrade the device to the role of a router device at 1062 (e.g. by not assigning a router identifier to the device).

Many implementations of a network, such as a Thread network for example, may continue to allow a child device that has attached to a parent device for establishing a communication link over the network and maintain the communication link until the communication link fails. As described herein, a network may include a single router device (e.g., the leader device) during the initial stage of network formation and the communication link between the router device and the initially added child devices may become tenuous as the network grows. For example, the devices that attach to the network may be child devices of the leader device. As the network grows and advances through formation, the leader device may upgrade the role of one or more of its child devices (e.g., router eligible end devices) to the role of a router device, for example, to account for the attachment of additional devices. Accordingly, as time elapses and the network grows (e.g., as the number of devices attached to the network increases), the number of router devices on the network may increase, which increases the communication range of the network.

After the number of routers attached to the network increases, devices that attempt to attach to the network may be provided with an increased number of routers to attach to, which may allow for the devices to attach to routers that share a stronger communications link with a respective device (e.g., messages between the router and a respective device has a higher RSSI). For example, two respective devices may share a strong communications link if the two devices are proximately positioned (e.g., located in proximity to each other such that communications between each other are likely to be successful). Similarly, devices that attempt to attach to an auxiliary parent may be provided with an increased number of routers to attach to, which may allow for the devices to attach with routers that share a stronger communications link with the device.

If a child device attaches to a parent device that has a stronger communications link, communications over the network for that device may improve (e.g., the likelihood that messages are successfully sent and/or received may increase). For example, communication over the network for the device may improve because the communication link between a respective child device and a parent device may be stronger (e.g., messages may be sent and/or received with a stronger or higher received signal strength indicator). However, as described herein, during the initial stages of network formation (e.g., when the network includes less than three routers), the child device may fail to attach to a parent device that that has a stronger communications link. For example, the child device may fail to attach to a parent device that that has a stronger communications link because said parent device may not exist (e.g., the network may have failed to upgrade device that shares a strong communications link with the child device). In addition, as long as a threshold number of communications are being successfully sent and/or received (e.g., communications are successfully sent and/or received 25% of the time), a child device may remain attached to a parent device. As a result, the child device may remain attached to a parent device that fails to have a stronger communications link than another parent device, which may decrease the success of the communications performed on the network for the device (e.g. the likelihood that messages fail to be sent and/or received may increase).

However, if a child device attaches to a parent device that has a weaker communications link than other available parent devices, communications over the network for the child device may degrade (e.g., the likelihood that messages fail to be sent and/or received may increase). The child device may, however, stay attached to the parent device that has a weaker communication link. For example, a child device may remain attached to the parent device until the number of consecutively failed message transmission and/or reception is greater than or equal to a threshold number of transmission failures (e.g., 5). In addition, when message transmissions fail, communication for the child device may be delayed, which may cause the load control system to fail to promptly respond to commands for enabling load control within the system.

As described herein, during the initial stages of network formation a child device may be unable to attach to a parent device that is proximately positioned or located to the control device (e.g., a router device that shares a stronger communications link with the control device). For example, the child device may be unable to attach to a parent device that is proximately positioned or located to the device because the network may have yet to upgrade a router device that is proximately positioned or located to the child device.

Instead the control device may attach to a router device that is not proximately positioned or located, which may increase the likelihood of failed message transmissions and/or failed message receptions. As the network upgrades additional router devices, the control device may attempt to attach to another router device, which may be proximately located or positioned increasing the likelihood of successful message transmissions and/or receptions.

A control device may attempt to attach to another parent device, for example, in an attempt to attach to a router device that is proximately positioned or located to the device. In addition, as routers may be sporadically upgraded by the network during the initial stages of network formation, the routers that are proximately positioned or located to the device may change over time. As a result, the rate at which a control device determines whether to attach to another parent device may be variable and/or such that the network is unlikely to subsequently upgrade other routers. For example, the rate at which the control device determines whether to attach to another parent device may be based on changes to the auxiliary parent table. A parent-update timer may be used to determine whether to attach to an updated parent device. The parent-update timer may be reset when the auxiliary parent table is updated (e.g., as shown at 940 of the procedure 920 of FIG. 9B).

A child device may determine whether to attach to an updated parent device upon expiration of the parent-update timer. For example, the child device may determine to attach to an updated parent device when a communication link (e.g., a parent/child link) between the child device and the updated parent device may be stronger than a communications link between the child device and the present parent device of the child device (e.g., the updated parent device is more proximately located to the child device that the present parent device of the child device and/or an interferer has been removed). If the child device attaches to an updated parent device that shares a stronger communications link with the child device, the quality of communication for the child device over the network may improve.

Figure 11:
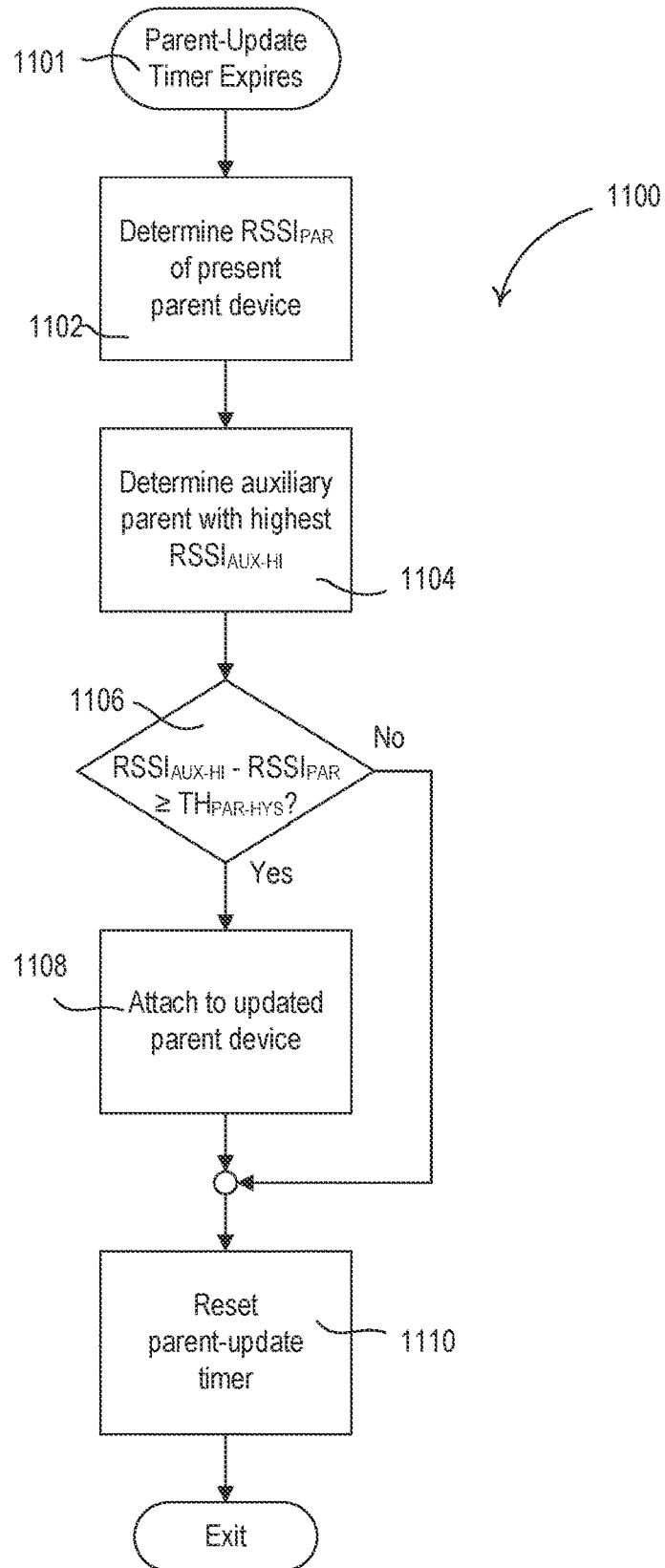
FIG. 11 is a flowchart of an example procedure performed by a child device to determine whether the attempt to attach to an updated parent device.

FIG. 11 is a flowchart of an example procedure 1100 performed by a control device to attach to an updated parent device. The procedure 1100 may be performed by the control device after the control device has attached to a parent device on a network or network partition (e.g., the networks 200a, 200b, 200c, 200d, and/or the network partitions 201, 202, 203). The control device performing the procedure 1100 may be a child device attached to a parent device on the network. The procedure 1100 may be performed when at least one auxiliary parent device is identified in the auxiliary parent table (e.g., the auxiliary parent table has a non-null value) for potentially being added as the updated parent device and/or when the auxiliary parent device has a stronger average received signal strength identifier than the present parent device over a period of time. Referring now to FIG. 2A, the procedure 1100 may be performed by the end devices 230a, 230b, the router eligible end device 240, and/or the sleepy end device 250.

As illustrated in FIG. 11, the procedure 1100 may be executed upon expiration of the attachment timer at 1101. The parent-update timer may be reset when the auxiliary parent table is updated. The auxiliary parent table may be updated each time an auxiliary parent device is added to the auxiliary parent table. An auxiliary parent device may be added to auxiliary parent table when the control device attaches to an auxiliary parent device. An addition to the auxiliary parent table may indicate that the network is in the initial stages of network formation (e.g., control devices are still attaching to the network and/or the leader devices is still upgrading router devices on the network) the control device has been added to the network, and/or a form of interference (e.g., a partition or other communicating devices) has been removed. An update to the auxiliary parent table may indicate that the leader device of the network recently upgraded an end device to a router device that is proximately positioned to the control device, which may also indicate that the leader device of the network may update other router devices that are proximately positioned to the control device.

At 1102, the control device may determine a communication metric, e.g., received signal strength indicator magnitude of the present parent device of the control device. For example, the control device may determine a received signal strength indicator $RSSI_{PAR}$ of the present parent device of the control device at 1102. As described herein, the control device may be attached to a parent device, which may facilitate communications for the control device over the network. At 1104, the control device may determine an auxiliary parent device in the auxiliary parent table with a highest received signal strength indicator $RSSI_{AUX-HI}$. The control device may be attached to one or more auxiliary parent devices. A router device on the network (e.g., a leader device, such as the leader device 210, and/or a router device, such as one of the router devices 220a-220d) may operate as an auxiliary parent device.

The control device may determine whether a respective communication metric of an auxiliary parent device indicates a stronger potential communication link than the communication metric of a parent device For example, as illustrated in FIG. 11, the control device may determine if the difference between the highest received signal strength indicator $RSSI_{AUX-HI}$ of the auxiliary parent devices in the auxiliary parent table and the received signal strength indicator $RSSI_{PAR}$ of the present parent device is greater than or equal to a hysteresis threshold $TH_{PAR-HYS}$ (e.g., $RSSI_{AUX-HI} - RSSI_{PAR} \geq TH_{PAR-HYS}$) at 1106. The hysteresis threshold $TH_{PAR-HYS}$ may be implemented to ensure that communications between the control device and the auxiliary parent device being considered for the updated parent device are stronger than the communications between the control device and the present parent device by at least the hysteresis threshold $TH_{PAR-HYS}$. The hysteresis threshold $TH_{PAR-HYS}$ may prevent a child device from updating its parent device too often, e.g., between a number of parent devices having similar received signal strength indicators for communications, which may avoid additional network communications and processing for similar or nominal communication gains.

The hysteresis threshold $TH_{PAR-HYS}$ may be predefined (e.g., approximately 10 dB). The hysteresis threshold $TH_{PAR-HYS}$ may be variable. For example, the hysteresis threshold $TH_{PAR-HYS}$ may be based on the highest received signal strength indicator $RSSI_{AUX-HI}$ in the auxiliary parent table. The hysteresis threshold $TH_{PAR-HYS}$ may be set a predefined amount or percentage below the highest received signal strength indicator $RSSI_{AUX-HI}$ of the auxiliary parent devices in the auxiliary parent table. If the difference between the highest received signal strength indicator $RSSI_{AUX-HI}$ of the auxiliary parent devices and the received signal strength indicator $RSSI_{PAR}$ of the present parent device is less than the hysteresis threshold $TH_{PAR-HYS}$ at 1100, the procedure 1100 may exit.

If the difference between the highest received signal strength indicator $RSSI_{AUX-HI}$ of the auxiliary parent devices and the received signal strength indicator $RSSI_{PAR}$ of the present parent device is greater than or equal to the hysteresis threshold $TH_{PAR-HYS}$ at 1106, the control device may, at 1108, initiate an attachment procedure to attempt to attach to an updated parent device (e.g. after detaching from the present parent device). For example, the updated parent device may be the auxiliary parent device with the highest received signal strength indicator $RSSI_{AUX-HI}$, which may improve communications for the control device on the network. The control device may attach to the auxiliary parent device with the highest received signal strength indicator $RSSI_{AUX-HI}$ by transmitting one or more attachment messages configured to establish an parent-child link, such as, a parent-request message (e.g., as a unicast parent-request message) to that auxiliary parent device. The auxiliary parent device with the highest received signal strength indicator $RSSI_{AUX-HI}$ may transmit a response to the parent-request message, which may include an indication of the received signal strength indicator of the parent-request message. For example, received signal strength indicator of the parent-request message may be used to describe the strength of communication from the control device to the auxiliary parent device with the highest received signal strength indicator $RSSI_{AUX-HI}$.

If the control device is unable to attach to the auxiliary parent device with the highest received signal strength indicator $RSSI_{AUX-HI}$ and/or the received signal strength indicator from the auxiliary parent with the highest received signal strength indicator $RSSI_{AUX-HI}$ indicates it is unable to receive communications from the control device at a higher received signal strength identifier than the present parent device, or a threshold level above the present parent device, then the control device may attempt to attach to another auxiliary parent device in the auxiliary parent table. For example, the control device may move to the auxiliary parent having the next order of priority in the auxiliary parent table to attempt attachment.

At 1110, the control device may reset the parent-update timer, before the procedure 1100 exits, such that the procedure 1100 may be executed once again when the parent-timer expires to see if the control device should attempt to attached to an updated parent device.

Figure 12:
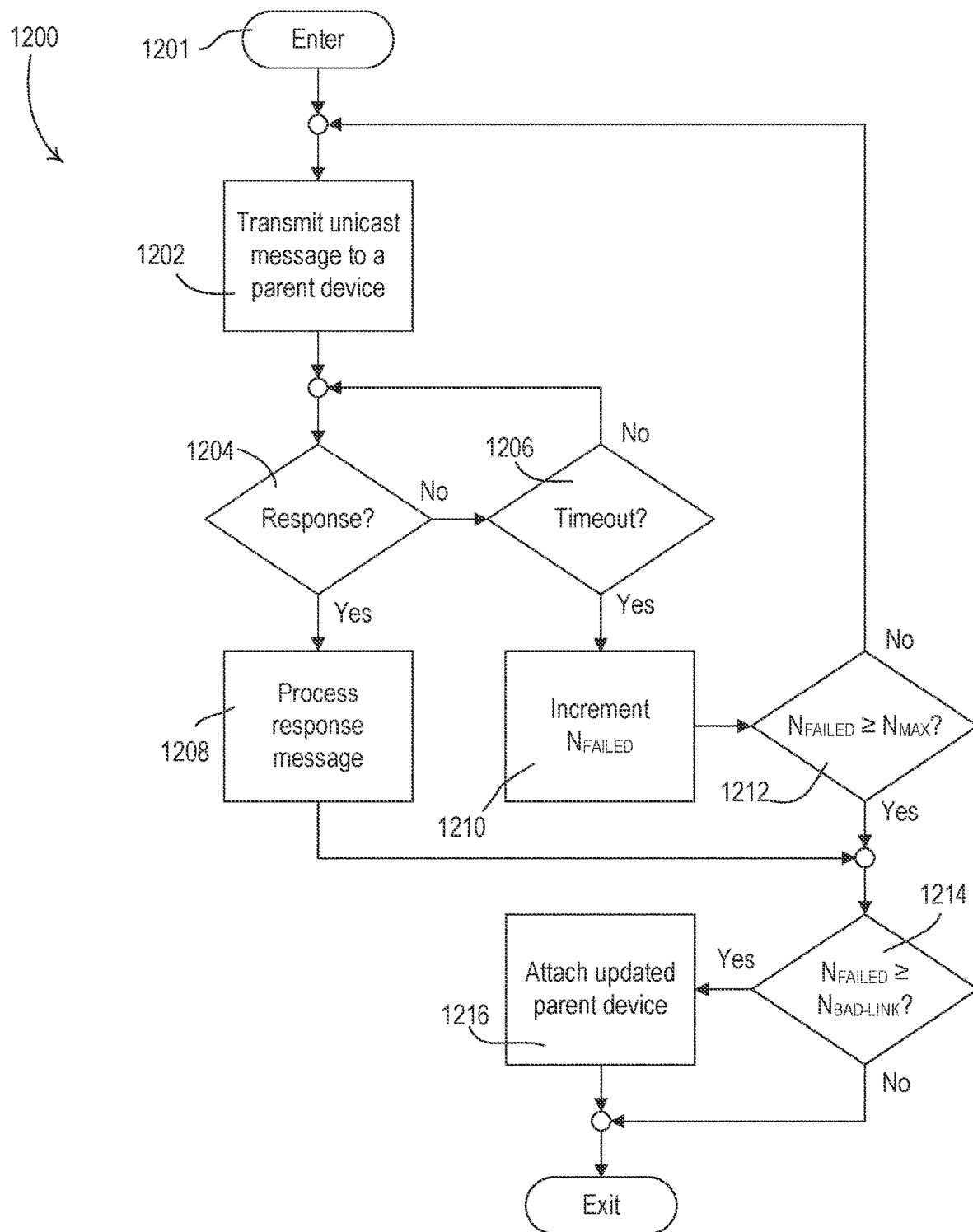
FIG. 12 is a flowchart of another example procedure performed by a child device to transmit unicast messages to a parent device.

FIG. 12 is a flowchart of an example procedure 1200 performed by a control device to transmit unicast messages to a parent device. The procedure 1200 may be performed by the control device after the control device has attached to another device (e.g., an initial parent device) on the network. For example, the control device performing the procedure 1200 may be a child device attached to a parent device on the network. While executing the procedure 1200, the control device may determine when to attempt to attach to an updated parent device or not. Referring now to FIG. 2A, the procedure 1200 may be performed by the end devices 230a, 230b, the router eligible end device 240, and/or the sleepy end device 250.

As illustrated in FIG. 12, the procedure 1200 may begin at 1201. For example, the control device may execute the procedure 1200 in response to an actuation of a button of a user interface at 1201. At 1202, the control device may transmit a unicast message to the parent device (e.g., a unicast message indicating the actuation of the button detected at 1201). At 1204, the control device may determine whether a response to the unicast message (e.g., a response message) was received. For example, the response message may provide an indication that the parent device received the unicast message (e.g., an acknowledgement message) and/or may otherwise indicate that transmission of the unicast message was successful. The response message may include an indication of the received signal strength indicator at which the unicast message was received at the parent device. If a response message is received, the control device may process the response message at 1208. For example, the control device may update a visual indicator of the user interface in response to the response message at 1208. If, however, a response message is not received at 1204, the control device may determine if a timeout period of time has elapsed at 1206. When the timeout period of time elapses at 1206 without the response being received at 1204, the control device may, at 1210, increment a number $N_{FAILED}$ of failed transmissions of unicast messages to the parent device. The timeout period of time may be predefined and may indicate the period of time during which a response message is to be received. At 1212, the control device may determine whether the number $N_{FAILED}$ of failed transmissions to the parent device is greater than or equal to a maximum threshold number $N_{MAX}$ of transmissions (e.g., the initial transmission plus the retransmissions) that are to be performed by the control device before the control devices stops retying to transmit the unicast message to the parent device. The maximum threshold number $N_{MAX}$ of transmissions may be predefined or preconfigured, for example, to a value of twelve (12). If the number $N_{FAILED}$ of failed transmissions to the parent device is not greater than or equal to the maximum threshold number $N_{MAX}$ of transmissions, the control device may retransmit the unicast message to the parent device at 1202.

As described herein, a transmission may fail because the communication link between the control device and the parent device may be weak. For example, the communication link between the control device and the parent device may be weak because the control device may have attached to the parent device during the initial stages of network formation (e.g., when the number of available router devices to which to attach is lower) and/or the control device and the parent device are not proximately positioned to each other. At 1214, the control device may determine whether the number $N_{FAILED}$ of failed transmissions to the parent device is greater than or equal to a maximum number $N_{BAD-LINK}$ of transmissions that may fail before the control device attempts to attach to an updated parent device. The maximum number $N_{BAD-LINK?}$ may indicate a maximum number of failed transmissions or retransmissions that may indicate that the communication link between the control device and the parent device is weak. As a result, if the number $N_{FAILED}$ of failed transmissions to the parent device is greater than or equal to the maximum number $N_{BAD-LINK}$, the control device may initiate an attachment procedure to attempt to attach to an updated parent device at 1216 (e.g. because inefficient communication has been identified). For example, the control device may initiate an attachment procedure to establish a parent-child link with an auxiliary parent device in the auxiliary parent table having the next order of priority in the auxiliary parent table (e.g., set the auxiliary parent device as a parent device).

Figure 13:
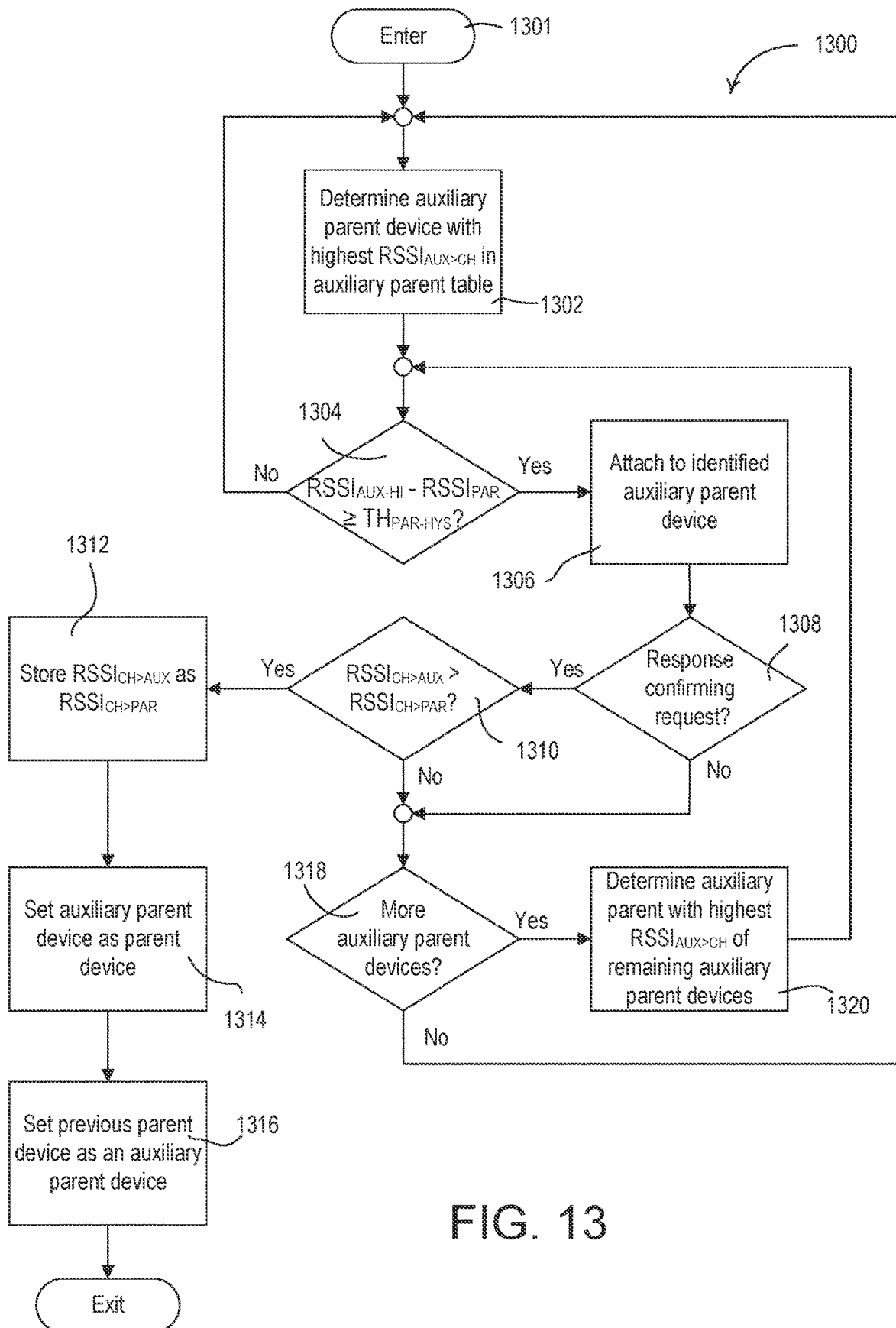
FIG. 13 is a flowchart of an example procedure to attempt to attach to an updated parent device.

As described herein, a control device may attempt to attach to an updated parent device to increase the quality of communications for the control device over the network. For example, a communication link between the control device and the updated parent device may be stronger than a communication link between the control device and the present parent device of the control device. FIG. 13 is a flowchart of an example procedure 1300 performed by a control device to attempt to attach to an updated parent device. The procedure 1300 may be performed by the control device after the control device has attached to a present parent device. For example, the control device performing the procedure 1300 may be a child device the present parent device. Referring now to FIG. 2A, the procedure 1300 may be performed by the end devices 230a, 230b, the router eligible end device 240, and/or the sleepy end device 250. As illustrated in FIG. 13 the procedure 1300 may start at 1301. For example, the procedure 1300 may be executed as an attempt to attach to an updated parent device, for example, during an execution of the procedure 1150 (e.g., at 1158 of the procedure 1150) or an execution of the procedure 1200 (e.g., at 1216 of the procedure 1200).

At 1302, the control device may determine an auxiliary parent device in the auxiliary parent table that has a highest received signal strength indicator $RSSI_{AUX>CH}$ (e.g., a highest received signal strength indicator of messages transmitted by the auxiliary parent device to the child device). For example, at 1302, the control device may simply recall the auxiliary parent device with a highest received signal strength indicator $RSSI_{AUX-HI}$ as determined during an execution of the procedure 1100 (e.g., at 1104 of the procedure 1100). At 1304, the control device may determine if the difference between the highest received signal strength indicator $RSSI_{AUX>CH}$ of the auxiliary parent devices in the auxiliary parent table and the received signal strength indicator $RSSI_{PAR}$ of the present parent device is greater than or equal to a hysteresis threshold $TH_{PAR-HYS}$.

If the difference between the highest received signal strength indicator $RSSI_{AUX>CH}$ of the auxiliary parent devices in the auxiliary parent table and the received signal strength indicator $RSSI_{PAR}$ of the present parent device is greater than or equal to the hysteresis threshold $TH_{PAR-HYS}$ at 1304, the control device may, at 1306, initiate an attachment procedure with the auxiliary parent device in the auxiliary parent table that has the highest received signal strength indicator $RSSI_{AUX>CH}$. For example, during the attachment procedure the control device may transmit one or more attachment messages (e.g., parent-request messages) at 1306 to attach to the auxiliary parent device in the auxiliary parent table having the highest received signal strength indicator $RSSI_{AUX>CH}$ (e.g., become a child device of the auxiliary parent device having the highest received signal strength indicator $RSSI_{AUX>CH}$). The parent-request message may be a message configured to ask an auxiliary parent device if the device is a possible option for attachment. The parent-request message may be a part of a two-message exchange in which the auxiliary parent device sends a response message indicating whether the auxiliary parent device is available to operate as a parent device for the control device. The auxiliary parent device may determine whether the auxiliary parent device has any openings available for additional child device or whether the auxiliary parent device is already a parent device to a threshold number of child devices as defined on the network.

The control device may attempt to attach as a child device of the auxiliary parent device having the highest received signal strength indicator $RSSI_{AUX>CH}$ (e.g., set the auxiliary parent having the highest received signal strength indicator $RSSI_{AUX>CH}$ as the parent device) because a communication link between the control device and that auxiliary parent may be strong and/or the control device and that auxiliary parent device may be positioned close to each other. At 1308, the control device may determine whether a response confirming the parent-request message is received. For example, the auxiliary parent device having the highest received signal strength indicator $RSSI_{AUX-HI}$ may, in response to receiving the parent-request message, transmit a response to confirm that the auxiliary parent device is capable of becoming a parent device of the control device (e.g., accepting the parent-request message). In addition, the response may include an indication of the received signal strength indicator $RSSI_{CH>AUX}$ for messages (e.g., such as the parent-request message) received by the auxiliary parent device from the control device.

At 1310, the control device may determine whether the auxiliary parent device is able to receive messages from the control device at a higher received signal strength indicator than the present parent device or not. For example, the control device may determine, at 1310, if the received signal strength indicator $RSSI_{CH>AUX}$ for messages (e.g., such as the parent-request message) received by the auxiliary parent device from the control device is greater than a received signal strength indicator $RSSI_{CH>PAR}$ for messages received by the present parent device from the control device. As a result, the control device may attempt to attach to an updated parent device if both the communications path for messages transmitted to the updated parent device from the control device and the communications path for messages transmitted to the control device from the updated parent device are strong. If the received signal strength indicator $RSSI_{CH>AUX}$ for messages (e.g., the parent-request message) received by the auxiliary parent device from the control device is greater than the received signal strength indicator $RSSI_{CH>PAR}$ for messages received by the present parent device from the control device, the control device may store the received signal strength indicator $RSSI_{CH>AUX}$ as the received signal strength indicator $RSSI_{CH>PAR}$ at 1312 (e.g., for future use in determining when to attach to an updated parent device). At 1314, the control device may set the auxiliary parent device as a parent device, for example, by initiating an attachment procedure with the auxiliary parent device having the highest received signal strength indicator $RSSI_{AUX-HI}$, for example, to establish a parent-child link with the auxiliary parent device having the highest received signal strength indicator $RSSI_{AUX-HI}$ (e.g., and obtain a child identifier from the auxiliary parent device having the highest received signal strength indicator $RSSI_{AUX-HI}$). At 1316, the control device may set the previous parent device as an auxiliary parent device, for example, initiate an attachment procedure to establish an auxiliary parent link with the previous parent device. As described herein, the attached procedure may include transmitting one or more attachment messages configured to establish an auxiliary parent link (e.g., link-request messages or link-response messages) to the previous parent device. For example, initiating an attachment procedure with the previous parent device may indicate that the previous parent device is no longer the parent device of the control device, before the procedure 1300 may exit.

If, however, the received signal strength indicator $RSSI_{CH\rightarrow AUX}$ for messages received by the auxiliary parent device from the control device is not greater than the received signal strength indicator $RSSI_{CH\rightarrow PAR}$ for messages received by the present parent device from the control device, the control device may consider another auxiliary parent device to be the updated parent device. The control device may determine whether there are additional auxiliary parent devices in the auxiliary parent table at 1318. If the control device determines that there are additional auxiliary parent devices in the auxiliary parent table at 1318, the control device may determine, at 1320, the auxiliary parent with the highest received signal strength indicator $RSSI_{AUX>CH}$ of the remaining auxiliary parent devices in the auxiliary parent table (e.g., excluding the auxiliary parent device to which the control device just tried to attach). For example, the control device may determine the auxiliary parent device with the next highest received signal strength indicator using the auxiliary parent table at 1320. The procedure 1300 may then loop around to determine if the difference between the received signal strength indicator $RSSI_{AUX>CH}$ of the remaining auxiliary parent devices in the auxiliary parent table and the received signal strength indicator $RSSI_{PAR}$ of the present parent device is greater than or equal to the hysteresis threshold $TH_{PAR-HYS}$ at 1304.

If the difference between the received signal strength indicator $RSSI_{AUX>CH}$ of the remaining auxiliary parent devices in the auxiliary parent table and the received signal strength indicator $RSSI_{PAR}$ of the present parent device is less than the hysteresis threshold $TH_{PAR-HYS}$ at 1304, the control device may determine the highest received signal strength indicator $RSSI_{AUX>CH}$ of the auxiliary parent devices (e.g., all of the auxiliary parent devices) in the auxiliary parent table at 1302. In addition, when there are not more additional auxiliary parent devices in the auxiliary parent table at 1318, the control device may also then determine the highest received signal strength indicator $RSSI_{AUX>CH}$ of the auxiliary parent devices (e.g., all of the auxiliary parent devices) in the auxiliary parent table at 1302. The control device may continue to attempt to attach to the auxiliary parent devices in the auxiliary parent table until the control device successfully attaches to one of the auxiliary parent devices at 1314. In addition, the control device may exit from the procedure 800 after a predetermined timeout period (e.g., exit without attaching to an updated parent device).

Figure 14:
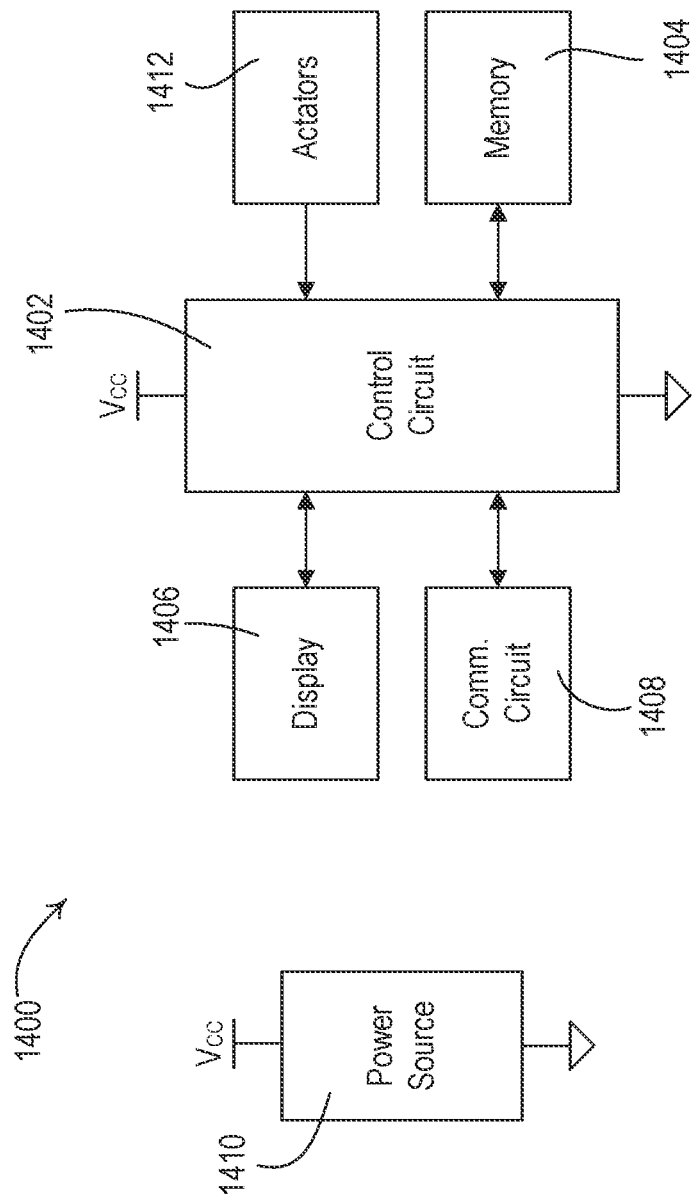
FIG. 14 is a block diagram of an example mobile device.

FIG. 14 is a block diagram illustrating an example mobile device 1400 as described herein. The mobile device 1400 may include a control circuit 1402 for controlling the functionality of the mobile device 1400. The control circuit 1402 may include one or more general purpose processors, special purpose processors, conventional processors, digital signal processors (DSPs), microprocessors, integrated circuits, a programmable logic device (PLD), application specific integrated circuits (ASICs), or the like. The control circuit 1402 may perform signal coding, data processing, power control, input/output processing, or any other functionality that enables the mobile device 1400 to perform as described herein. The control circuit 1402 may store information in and/or retrieve information from the memory 1404. The memory 1404 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The mobile device 1400 may include a communications circuit 1408 for transmitting and/or receiving information. The communications circuit 1408 may perform wireless and/or wired communications. The communications circuit 1408 may include an RF transceiver or other circuit capable of performing wireless communications via an antenna. Communications circuit 1408 may be in communication with control circuit 1402 for transmitting and/or receiving information.

The control circuit 1402 may also be in communication with a display 1406 for providing information to a user. The control circuit 1402 and/or the display 1406 may generate GUIs for being displayed on the mobile device 1400. The display 1406 and the control circuit 1402 may be in two-way communication, as the display 1406 may include a touch screen module capable of receiving information from a user and providing such information to the control circuit 1402. The mobile device 1400 may also include an actuator 1412 (e.g., one or more buttons) that may be actuated by a user to communicate user selections to the control circuit 1402.

Each of the modules within the mobile device 1400 may be powered by a power source 1410. The power source 1410 may include an AC power supply or DC power supply, for example. The power source 1410 may generate a supply voltage Vcc for powering the modules within the mobile device 1400.

Figure 15:
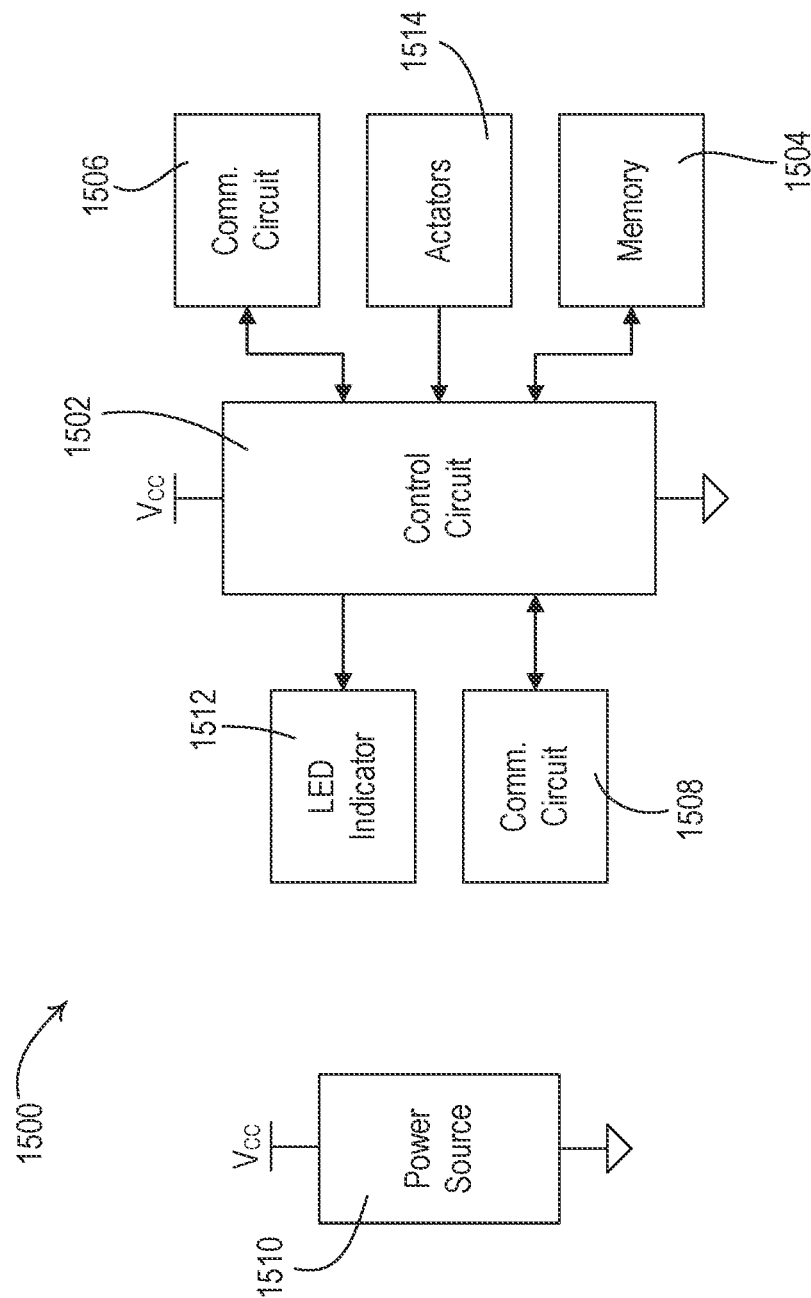
FIG. 15 is a block diagram of an example system controller.

FIG. 15 is a block diagram illustrating an example system controller 1500 as described herein. The system controller may be a gateway system controller, a target system controller, a remote system controller, and/or a combination thereof. The system controller 1500 may include a control circuit 1502 for controlling the functionality of the system controller 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the system controller 1500 to perform as described herein. The control circuit 1502 may store information in and/or retrieve information from the memory 1504. The memory 1504 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1500 may include a communications circuit 1506 for transmitting and/or receiving information. The communications circuit 1506 may perform wireless and/or wired communications. The system controller 1500 may also, or alternatively, include a communications circuit 1508 for transmitting and/or receiving information. The communications circuit 1506 may perform wireless and/or wired communications. Communications circuits 1506 and 1508 may be in communication with control circuit 1502. The communications circuits 1506 and 1508 may include RF transceivers or other communications modules capable of performing wireless communications via an antenna. The communications circuit 1506 and communications circuit 1508 may be capable of performing communications via the same communication channels or different communication channels. For example, the communications circuit may be capable of communicating (e.g., with a mobile device, over a network, etc.) via a wireless communication channel (e.g., BLUETOOTH®, near field communication (NFC), WIFI®, WI-MAX®, cellular, Thread, etc.) and the communications circuit 1308 may be capable of communicating (e.g., with control devices and/or other devices in the load control system) via another wireless communication channel (e.g., WI-FI®, Thread, or a proprietary communication channel, such as CLEAR CONNECT™).

The control circuit 1502 may be in communication with an LED indicator 1512 for providing indications to a user. The control circuit 1502 may be in communication with an actuator 1514 (e.g., one or more buttons) that may be actuated by a user to communicate user selections to the control circuit 1502. For example, the actuator 1514 may be actuated to put the control circuit 1502 in an association mode and/or communicate association messages from the system controller 1500.

Each of the modules within the system controller 1500 may be powered by a power source 1510. The power source 1510 may include an AC power supply or DC power supply, for example. The power source 1510 may generate a supply voltage Vcc for powering the modules within the system controller 1500.

Figure 16:
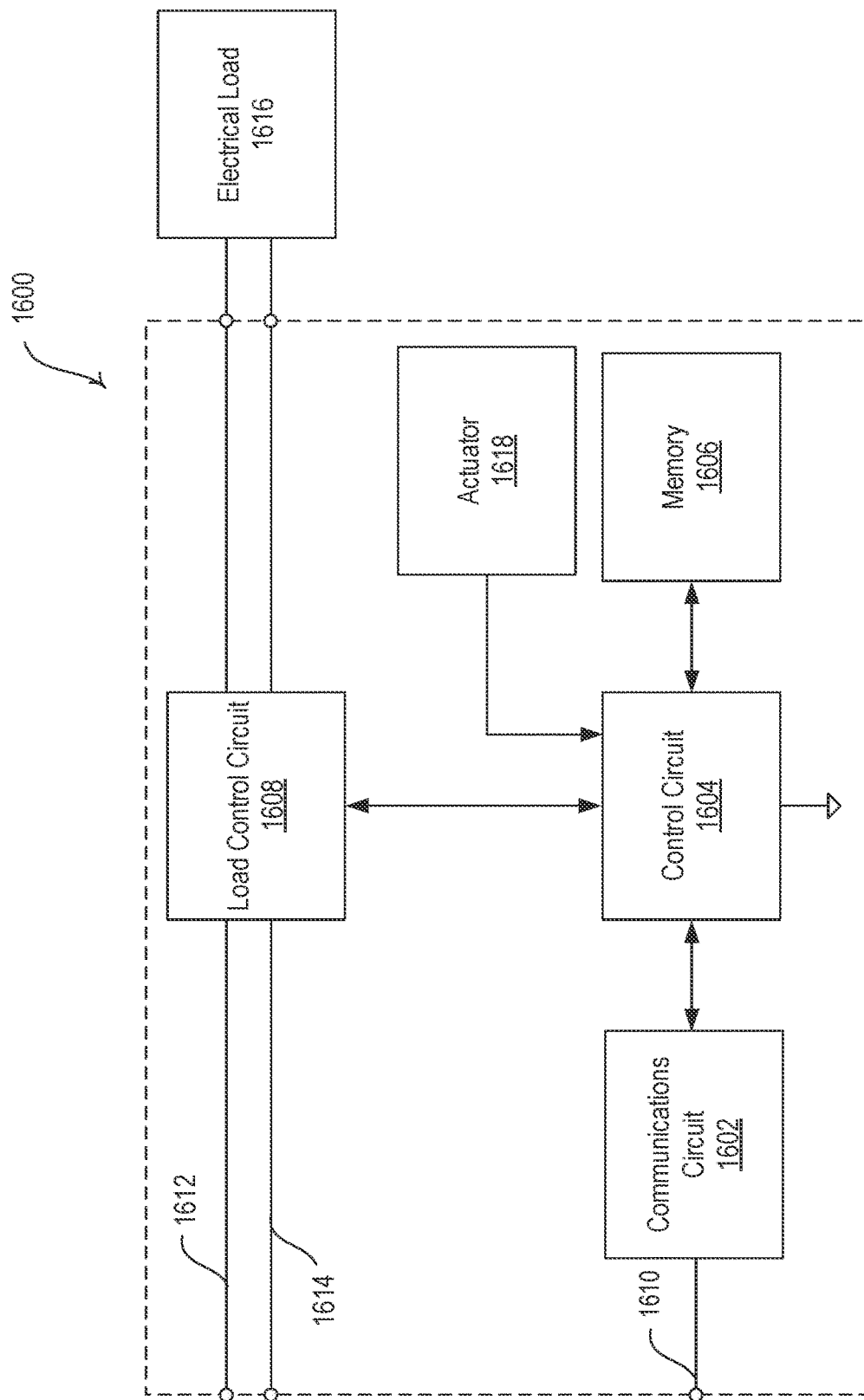
FIG. 16 is a block diagram of an example load control device.

FIG. 16 is a block diagram illustrating an example control-target device, e.g., a load control device 1600, as described herein. The load control device 1600 may be a dimmer switch, an electronic switch, an electronic lighting control device for lamps, an LED driver for LED light sources or other lighting control device, an AC plug-in load control device, a temperature control device (e.g., a thermostat), a motor drive unit for a motorized window treatment, or other load control device. The load control device 1600 may include a communications circuit 1602. The communications circuit 1602 may include a receiver, an RF transceiver, or other communications module capable of performing wired and/or wireless communications via communications link 1610. The communications circuit 1602 may be in communication with control circuit 1604. The control circuit 1604 may include one or more general purpose processors, special purpose processors, conventional processors, digital signal processors (DSPs), microprocessors, integrated circuits, a programmable logic device (PLD), application specific integrated circuits (ASICs), or the like. The control circuit 1604 may perform signal coding, data processing, power control, input/output processing, or any other functionality that enables the load control device 1600 to perform as described herein.

The control circuit 1604 may store information in and/or retrieve information from the memory 1606. For example, the memory 1606 may maintain a registry of associated control devices and/or control configuration instructions. The memory 1606 may include a non-removable memory and/or a removable memory. The load control circuit 1408 may receive instructions from the control circuit 1604 and may control an electrical load 1616 based on the received instructions. The load control circuit 1608 may send status feedback to the control circuit 1604 regarding the status of the electrical load 1616. The load control circuit 1408 may receive power via the hot connection 1612 and the neutral connection 1614 and may provide an amount of power to the electrical load 1616. The electrical load 1616 may include any type of electrical load, such as a lighting load (e.g., LED, fluorescent lamp, etc.).

The control circuit 1604 may be in communication with an actuator 1618 (e.g., one or more buttons) that may be actuated by a user to communicate user selections to the control circuit 1604. For example, the actuator 1618 may be actuated to put the control circuit 1604 in an association mode and/or communicate association messages from the load control device 1600.

Figure 17:
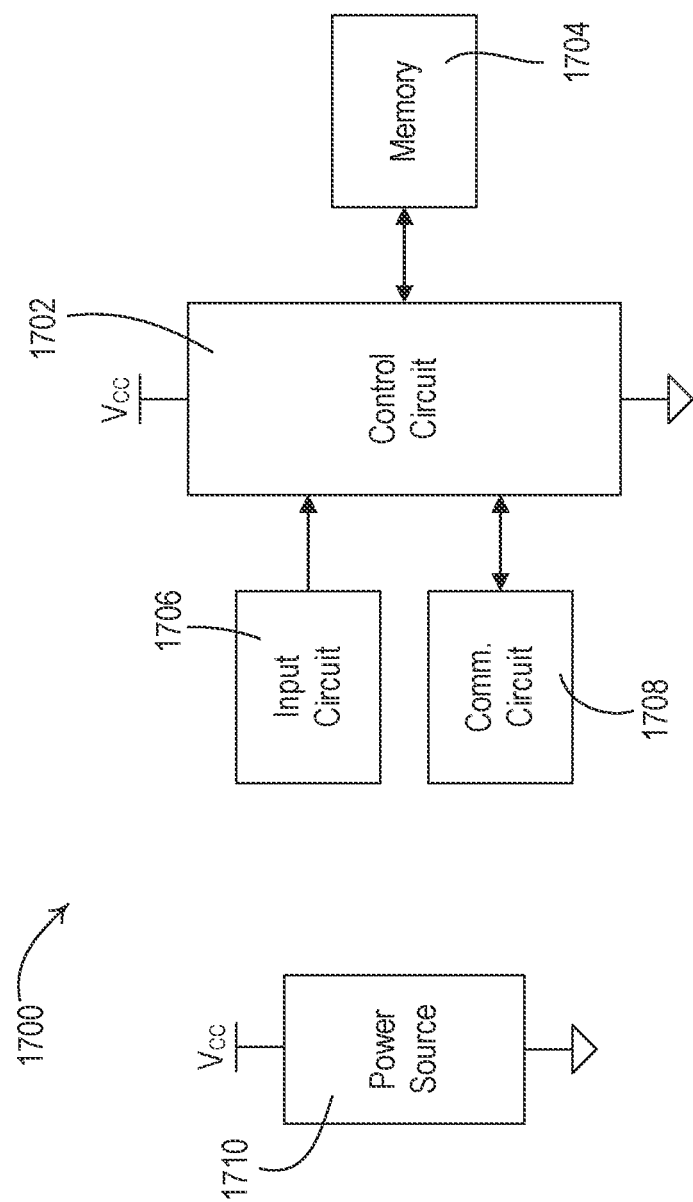
FIG. 17 is a block diagram of an example input device.

FIG. 17 is a block diagram illustrating an example input device 1700, or control-source device, as described herein. The input device 1700 may be a remote control device, an occupancy sensor, a daylight sensor, a temperature sensor, and/or the like. The input device 1700 may include a control circuit 1702 for controlling the functionality of the input device 1700. The control circuit 1702 may include one or more general purpose processors, special purpose processors, conventional processors, digital signal processors (DSPs), microprocessors, integrated circuits, a programmable logic device (PLD), application specific integrated circuits (ASICs), or the like. The control circuit 1702 may perform signal coding, data processing, power control, input/output processing, or any other functionality that enables the input device 1700 to perform as described herein.

The control circuit 1702 may store information in and/or retrieve information from the memory 1704. The memory 1704 may include a non-removable memory and/or a removable memory, as described herein.

The input device 1700 may include a communications circuit 1708 for transmitting and/or receiving information. The communications circuit 1708 may transmit and/or receive information via wired and/or wireless communications. The communications circuit 1708 may include a transmitter, an RF transceiver, or other circuit capable of performing wired and/or wireless communications. The communications circuit 1708 may be in communication with control circuit 1702 for transmitting and/or receiving information.

The control circuit 1702 may also be in communication with an input circuit 1706. The input circuit 1706 may include an actuator (e.g., one or more buttons) or a sensor circuit (e.g., an occupancy sensor circuit, a daylight sensor circuit, or a temperature sensor circuit) for receiving input that may be sent to a control device for controlling an electrical load. For example, the control-source device may receive input from the input circuit 1706 to put the control circuit 1702 in an association mode and/or communicate association messages from the control-source device. The control circuit 1702 may receive information from the input circuit 1706 (e.g. an indication that a button has been actuated or sensed information). Each of the modules within the input device 1700 may be powered by a power source 1710.

Although features and elements are described herein in particular combinations, each feature or element can be used alone or in any combination with the other features and elements. The methods described herein may be implemented in a computer program, software, instructions, or firmware stored on one or more non-transitory computer-readable mediums for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method performed by a router device that is in a first network partition, wherein the router device is assigned an identifier and has end devices that are attached thereto to enable the end devices to transmit and receive messages over the first network partition through the router device, the method comprising:

detecting formation of a second network partition, wherein the first network partition is associated with a first network priority and the second network partition is associated with a second network priority that is higher than the first network priority, and wherein one or more router devices are in the second network partition and each of the one or more router devices are assigned a respective identifier;

determining, based on a message received from the one or more router devices on the second network partition, that an identifier conflict exists between the router device on the first network partition and the one or more router devices on the second network partition, wherein determining that the identifier conflict exists between the router device on the first network partition and the one or more router devices on the second network partition comprises determining that an identifier assigned to the one or more router devices on the second network partition is the same as the identifier assigned to the router device; and in response to determining that the identifier conflict exists when the second network priority is higher than the first network priority, ceasing to respond to messages received from the end devices that are attached to the router device.

2. The method of claim 1, wherein detecting formation of the second network partition is based on receiving a second message from the one or more router devices on the second network partition.

3. The method of claim 2, wherein the method further comprises:

initiating a joining procedure to join the second network partition with the identifier assigned to the router device on the first network partition in response to detecting that the identifier conflict does not exist for the one or more router devices on the second network partition.

4. The method of claim 3, wherein the joining procedure comprises transmitting a router upgrade request message that includes the identifier assigned to the router device, wherein the router upgrade request message is configured to enable the router device to join the second network partition with the identifier assigned to the router device.

5. The method of claim 3, wherein the joining procedure is initiated at a unique coordinated startup time.

6. The method of claim 5, further comprising determining the unique coordinated startup time based on the identifier of the router device.

7. The method of claim 5, wherein the router device is configured with the unique coordinated startup time during a claiming procedure.

8. The method of claim 3, further comprising:

listening to traffic on the second network partition for a back-off period of time, wherein the back-off period of time is a period of time for which the router device will delay before attempting to attach to a first router device of the one or more router devices on the second network partition;

extending the back-off period of time based on the traffic on the network; and after expiration of the back-off period of time, attempting an attachment procedure with a second router device of the one or more router devices on the second network partition to enable the router device to transmit and receive messages on the second network partition through the second router device.

9. The method of claim 8, further comprising determining a number of attachment messages transmitted on the second network partition during the back-off period of time, wherein the back-off period of time is extended based on the number of attachment messages transmitted on the second network partition during the back-off period of time.

10. The method of claim 1, further comprising:

receiving a router upgrade request message from an end device that is joined to the first network partition, the router upgrade request message being configured to enable the end device to perform as a second router device on the first network partition; and rejecting the router upgrade request message in response to detecting formation of the second network partition.

11. A router device configured to communicate in a first network partition, wherein the router device is assigned an identifier and has end devices that are attached thereto to enable the end devices to transmit and receive messages over the first network partition through the router device, the router device comprising:
a wireless communication circuit configured to transmit and receive messages; and
a control circuit configured to:
detect formation of a second network partition, wherein the first network partition is associated with a first network priority and the second network partition is associated with a second network priority that is higher than the first network priority, and wherein one or more router devices are in the second network partition and each of the one or more router devices are assigned a respective identifier;
determine, based on a message received from the one or more router devices on the second network partition, that an identifier conflict exists between the router device on the first network partition and the one or more router devices on the second network partition, wherein the control circuit being configured to determine that the identifier conflict exists between the router device on the first network partition and the one or more router devices on the second network partition comprises the control circuit being configured to determine that an identifier assigned to the one or more router devices on the second network partition is the same as the identifier assigned to the router device; and
in response to determining that the identifier conflict exists when the second network priority is higher than the first network priority, cease to respond to messages received from the end devices that are attached to the router device.

12. The router device of claim 11, wherein formation of the second network partition is detected based on receiving a second message from the one or more router devices on the second network partition.

13. The router device of claim 12, wherein the control circuit is further configured to:
initiate a joining procedure to join the second network partition with the identifier assigned to the router device on the first network partition in response to detecting that the identifier conflict does not exist for the one or more router devices on the second network partition.

14. The router device of claim 13, wherein the joining procedure comprises the control circuit being configured to transmit a router upgrade request message that includes the identifier assigned to the router device, wherein the router upgrade request message is configured to enable the router device to join the second network partition with the identifier assigned to the router device.

15. The router device of claim 13, wherein the joining procedure is initiated at a unique coordinated startup time.

16. The router device of claim 15, wherein the control circuit is further configured to determine the unique coordinated startup time based on the identifier of the router device.

17. The router device of claim 15, wherein the router device is configured with the unique coordinated startup time during a claiming procedure.

18. The router device of claim 13, wherein the control circuit is further configured to:
listen to traffic on the second network partition for a back-off period of time, wherein the back-off period of time is a period of time for which the router device will delay before attempting to attach to a first router device of the one or more router devices on the second network partition;
extend the back-off period of time based on the traffic on the network; and
after expiration of the back-off period of time, attempt an attachment procedure with a second router device of the one or more router devices on the second network partition to enable the router device to transmit and receive messages on the second network partition through the second router device.

19. The router device of claim 18, wherein the control circuit is further configured to determine a number of attachment messages transmitted on the second network partition during the back-off period of time, wherein the back-off period of time is extended based on the number of attachment messages transmitted on the second network partition during the back-off period of time.

20. The router device of claim 11, wherein the control circuit is further configured to:
receive a router upgrade request message from an end device that is joined to the first network partition, the router upgrade request message configured to enable the end device to perform as a second router device on the first network partition; and
reject the router upgrade request message in response to detecting formation of the second network partition.

21. A non-transitory computer readable storage medium with program instructions stored thereon that, when executed by a control circuit, cause the control circuit to:
communicate in a first network partition using an identifier;
detect formation of a second network partition, wherein the first network partition is associated with a first network priority and the second network partition is associated with a second network priority that is higher than the first network priority, and wherein one or more router devices are in the second network partition and each of the one or more router devices are assigned a respective identifier;
determine, based on a message received from the one or more router devices on the second network partition, that an identifier conflict exists between the control circuit and the one or more router devices on the second network partition, wherein the instructions causing the control circuit to determine that the identifier conflict exists between the router device on the first network partition and the one or more router devices on the second network partition comprises the instructions causing the control circuit to determine that an identifier assigned to the one or more router devices on the second network partition is a same identifier as the identifier assigned to the router device; and
in response to determining that the identifier conflict exists when the second network priority is higher than the first network priority, ignore messages received via the first network partition in response to detecting formation of the second network partition having the higher priority.

* * * * *